United States Patent
Barasch et al.

(10) Patent No.: US 8,613,620 B2
(45) Date of Patent: Dec. 24, 2013

(54) METHOD AND SYSTEM FOR PROVIDING WEB BASED INTERACTIVE LESSONS WITH IMPROVED SESSION PLAYBACK

(75) Inventors: Michael A. Barasch, New York, NY (US); Philip M. Auerbach, New York, NY (US); Nicholas J. Haurus, New York, NY (US)

(73) Assignee: Interactive Sports Direct Incorporated, New York, NY (US)

( * ) Notice: Subject to any disclaimer, the term of this patent is extended or adjusted under 35 U.S.C. 154(b) by 954 days.

(21) Appl. No.: 12/569,664

(22) Filed: Sep. 29, 2009

(65) Prior Publication Data

US 2010/0081116 A1    Apr. 1, 2010

Related U.S. Application Data

(63) Continuation-in-part of application No. 11/189,640, filed on Jul. 26, 2005, now abandoned.

(51) Int. Cl.
*A63B 69/36* (2006.01)

(52) U.S. Cl.
USPC .................. 434/252; 434/247; 434/257

(58) Field of Classification Search
USPC .................. 434/247, 252, 257, 258
See application file for complete search history.

(56) References Cited

U.S. PATENT DOCUMENTS

| | | | | |
|---|---|---|---|---|
| 5,984,684 A * | 11/1999 | Brostedt et al. | ............... | 434/252 |
| 6,144,991 A * | 11/2000 | England | ........................ | 709/205 |
| 6,750,896 B2 * | 6/2004 | McClure | ................... | 348/14.01 |
| 2002/0110121 A1 * | 8/2002 | Mishra | .......................... | 370/389 |
| 2003/0061285 A1 * | 3/2003 | Usui et al. | ..................... | 709/205 |
| 2004/0103152 A1 * | 5/2004 | Ludwig et al. | ................ | 709/205 |
| 2005/0288951 A1 * | 12/2005 | Stone et al. | ...................... | 705/1 |
| 2005/0289453 A1 * | 12/2005 | Segal et al. | ................... | 715/512 |
| 2006/0085862 A1 * | 4/2006 | Witt et al. | ....................... | 726/26 |
| 2006/0252018 A1 * | 11/2006 | Sooch | ........................... | 434/252 |
| 2007/0048719 A1 * | 3/2007 | He et al. | ......................... | 434/350 |
| 2008/0008458 A1 * | 1/2008 | Gudipaty et al. | ............. | 386/131 |
| 2009/0083115 A1 * | 3/2009 | Pearson et al. | .................... | 705/9 |

FOREIGN PATENT DOCUMENTS

WO    WO 2005/004085 A1 *    1/2005    ............... G09B 5/06

* cited by examiner

*Primary Examiner* — Bruk Gebremichael
(74) *Attorney, Agent, or Firm* — Hoffmann & Baron, LLP

(57) ABSTRACT

The system and method of the present invention provides for realistic, live on live with webcams, interactive, golf lessons from a golf professional who is located at a distance from the golfer. The lesson experience is enhanced by providing tools to the professional for annotating the lesson both verbally and visually, as well as by providing for the recording of the lesson and later playback of same, with enhanced synchronization of audio/visual data streams.

10 Claims, 54 Drawing Sheets

`<event>draw_event</event><time>10513</time><args><arg>freehand_down</arg><arg>262</arg><arg>93</arg></args>`

| | | |
|---|---|---|
| TEXT_EVENT | SCREEN_SPLIT | FREEHAND_FOLLOW |
| TIP_MADE | SCREEN_UNSPLIT | STRAIGHTHAND_FOLLOW |
| TIP_SAVED | SPLIT_LOADED | SQUARE_FOLLOW |
| WEBCAM_EVENT | SPLIT_DATA | CIRCLE_DOWN |
| STREAM_IN | VIDEO_EVENT | ANGLE_SELECTED |
| LESSON_EVENT | REQUEST_VIDEO | UPDATE_CONTROLLER |
| LESSON_START | DATA_LOADED | SLIDE_TO |
| LESSON_END | VIDEO_PROGRESS | START_DRAG |
| LESSON_REJECTED | VIDEO_REWIND | START_FULLSCREEN |
| PHONECALL_PROGRESS | VIDEO_PLAY | STRAIGHTHAND_DOWN |
| PAUSE_PHONECALL | VIDEO_PAUSE | COLOR_CHANGE |
| PAUSE_PLAYBACK | VIDEO_LOADED | NC_CONNECTED |
| RESTART_PLAYBACK | DRAG_VIDEO | MEDIA_ESTABLISHED |
| RESUME_PLAYBACK | SEEK_TO | FMS_ESTABLISHED |
| PAUSE_COMMANDS | DRAW_EVENT | ENABLE_UI |
| SPLIT_OVER | FREE_TOOLS | MEDIA_LOADED |
| SPLIT_OUT | CLEAR_BOARD | COMMANDS_COMPLETE |
| | FREEHAND_DOWN | PHONECALL_COMPLETE |

METHOD AND SYSTEM FOR PROVIDING WEB BASED INTERACTIVE LESSONS WITH IMPROVED SESSION PLAYBACK

CROSS-REFERENCE TO RELATED APPLICATION

The present application is a continuation-in-part application of U.S. patent application Ser. No. 11/189,640, filed on Jul. 26, 2005 now abandoned, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a method and system for providing interactive golf lessons with a professional instructor. The present invention also relates generally to the playback of interactive, multi-participant, multi-media networked sessions, of all types, such as the playback of an interactive web conference, including playback of a saved lesson session. The present invention also provides for the mediation of social interaction between and among various golfers and/or golf professionals.

2. Related Art

Interactive Lessons

Numerous ways for improving an individual's golf game currently exist. Today, most golf instruction is accessed by taking a lesson with a golf instructor, watching an instructional, or reading "self help" books and/or other periodicals. The benefits and shortcomings of each of the three main sources of golf instruction are obvious.

Taking lessons with a golf instructor is the most effective form; however, it is also the least practical. An individual is required to schedule a lesson at a time convenient for himself as well as the golf instructor. Additionally, the individual's choice of golf instructors is limited to the distance the individual is willing to travel to take his lesson. Furthermore, when an individual takes lessons from a golf instructor, he typically does not have the opportunity to write notes, nor is he allowed to video record the session. As a result, important points of the lesson may be forgotten as time passes.

Instructional videos, while easily accessible and relatively affordable, do not offer the same personalization that live instruction offers. While instructional videos address common faults in the golf swing, and offer instruction or drills to fix these faults, not all golfers are afflicted with the same swing faults. Thus, instructional videos are not useful in addressing swing flaws unique to a particular golfer. Additionally, with the number of instructional videos available, it is a challenge for a golfer to choose the appropriate video to correct flaws in their individual game and swing.

Self-help reading material, similarly to instructional videos, does not offer the personalization feature needed to address unique swing flaws of a particular golfer. Additionally, the number of books and periodicals available makes it challenging to choose the most effective one.

Many variations of interactive golf lessons have been disclosed.

U.S. Pat. No. 5,486,001 discloses an instructional aid for enabling and assisting a person to emulate a predetermined movement such as a golf swing including an image/data capturing device for scanning, capturing and storing the image/data signals of the person's golf swing or movement, and a transceiver for transmitting the image/data signals over a communications network to a remote computer. The remote computer contains a database which stores image signals and bio-mechanical data of a number of preselected swings or movements. The instructional aid may be used for analyzing or reporting on particular geographical regions or objects and provides a specialized presentation for development of that region or object from information stored in the computer database. While this design provides a remote instructional aid, this variation, does not disclose web based interactive golf lesson. Furthermore, this variation does not provide real-time instruction from an instructor to a subscriber as instruction is provided from information already stored in the computer database.

U.S. Pat. No. 6,767,211 discloses a system for improving and teaching decision making skills in a respective sporting activity, specifically golf. The system provides at least one of real or hypothetical situations and includes examples of different actions to be taken in those situations. The user responds to the situation and the actions chosen by the user are reviewable by an expert for evaluation thereof. The responses and evaluations are transmitted via a communication network between at least two personal computers. While this variation discloses features such as real-time professional assistance provided for improving a golf game, it does not disclose capturing video data that actually depicts a situation and transmitting the actual video data to be reviewed by a professional. Without the capturing and transmission of videos, the instructor is not able to utilize visual aids for the purpose of providing instructions. The utilization of visual aids is an essential aspect of the present invention. Furthermore, while multiple users may respond similarly to the real or hypothetical situations including examples of different actions to be taken in certain situations, not all of these users may have similar swings. Each user may have a unique swing fault that is not identifiable by analyzing the responses to hypothetical situations by these users. The present claimed invention captures and transmits videos thus allowing the instructor to utilize video representations of the user's swing for the purpose of analyzing the swing and providing individual personalized instruction.

U.S. Pat. No. 6,705,869 discloses a system and method for interactive communication skill training The system includes a user computer system having a memory, a display device, and input device, a video recording device and an audio device. The system also includes an e-learning web site with skill training software for interactively teaching a skill. The system further includes an expert's computer system. The method for interactive communications skill training includes the steps of accessing the e-learning website by the user, selecting a learning module for a communication skill by the user, interacting with the learning module and recording the user interaction using the video recording device. This variation, however, does not concern real-time video data capture for the purpose of at least one of teaching and improving a user's golfing ability. This variation performs analyses via a computer e-learning website. This system provides a computer analysis of the information provided and automatically produces a lesson based upon stored information. This system does not provide for live interactive personal lessons tailored specifically for a subscriber. Furthermore, this variation does not disclose capturing video data that actually depicts a situation and transmitting the actual video data to be reviewed by a professional. Without the capturing and transmission of videos, the instructor is not able to utilize visual aids for the purpose of providing instructions. The utilization of visual aids is an essential aspect of the present invention.

U.S. Pat. Nos. 6,224,387 and 6,517,353 disclose systems for collecting pictures to produce a pictorial tour of a golf course to be distributed over a communication network for the purpose of providing a visual tour of the course. This system is run by an intermediary service bureau that coordinates obtaining the pictures and providing the pictures to the golfers as well as controlling access thereto. This variation, however, only presents still picture visual data and is intended to give the golfer a shot-by-shot view of a golf course.

U.S. Pat. No. 6,293,802 discloses a hybrid format for representing a video lesson which is transported part in an audio/video file format and part in an identifying format for identify pre-stored audio/video content stored locally with respect to the student, from a first location to a second location across a communication channel includes a first item having a first format type and a second item having a second format type. Even though the format types are different, the patent discloses that the lesson can be played to the student as if it were a single contiguous data item and as such, efficiencies can be obtained in storage and transfer. This patent does not disclose a real-time interactive communication session. Nor does it disclose an interactive lesson session wherein the student can interact in real-time with the instructor asking additional questions, providing in real-time additional audio and/or visual files for review and comment by the instructor. It also does not disclose the transportation of complete non-local audio/video instruction files from a first location associated with the instructor across a communication channel to a second location associated with a student.

U.S. Patent Publication No. US 2004/0191744 mentions electronic training systems configured to allow an instructor to present pre-existing course content to a plurality of students at the same time utilizing audio and/or video receivers and transmitters to enable real-time communication between the instructor and his/her students and between students. Nothing in this publication suggests, discloses or mentions a system or method wherein a student is able to upload an image of a golf swing or other human action for review, analysis and instruction to the student by the instructor.

Improved Session Playback

Conventional computing systems allow users at different locations to participate in the interactive exchange of data, such as audio, video and graphics media data. Such data may include Voice Over Internet Protocol (VOIP) related media data, as well as, non-media data. Generally the data from various sources and in various formats are routed to one or more servers for distribution to all participants during a session. The various streams of data may also be captured and retained for playback. A significant requirement of playback is that the various data be played back in an apparently synchronized fashion so as to replicate the experience of the original session or parts thereof. Absent apparent synchronization, for example, the observer could hear a person announce a certain action shown on the video playback after the action has already taken place.

U.S. Pat. No. 6,674,459 discloses a system and process to create a viewable standard format post conference recording of a network conference after the completion of an interactive teleconference. The separate raw data streams that are captured during the course of the teleconference, are not in a format for playback, but must be processed into a viewable format. The post-conference processing postpones transcribing tasks into a viewable format recording, until after the conference. Moreover, it does not disclose or address the integration of telephone data capture during the live conference.

U.S. Pat. No. 7,464,137 discloses a system for recording a teleconference session at the participant's (client's) computer during the progress of the session and for post-conference editing of the recorded file. It does not disclose or address the integration of telephone data capture during the live conference.

SUMMARY OF THE INVENTION

The present invention allows people to connect together over the Internet or other capable communication network in a live conference and provides for the uploading of action videos, annotation of same, split screen functionality, concurrently with live cameras on both ends, conference audio/visual recording, audio/visual playback on demand and sharing of experiences with other people.

In one preferred embodiment, the present invention allows students and professionals to connect together in a live conference, and provides for the uploading of action videos, annotation of same, split screen functionality with live cameras on both ends, conference audio visual recording, and simultaneous audio visual playback on demand from multiple user and coach accounts. Moreover, the student is provided with a choice of professionals, the professional is able to analyze images provided by the student during the conference, and is provided with the appropriate tools to markup same and discuss it with the student during the real-time interactive session. The entire session is recorded and stored in the student's locker for immediate and later replay. In one preferred embodiment, the professionals are available live apparently instantly at that desired moment.

In one preferred embodiment, the system and method of present invention provides for realistic, live, interactive, golf lessons from a golf professional who is located at a distance from the golfer. The system and method of the present invention further enhances the lesson experience by providing tools to the professional for annotating the lesson both verbally and visually, as well as by providing for the recording of the lesson and later playback of same by the golfer and others chosen by the golfer to see same.

In this preferred embodiment, a golfer records swings while playing on the golf course while on the practice range, or during a lesson session, or otherwise, using either a digital camera or the video function on his/her cell phone, or other functionally equivalent device. The golfer goes to the website of an online provider of the present invention. The online provider has arranged for coaches to be available online to teach online in accordance with their schedule. At the provider's website the golfer may sign up as a system subscriber. After signing up, the golfer can immediately personalize his/her account by uploading and labeling video clips of swings in any format and placing same in golfer's locker. The golfer purchases lessons from the online provider and then checks the schedule on the site to find out when golf professionals are available. A lesson session time is arranged through the online provider's reservation system. Then the golfer at the scheduled time takes a live interactive lesson with one of the online provider's professional golfers.

During the live interactive lesson session, the system enables the golf professional to diagram and analyze selected swings live via the Internet. During the session, while visibly instructing the student, the golf professional will be interacting with the golfer on the phone and/or through a microphones associated with their computers. The professional is able to analyze the images and by utilizing tools provided by the system markup and display same to the golfer, either individually or in split screen mode for comparison purposes. Selected still images may be saved for future reference as printable screen shot tips. During the session, the system records the live interactive lesson and at the conclusion of a lesson the system saves the lesson experience. In addition, the professional will provide the golfer with a game plan which gives a guide for future improvement. The game comprises two components. The first, one or more screen shot tips which may be printed, and second, an audio/visual component which may be played back for replay of lesson. Thereafter, the Game Plan, as well as clips of all swings uploaded by the golfer, are available for review in the golfer's locker. The Game Plan screen shot tips may also be printed out at any time. Additionally, Golfers may share Game Plans and other information with other members of the system.

The present invention also relates to an improved recording and playback control method and system which executes as an on-line web application running under a browser plug-in capable of playing multiple types of media files. The system controls playback of a plurality of data streams while maintaining synchronization of the different media. In accordance with one preferred embodiment, the files to be played include the record of a VOIP conversation, captured during a multi-participant distributed interactive session and stored in one or more databases or file systems which may be located on one or more remote servers. Upon request for playback of an interactive session, downloading of the data streams to the client processor in background is initialized. The separate data streams may be played by separate process threads, but are synchronized to the client computer master time clock at their initialization. During playback of the data streams, separate processes are periodically resynchronized to ensure that the different media files are maintained in relative synchronization with each other.

In accordance with another embodiment of the present invention, the professional golfer and the golfer are in an audio/video session, talking on the phone, including VOIP, the golfer uploads a new movement video to his/her locker, the professional accesses same, the professional can comment directly on the new movement video, and/or prepare a golf plan for later use based on same.

The present invention relates to an Internet compatible system for providing data representing golf instructions. A communication interface receives a message including data representing a request for golf instruction. A message processor for examining the request provides an alert message to an instructor alerting the instructor to the received request. An input processor receives data including a response to the request alert message, and the distribution processor forwards the received response data to a destination system.

The systems and methods comprise one or more subscriber stations and/or one or more instructor stations, whereby one or more subscribers and/or one or more instructors may use the systems and methods of the present invention.

Additionally, an interactive system receives data representing golf instructions. A display processor generates a user interface display image on a display device. An input device processor enables a user to enter a request to receive golf instructions. The message processor receives data representing a request for golf instruction entered by a user via the input device processor. A communication interface processes the request received from the distribution processor to provide a formatted request message for communication and initiates communication of a formatted request message to a destination system. The communication interface also receives a message responsive to the communicated formatted request message, and initiates the communication of the responsive message to the user.

In accordance with one preferred embodiment of the present invention, the communication interface also initiates and manages a Voice over Internet Protocol (VOIP) telephone conversation between the instructor and at least one student. The communication interface further supports playing by the instructor during the lesson of at least one video previously uploaded by the student for evaluation and comment by the instructor. The communication interface may further support the optional reception and transmission of web camera data streams from the instructor and the at least one student.

A primary object of the present invention is to provide a system and method for providing web based interactive golf lessons that overcome the shortcomings of the prior art.

Another object of the present invention is to provide a system and method for providing web based interactive golf lessons.

Yet another object of the present invention is to provide a system and method for providing web based interactive golf lessons whereby a subscriber selectively captures video data representing the subscriber's golf swing.

Still yet another object of the present invention is to provide a system and method for providing web based interactive golf lessons whereby a subscriber logs onto a central server uploading the captured video data for viewing by the instructor.

Still another object of the present invention is to provide a system and method for providing web based interactive golf lessons whereby the subscriber receives real-time and/or delayed instruction from a golf instructor.

Another object of the present invention is to provide a system and method for providing web based interactive golf lessons whereby the golf instructor is able to selectively edit the video data representing the subscriber's golf swing and provide the edited video data to the subscriber.

Yet another object of the present invention is to provide a system and method for providing web based interactive golf lessons whereby the golf instructor compares video data of the subscriber to archived video data of professionals and/or archived video data of the subscriber.

Another object of the present invention is to provide a system and method for providing web based interactive golf lessons whereby the golf instructor selectively edits the video data representing the subscriber's golf swing by adding alignment lines to the subscriber's video data.

Another object of the present invention is to provide a system and method for providing web based interactive golf lessons whereby each subscriber is provided with a unique storage area for retaining data representing previous lessons and instruction for later review.

Still another object of the present invention is to provide a system and method for providing web based interactive golf lessons whereby the instructor creates a game plan for the subscriber based on the subscriber's skill level and the important swing thoughts taught in prior lessons.

Another object of the present invention is to provide a web based interactive golf lessons including a handheld device able to communicate with the central server and receive instantaneous information.

Another object of the present invention is to provide a web based interactive golf lessons including a handheld device able to communicate with the central server and receive information including club selection and the type of swing the subscriber should take.

Yet another object of the present invention is to provide a system and method for providing web based interactive golf lessons for a group of subscribers using video conferencing.

Still yet another object of the present invention is to provide a system and method for providing web based interactive golf lessons for a group of subscribers using video conferencing whereby transmission of video and audio is performed in real-time.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

BRIEF DESCRIPTION OF THE DRAWINGS

In order that the present invention may be more fully understood, it is described in the accompanying figures, but only by way of example and without limiting the broad scope or various other embodiments of the present invention.

FIG. 22 shows an exemplary command used in playback for one embodiment of the present invention.

FIG. 23 lists some of the commands available for playback control for use in one embodiment of the present invention.

FIGS. 26 through 58 show illustrative screen shots from a preferred embodiment of the present invention.

FIGS. 26 through 55 show illustrative screen shots from lesson session in accordance with a preferred embodiment of the present invention. FIGS. 26-46 are illustrative screen shots as seen by the golfer in accordance with one preferred embodiment of the present invention. FIGS. 47-55 are illustrative screen shots as seen by the golf professional in accordance with one preferred embodiment of the present invention.

FIG. 26 is an illustrative screen shot of the system's Internet website welcome screen, sign-in and registration access is available by clicking on the appropriate link.

FIG. 27 is an illustrative screen shot provided by the system, after sign-in of a registered member user, in this case the golfer, via the link shown on FIG. 26, the "My Locker" tab is the current default, it shows previously uploaded swings.

FIG. 28 is an illustrative screen shot provided by the system to the golfer, after selecting "Book a Lesson" tab, shown on FIG. 27, it provides for the member to "Chose a swing for your lesson", by clicking on the image of the swing, and also permits the member to write message to the professional in the "Tell the Pro what you would like to discuss" box.

FIG. 29 is an illustrative screen shot provided by the system, after selecting the swing shown in the lower right image box shown in FIG. 28, the image border around the selected image appears is highlighted.

FIG. 30 is an illustrative screen shot provided by the system to the golfer, after clicking on the selected swing and then clicking on "Next" shown on FIG. 29, and shows the availability of professionals to provide a lesson.

FIG. 31 is an illustrative screen shot provided by the system to the golfer, after clicking on one of the professionals shown on FIG. 30 and shows, in this case, a monthly calendar with the professional's schedule.

FIG. 32 is an illustrative screen shot provided by the system to the golfer, after clicking on August 5 on the calendar shown on FIG. 31, it shows a list of available appointments for the professional.

FIG. 33 is an illustrative screen shot provided by the system to the golfer, after clicking on the 9:50 AM row in the available appointments section shown on FIG. 32, that row is now highlighted.

FIG. 34 is an illustrative screen shot provided by the system to the golfer, after clicking on the "Book" button shown on FIG. 33, it shows a confirmation window for the appointment.

FIG. 35 is an illustrative screen shot provided by the system to the golfer, after clicking on the "OK" button shown on FIG. 34, it shows on the "Upcoming Lessons" tab a stylized figure of a golf club, indicating that there is an upcoming lesson scheduled.

FIG. 36 is an illustrative screen shot provided by the system to the golfer, after clicking on the "Upcoming Lessons" tab shown in FIG. 35, it shows that a lesson has been scheduled with a professional for at a specified time and date and it also shows an image related to the particular swing that is to be the subject of the lesson, it also indicates that the lesson is confirmed.

FIG. 37 is an illustrative screen shot provided by the system to the golfer, after clicking on the "Join Lesson" button shown in FIG. 36, the screen shows an image of the golfer from the golfer's computer camera (in this illustration the golfer is called "Phil Auerbach") to the right of the view screen area, and in the view screen area (the large window showing a golfer with a club) it shows an image from the swing to be analyzed, in the text message area it requests the golfer to call the telephone number on the top of the screen.

FIG. 38 is an illustrative screen shot provided by the system to the golfer, after the golfer has called the telephone number and entered the pin number found at the top of the screen in FIG. 37, it now shows an image of the professional from the professional's computer camera (in this illustration the professional is called "Philip Auerbach") to the right of the view screen area, at this point the lesson session has started, the audio, computer based and/or telephone based, the view screen area and the text message area are being recorded, and the golfer and the professional are in live, interactive audio/visual communication.

FIG. 39 is an illustrative screen shot provided by the system to the golfer, during the session and after the professional has clicked on the webcam feed of his image to switch between the image of the professional and the recordable view screen area, in this configuration the image in the view screen area is still being recorded, and as such, the golfer upon playback of the lesson will be able to see whatever activity the professional demonstrates while his image in the view screen.

FIG. 40 is an illustrative screen shot provided by the system to the golfer during the session and after the professional has clicked on the webcam feed of the golfer's image to switch between the image of the golfer and the recordable view screen area, in this configuration the image in the view screen area is still being recorded, and as such, the golfer upon playback of the lesson will be able to see whatever activity the golfer demonstrates while his image in the view screen.

FIG. 41 is an illustrative screen shot provided by the system to the golfer during the session, in the view screen area the image of the golfer has been annotated by the professional using the drawing tools provided him by the system, the professional is also showing in his non-recording image box a suggested club grip, and the professional, using the text tool provided by the system, has entered a suggestion for the golfer in the text message box, the professional had earlier saved a copy of the swing in an image window displayed below the image windows for the golfer and the professional, it is referred to as "ScreenShots Tip#1", the professional could also have saved the swing after full annotation, as would normally be expected to be the case.

FIG. 42 is an illustrative screen shot provided by the system to the professional, after the session has begun and after the professional has clicked on the swing library tool shown, for example, in FIG. 52. From this screen the profession has access to swings stored in the system's general swing library, as well as swings available in the professional's swing library as well as swings in the golfer's library.

FIG. 43 is an illustrative screen shot provided by the system to the golfer during the session, showing the saving of the lesson by the system under the direction of the professional, this action will result in the creation of a game plan based on the lesson.

FIG. 44 is an illustrative screen shot provided by the system to the golfer, after the lesson has been saved and the lesson session terminated, the golf is back in his locker and the game plan from the lesson as well as all other game plans stored in his locker appear, the game plan just saved is found at the top upper right of the array of game plans and is called "Enter The . . . ".

FIGS. 45 and 46 are the overlapping top and bottom portions of a portion of an illustrative screen shot provided by the system to the golfer of the game plan entitled "Enter The . . . ", it has been displayed after the golfer has clicked on the "Enter The . . . " game plan shown in FIG. 44. FIG. 45 shows TIP#1 and TIP#2, and a portion of the professionals biography. FIG. 46 shows the whole of the professional's biography and the video of the lesson associated with the game plan, including the audio and the whatever appeared in the view screen area and the text message area.

FIG. 47 is an illustrative screen shot of the system's Internet website welcome screen, showing information entered into the sign in portion by the professional, for this illustration his name is "Philip".

FIG. 48 is an illustrative screen shot provided by the system to the professional, after sign-in via the link shown on FIG. 47, the "My Lessons" tab is default, it shows the professionals calendar and schedule, in particular it shows the already taken lesson scheduled with Phil the golfer on Aug. 5, 2009 at 9:50 AM and another lesson with Phil the golfer for 10:10 AM on Aug. 5, 2009. From this and other screens with the "Start Upload" button the professional can also direct uploading of the golfer's swing.

FIG. 49 is an illustrative screen shot provided by the system to the professional, after the professional has clicked the confirm button shown on FIG. 48.

FIG. 50 is an illustrative screen shot provided by the system to the professional, after the professional has clicked the OK button shown on FIG. 49, and shows that said lesson is confirmed under the time and date of "10:10 AM on Aug. 5, 2009 (EST)".

FIG. 51 is an illustrative screen shot provided by the system to the professional, after the professional and the golfer have both dialed the requested telephone number and both have begun entering their respective pin numbers and the system is waiting for the golfer to allow the system access to the golfer's computer microphone and camera, the time indicates how much time remains for the lesson.

FIG. 52 is an illustrative screen shot provided by the system to the professional, after the session has begun, the golf swing from the golfer's locker appears in the view display area, and the professional's live image appears to the right of it, in the text message area the professional is provided with a reminder to enter a swing tip, to the left of the view display area are the professional's tools. The tools in this illustration comprise a pencil for free form markup, a tool for drawing straight lines between two points, a tool for drawing rectangles, a tool for drawing ovals, a tool for erasing, a tool for connecting to a swing library and a tool for centering images in the split screen mode. Additional tools illustrated on this screen provide the professional with the capability of changing the color the annotations.

FIG. 53 is another illustrative screen shot provided by the system to the professional, after the session has begun and after the professional has clicked on the swing library tool shown, for example, in FIG. 52. From this screen the profession has access to swings stored in the system's general swing library, as well as swings available in the professional's swing library as well as swings in the golfer's library.

FIG. 54 is an illustrative screen shot provided by the system to the professional, after the session has begun, it shows an additional tool "the hand" which is used in connection with centering the golfer's swing and also shows the split screen configuration where the golf's swing appears next to a swing chosen by the professional. Additional tools on this screen provide the professional with the capability of independently advancing and returning to the beginning of the video swings in each window appearing on the view screen portion. Once positioned, the swings can be independently annotated with the annotation tools.

FIG. 55 is an illustrative screen shot provided by the system to the professional, after the session has begun, it shows the golfer's swing in the view display area with the swing video advanced about half way from the beginning to the end and the professional has placed this image in the "ScreenShots" image area as Tip#3 using the screen switch tool found as the lowermost tool on the left side of the video display area.

DETAILED DESCRIPTION OF THE INVENTION

Interactive Lessons

Figure 1:
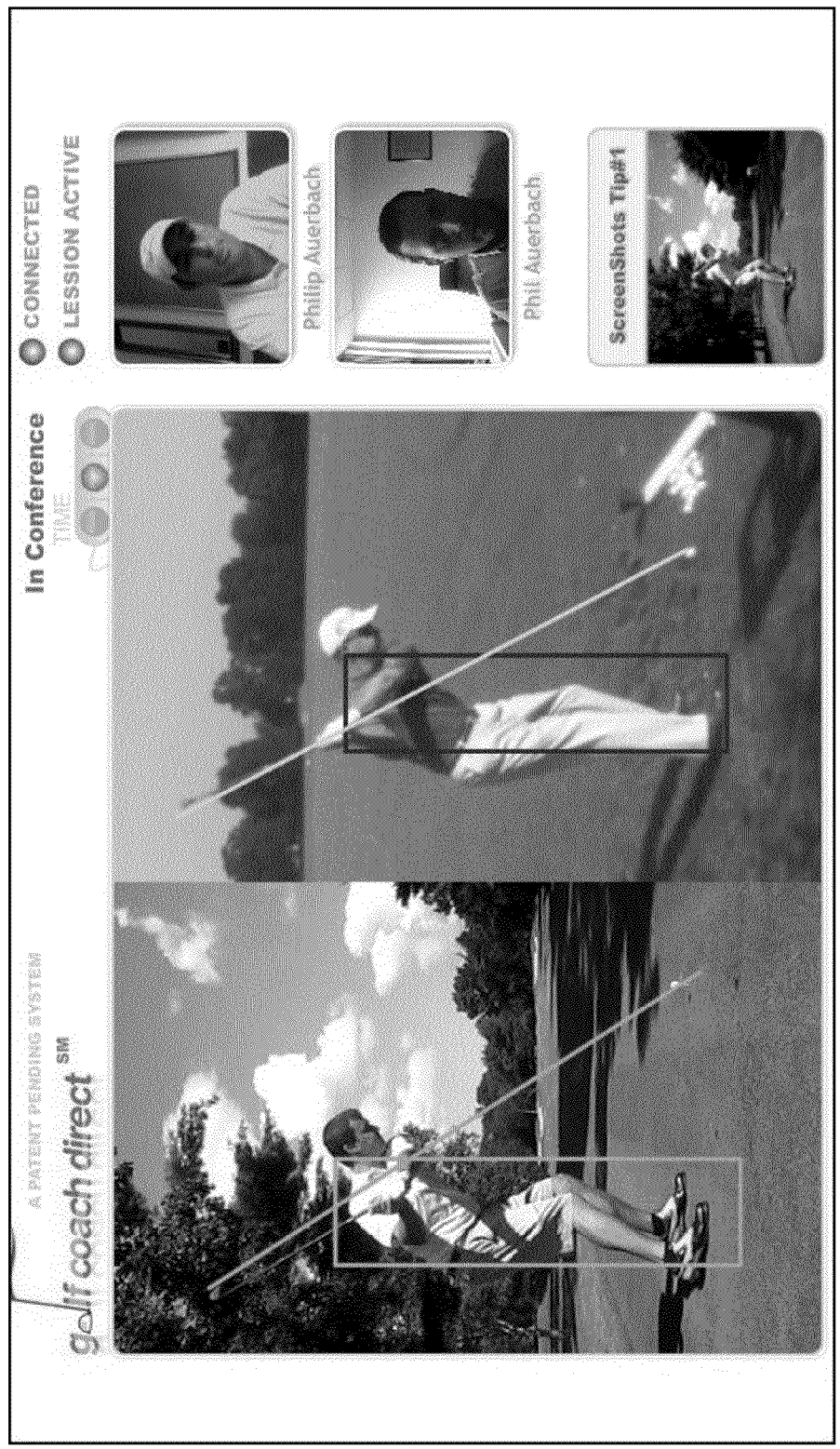
FIG. 1 is an illustrative screen shot provided by the system to the golfer during the session, as chosen by the professional through the use of the tools provided by system, the screen shows the view screen area broken in a split screen image, the left image shows the golfer's swing as annotated by the professional, the right image shows a save image of a "correct" swing, which has also been annotated, for comparison purposes.

The present invention relates to a method and system for providing interactive lessons, and more specifically web based interactive golf lessons with a golf instructor. The system includes a central server which subscribers and golf instructors can log on to and communicate with one another. A subscriber to the system selectively captures video data representing the subscriber's golf swing and logs onto the central server to upload the captured video data. A golf instructor is able to then download and analyze the swing and provide real-time and/or delayed instruction to the subscriber through the central server. Alternatively, the user may obtain analysis and/or instruction in real-time using a web camera to display their swing live to an instructor. Furthermore, a handheld device can be used by a subscriber to communicate with the central server to receive information concerning golfing anywhere, even while on the course. The handheld device may preferably be a cell phone with built in camera or personal digital assistant with cell phone and camera. Another aspect of the present invention is to provide a video conferencing method and apparatus for providing web based interactive group golf lessons. Alternatively, users may schedule lessons at predetermined times and/or with specific instructors. A further aspect of the present invention provides personalized game plans for each type of shot and club which will be stored in a subscriber's personalized storage area. Each subscriber is provided a personalized storage area for retaining data representing previous lessons, instructions, analysis and game plans. A further aspect of the present invention provides an environment for the social interaction among its users, who can communicate and share information, including lesson sessions amongst each other.

Turning now descriptively to the drawings, in which similar reference characters denote similar elements throughout the several views.

FIG. 1 shows an illustrative screen shot as seen by the golfer during the lesson session in accordance with a preferred embodiment of the present invention. In this screen shot, images of both the golfer and the golf professional appear, an image of part of the screen shot for golf tip number 1 appears, in the center area the golfer's swing appears on the left, while a comparative professional swing appears on the right. Both swing images shows annotations to assist in helping the golfer with his/her swing.

Figure 2:
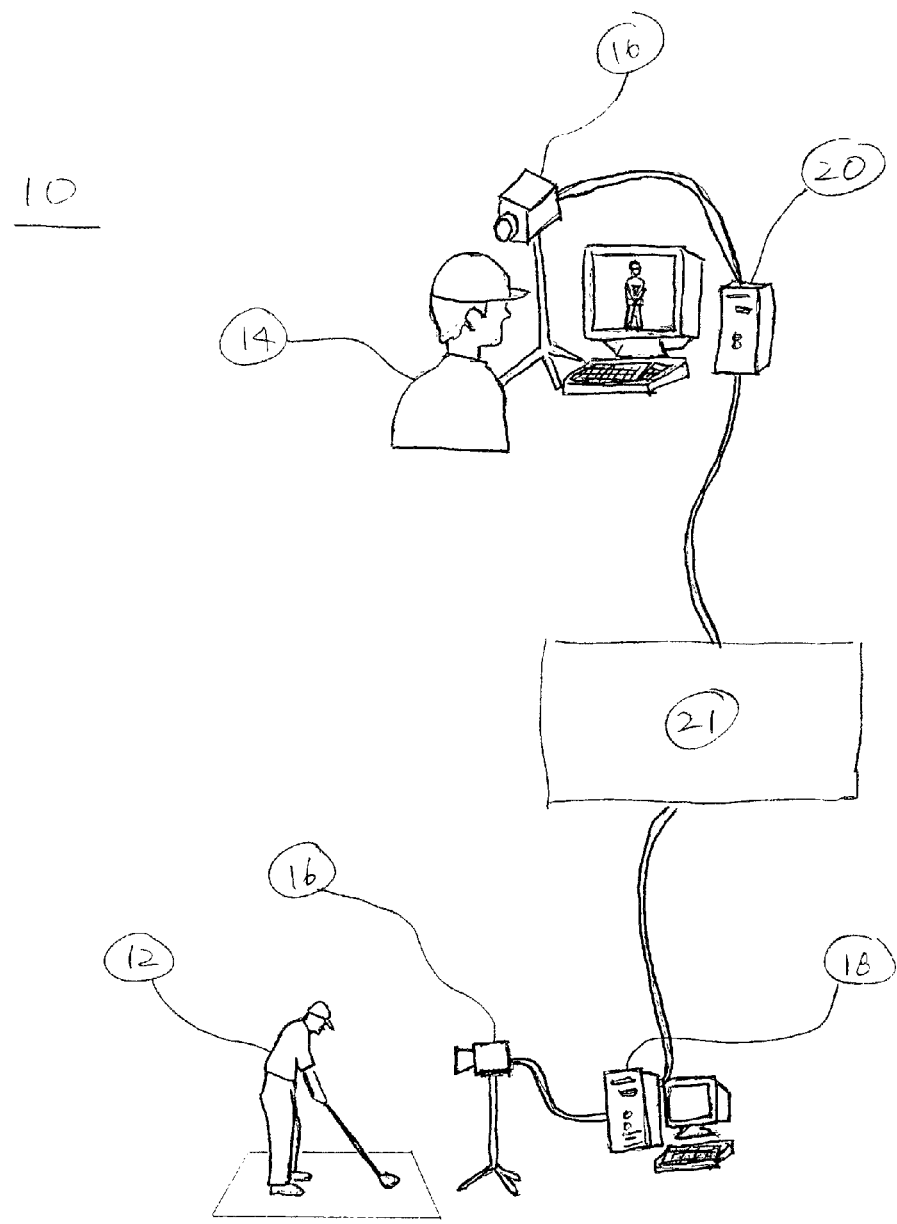
FIG. 2 is an illustrative view of one embodiment of the present invention in use.

FIG. 2 is an illustrative view of a preferred embodiment of the web based interactive golf lesson system of the present invention in use. In FIG. 2, the system of one of the embodiments of the present invention is indicated by the reference numeral 10. The system of the present invention allows for at least one subscriber 12 to communicate with and obtain advice and instruction from an instructor 14 at any time and place of the subscriber's 12 choosing. The system includes a first computer 18 on the subscriber end linked to a second computer 20 on the golf instructor end via a communications link.

The subscriber's computer 18 is connected to the Internet via a telecommunications link such as a telephone line, a cable line, or a wireless connection. As is known in the art, the Internet includes providers such as internet access providers and internet service providers and network service providers and routers that provide wired and wireless digital telecommunications throughout the world using TCP/IP networking protocol. It should be appreciated that the computer may access the Internet directly, or may be operatively connected to a local area network (LAN) over which information is transmitted to other computers on the same LAN or to computers on other LANs through a localized Intranet. The information can be transmitted between the user and the Internet via the Intranet.

Alternatively, a local area network (LAN), wide area network (WAN) or other type of network may be used to connect subscribers 12 with instructors 14. The system 10 is able to function using any means for connection including but not limited to dial-up, broadband, and satellite internet connections. Furthermore, the system is optimized to operate using hardwired and wireless connection to the internet. A video camera or webcam 16 is connected to the first computer 18. The subscriber 12 orients the video camera 16 to capture video data representing at least a portion of a golf swing. The video camera 16 can also be oriented to capture video data of the subscriber's 12 swing from different angles to provide different perspectives as well as close up views of different parts of the subscriber's body (e.g. grip, foot position, head position, posture, swing plane angle, etc.). The captured video data is uploaded to the first computer 18 for processing thereof. Processing of the video data includes but is not limited to conversion from analog to digital format as well as compression of the video data for transmission thereof. When the data is in digital format on the first computer 18, the subscriber 12 can log onto the central server and upload the data representing the at least one golf swing to the central server 21. Alternatively, the subscriber 12 may first log onto the central server and establish a connection with an instructor 14. The subscriber 12 may then display a golf swing live to a golf instructor 14 at the opposite end of the connection. The camera 16 may be adjusted or zoomed in to view any portion of the subscriber's swing such as the grip or foot position, or the camera 16 may be zoomed out to allow the viewing of the entire swing sequence.

In accordance with another preferred embodiment of the present invention, the uploaded golfer video clip is converted into two versions. The first version is keyframe heavy and is used to analyze the clip frame by frame with the scrubber or "slider". The second version is compressed with a normal optimized keyframe count that matches the web compression standard. This smaller version is loaded first and allows the user to view the swing right away because the bytes per second is significantly lower. The critical keyframe version is loaded behind the scenes immediately afterwards so the user can analyze the sports clip at any point. See also the action script files found below in the source code: SwingPlayer.as; FullscreenButton.as; MuteButton.as; ProgressBar.as; BigPlayButton.as; LoadingScreen.as; PlayPauseButton.as; KeyframeScreen.as; StandardScreen.as; and VirtualScreen.as.

The central server 21 provides connectivity between subscribers 12 and golf instructors 14. Subscribers 12 and golf instructors 14 log onto the central server 21 to communicate with one another. In order to log on, subscribers 12 and golf instructors 14 must provide a username and password. This security feature prevents unauthorized use by non-subscribing parties. The central server 21 also serves as a storage medium to which subscribers 12 and golf instructors 14 upload data. Such data may include but is not limited to video data and time delayed text or voice messages. Additionally, previous lessons may also be stored on the central server 21 to be retrieved by the subscriber 12 or golf instructor 14 for review at any time. Upon logging onto the central server 21, the subscriber 12 may be connected with a golf instructor 14 at random or select an available golf instructor 14. If the subscriber 12 has a preference for a particular golf instructor 14, the subscriber 12 may choose that golf instructor 14 if available or schedule a lesson at a time when that golf instructor 14 is available.

Once data is uploaded by the subscriber 12, the golf instructor 14 is able to access or download the data from the central server 21, and view and analyze the data representing the subscriber's swing using the second computer 20. The golf instructor 14 is able to provide real-time instruction to the subscriber 12. Such instruction may include but is not limited to altering the subscriber's 12 posture, stance, grip, tempo, and swing plane. Alternatively, the subscriber 12 can also choose to receive instruction through time delayed mediums when it's inconvenient for the subscriber 12 and golf instructor 14 to communicate in real-time. Additionally, the golf instructor 14 can also upload further video data onto the central server 21 for the subscriber 12 to view. This further video data includes but is not limited to marked up versions of the subscriber's original video data to highlight swing faults, or archived video data of swings with proper form for the subscriber 12 to use as visualization tools. Instruction may also be provided in real-time via live video cameras 16 connected at each end of the communication link. The golf instructor 14 will thus be able to provide real-time instruction to the subscriber 12 concerning grip, stance and swing as the subscriber 12 is practicing. The instructor may mark on the subscriber's video in real-time as it is played during the lesson, to illustrate points being made during a live lesson.

The golf instructor 14 is able to verbally communicate with the subscriber 12 by telephone or through online voice communication. The second computer 20 may have a second video camera 16 connected thereto and the golf instructor 14 can communicate with the subscriber 12 via video conferencing. The golf instructor 14 can also use online text or instant messaging to converse with the subscriber 12. If the subscriber 12 chooses to receive instruction through a time delayed medium, then the golf instructor 14 can send an instructional email or leave a voicemail for the subscriber 12. The golf instructor 14 may also replay the swing of the subscriber 12 and provide audio and visual instruction and commentary to the subscriber 12 during the replay of the swing. All communication between the subscriber 12 and the instructor 14 is stored on the central server 21 and is selectively accessible by each for later use. A benefit of utilizing web based communication is the ability to archive the conversations and lessons on a computer. By having previous conversations and video data archived, the subscriber 12 can review past golf lessons administered by the golf instructor 14. This allows the subscriber 12 to quickly remedy a swing fault that has been addressed by the golf instructor 14 in a previous lesson. This would also make golf lessons more efficient as the golf instructor 14 may review the previous lessons and thereby eliminate the need for the golf instructor 14 to repeat previous lessons with the subscriber 12 during a current session. Alternatively, the golf instructor 14 may use the review of lessons to reinforce previous instruction as a review in a subsequent lesson to ensure the subscriber 12 has made the necessary correction and also to compare the prior swing of the user to a current swing. The instructor 14 may also provide voice, text and/or video messages in the storage area for the subscriber 12 for later viewing in response to a request for instruction. The subscriber 12 can be notified of the stored message via telephone call, pager or email or any other suitable means of communication.

Figure 3:
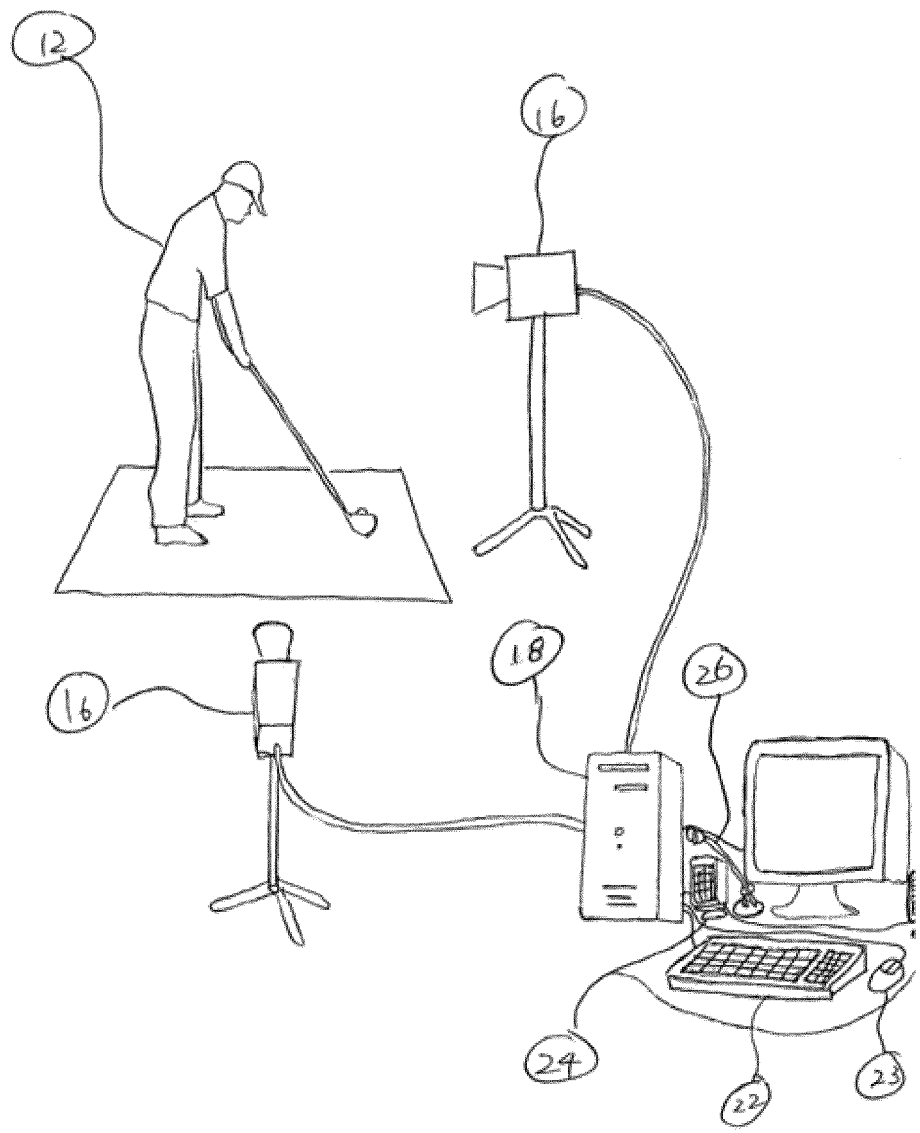
FIG. 3 is an illustrative view of the subscriber's camera and computer setup for one embodiment of the present invention.

FIG. 3 is an illustrative view of the subscriber's camera 16 and computer 18 setup for one embodiment of the present invention. Herein, two cameras 16 are connected to the first computer 18. Two cameras are shown for purposes of example. However, in practice any desired number of cameras 16 may be used to provide a full view of all angles of the swing of the subscriber 12. The subscriber 12 sets up the video camera 16 to capture video data of the subscriber's swing. The plurality of video cameras 16 can be oriented to capture video data representing the subscriber's swing from different angles to provide different perspective to the golf instructor 14. The subscriber 12 uploads the videos onto his computer 18. When the video is in digital format on the subscriber's computer 18, the subscriber 12 can log on to the central server 21 and upload the captured video data of the golf swing onto a central server 21 for the golf instructor 14 to download and analyze. The subscriber 12 can use the keyboard 22 and/or mouse 23 as input devices for logging onto the central server 21, generating messages to transmit to the central server 21 and instructor 14, editing video captured by the cameras 16 and navigating around and accessing data stored on the central server 21. The microphone 26 is provided for transmitting verbal messages to the central server 21 and communicating verbally with the instructor 14. The speakers 24 are provided to generate audible signals received from the instructor 14 and/or central server 21. The central server 21 also serves as a storage medium from which the subscriber 12 can download data. Such data may include previous lessons and other instructions provided by the golf instructor 14. The subscriber 12 can access the central server 21 to retrieve previously administered golf lessons for review at any time.

The central server 21 provides connectivity between subscribers 12 and golf instructors 14. Subscribers 12 and golf instructors 14 log onto the central server 21 to communicate with one another. The subscriber 12 may establish a live connection with a golf instructor 14 after logging onto the central server, thus allowing the subscriber 12 to display a golf swing live to a golf instructor 14 at the opposite end of the connection. The camera 16 may be adjusted or zoomed in to view any portion of the subscriber's swing such as the grip or foot position, or the camera 16 may be zoomed out to allow the viewing of the entire swing sequence. The golf instructor 14 may offer instruction to the subscriber 12 while viewing the video data in a live format.

The subscriber 12 can communicate with the golf instructor 14 by telephone or through online voice and/or text communication. To communicate by voice over the communications link, the subscriber 12 utilizes a microphone 26 and speakers 24 connected to the first computer 18. The microphone 26 will capture a voice message from the subscriber 12 for transmission of the message to the central server 21 and/or instructor 14. The speaker 24 will audiblize a message received from the central server and/or instructor. The subscriber 12 can also use online text messaging such as using an instant messaging software application to converse with the golf instructor 14 by utilizing the keyboard 22 and/or mouse 23. The subscriber 12 can also choose to send comments and questions, and receive instruction, through a time delayed medium such as email. The instructor may have an identical setup at the opposite end of the communication thereby allowing the instructor to communicate in a similar medium as the subscriber. In one preferred embodiment, the telephone communication uses VOIP for at least part that part of the telephone communication that interfaces with the system of the present invention.

By taking videos from multiple angles, the subscriber 12 provides the golf instructor 14 with a more detailed representation of his swing. For example, a video from a side view shows shoulder alignment and tilt, head position, width of stance, ball position relative to the subscriber's stance, and the club's shaft tilt. A video from the rear view reveals the golfer's spine angle, swing plane, knee flex, and arm position relative to the body. With this information, the golf instructor could more easily identify swing faults to provide more specific and accurate instruction to the subscriber 12. Additionally, videos from multiple angles also allow the subscriber 12 to see his own swing from different perspectives. Upon receiving the data representing multiple swing angles the instructor 14 can more completely aid the subscriber 12 and provide more complete instruction. As these different angles provide full views of each body part and swing, the golf instructor 14 is able to review each camera angle numerous times concentrating on different body portions and club positions during each viewing. This improves over live lessons as the golf instructor 14 is only able to view the swing once live or the subscriber 12 must repeat the swing numerous times. The subscriber 12 is also able to edit the video captured by the cameras 16 to provide views such as a split screen showing all views at once, zooming in on a particular portion of the user's body, hands, arms, feet, legs, etc., by manipulating the keyboard 22 and/or mouse 23.

Figure 4:
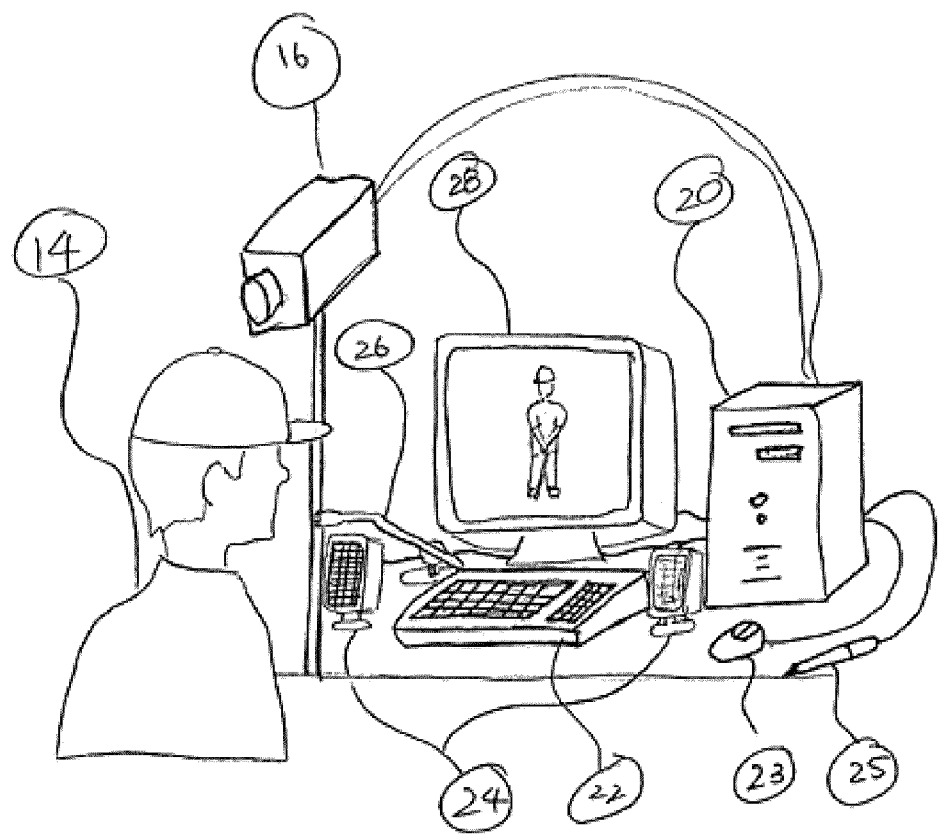
FIG. 4 is an illustrative view of the golf instructor's computer setup of one embodiment of the present invention.

FIG. 4 is an illustrative view of the golf instructor's computer setup of one embodiment of the present invention. The golf instructor 14 uses the second computer 20 to access or download data representing a subscriber's golf swing over the internet from the central server 21. The golf instructor 14 can then view the data representing the subscriber's golf swing on a display screen 28 connected to the second computer 20. The golf instructor 14 analyzes the video data and provides comments thereon. Alternatively, the instructor 14 may utilize a software application directed towards golf swing analysis when providing comments and/or instruction to the subscriber 12. The golf instructor 14 may provide written commentary on the video of the subscriber's 12 golf swing along with audio commentary describing the faults in the swing of the subscriber 12. The commentary may be provided in real-time over the established connection or recorded for later viewing by the subscriber 12.

A video camera or webcam 16 is connected to the second computer 18. The golf instructor 14 orients the video camera 16 to capture video data representing a golf swing, body position, a stance or a golf grip. The video camera 16 can also be oriented to capture video data of the golf instructor 14 from different angles to provide different perspectives. The captured video data is uploaded to the second computer 20 for processing thereof. Processing of the video data includes but is not limited to conversion from analog to digital format as well as compression of the video data for transmission thereof. When the data is in digital format on the second computer 20, the golf instructor 14 uploads the video data along with commentary and/or instructions to the central server 21 for viewing by the subscriber. The cameras 16 may be used by the instructor 14 to capture video of the instructor's wing or may simply capture the instructor 14 positioned at the computer 20 to conduct a video conference with the subscriber 12.

The central server 21 provides connectivity between golf instructors 14 and subscribers 12. Golf instructors 14 and subscribers 12 log onto the central server 21 to communicate with one another. The golf instructor 14 may establish a live connection with a subscriber 12 after logging onto the central server, thus allowing the golf instructor to display a golf position, grip or swing live to a subscriber 12 at the opposite end of the connection. The camera 16 may be adjusted or zoomed in to view any portion of the golf instructor's swing such as the grip or foot position, or the camera 16 may be zoomed out to allow the viewing of the entire swing sequence. The subscriber may ask questions to the golf instructor 14 while viewing the video data in a live format. Golf instructors 14 may be continually connected to the central server 21 during times they are available to conduct lessons thereby allowing subscribers to know exactly which instructors are available at any particular time and provide for immediate contact with a desired instructor.

Similarly, as discussed above regarding FIG. 2, a microphone 26, a keyboard 22, a mouse 23, and speakers 28 are connected to the second computer 20. The instructor 14 further has an electronic touch pen 25. The instructor 14 is able to utilize these elements to selectively communicate with the subscriber 12 and provide instructional comments and analysis thereto. The microphone 26 and speakers 28 are provided to establish audible communication between the instructor 14 and golfer. The keyboard 22 and mouse 23 can be used to log on and off the server, send text messages and emails, and edit the display as well as provide written commentary and analysis. The instructor 14 further has an electronic touch pen 25 that is utilized to draw on a touch sensitive screen to highlight certain parts of the screen to aid in instructing.

Figure 5:
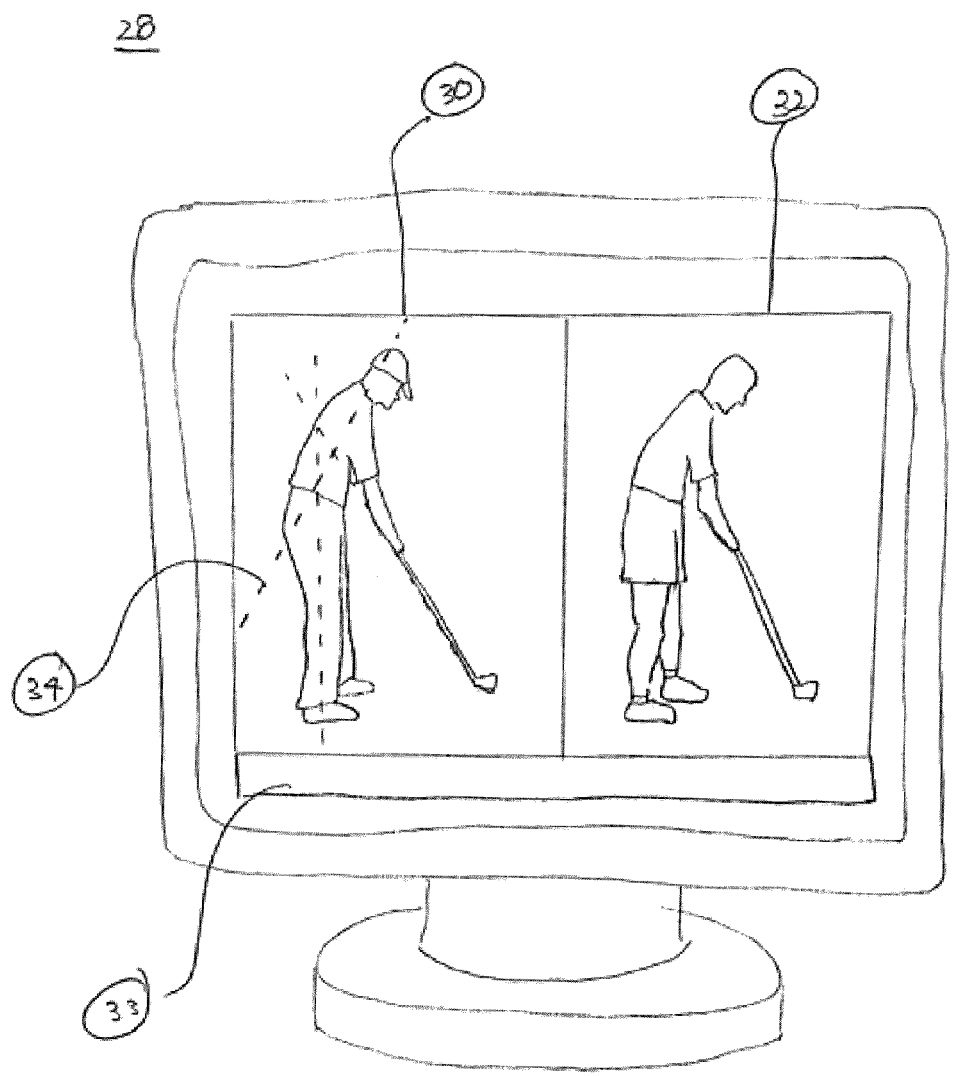
FIG. 5 is a detailed view of the display screen of one embodiment of the present invention.

FIG. 5 is a detailed view of the display screen 28 of one embodiment of the present invention illustrating a split screen showing an image of a golfer, possibly the subscriber 12, taking a swing and a view of a golfer illustrating a swing on the left side. The left side image is being analyzed during the lesson to show the proper form to be used. These images can be shown on both the displays of the first computer 18 and the second computer 20. After the subscriber 12 uploads the video data representing the subscriber's golf swing onto the first computer 18, the subscriber then logs onto the central server 21 and uploads the captured video data representing the subscriber's swing to the central server 21 for the golf instructor 14 to download and analyze. The golf instructor 14 sets up the second computer 20 to download the subscriber's video data from the central server 21. The golf instructor 14 can then watch the video data representing the subscriber's golf swing on the display screen 28 of the second computer 20.

FIG. 5 shows an exemplary view of the display which may be used by the instructor 14 during a lesson. In this view, the left side of the display screen 30 is dedicated to the professionals. The golf instructor 14 has the functionality of accessing digital frame by frame swings of PGA Tour players from different angles. The golf instructor 14 also has access to biodynamic statistics and measurements that mathematically describe the movement of the professional's swing. The right side of the display screen 31 is provided for amateurs. Depending on the level of membership, different features will be made available. Along the bottom of display screen 30 a rectangular information box 33 containing account information is provided. Account information includes but is not limited to the subscriber's 12 name, address, account balance, lesson timer and hyperlinks to golf instructions. Additionally, the information box 33 may be used to provide textual commentary during a comparison of the swings in the split screen.

Additionally, the golf instructor 14 is capable of making detailed analysis of the form of the subscriber's swing on a display screen 28. One way to critique the subscriber's swing with golf swing analysis software is to draw alignment lines 34 to analyze the deviation from ideal positions. The golf instructor 14 can supplement his verbal or text instructions to the subscriber 12 by utilizing the alignment lines 34. Alternative golf swing analysis methods compare and contrast the subscriber's swing on the left side of the display screen 30 with that of an ideal form swing on the right side of the display screen 32. By putting the two video images side by side, the golf instructor 14 can not only easily point out swing faults, but he can also show the subscriber what is needed to correct the swing fault.

Additionally, the subscriber 12 can take videos of his swing from multiple angles. By taking videos from multiple angles, the subscriber 12 provides the golf instructor with a more detailed representation of his swing. A video from a side view shows shoulder alignment and tilt, head position, width of stance, ball position relative to the subscriber's stance, and the club's shaft tilt. A video from the rear view reveals the golfer's spine angle, swing plane, knee flex, and arm position relative to the body. With this information, the golf instructor 14 could more easily identify swing faults to provide more specific and accurate instruction to the subscriber 12.

Additionally, videos from multiple angles also allow the subscriber 12 to see his own swing from different perspectives. The split screen may be used to show images from each angle together and synchronized on the screen 28.

Figure 6:
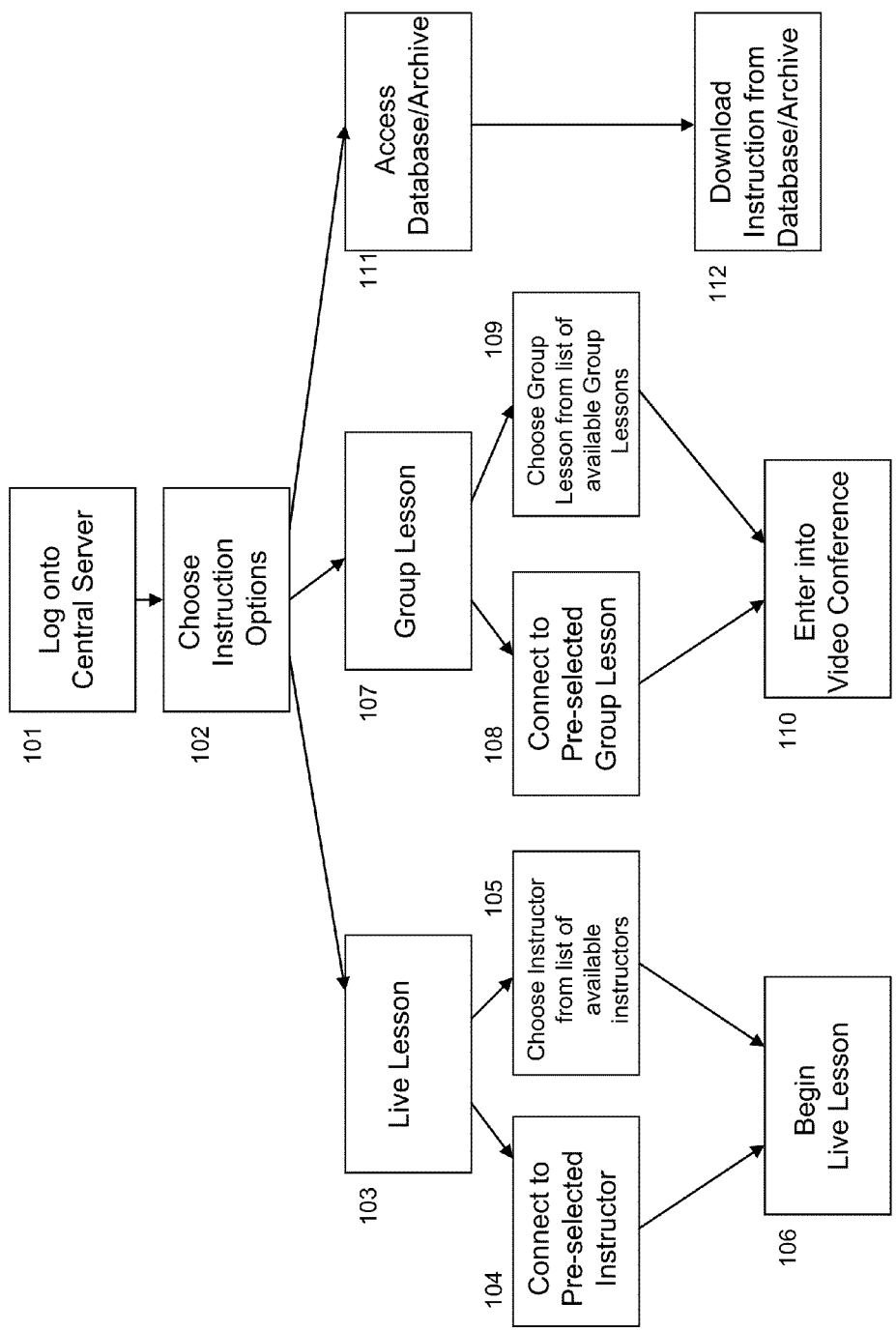
FIG. 6 is a flow chart of one embodiment of the present invention of the present invention.

FIG. 6 is a flow chart of one embodiment of the present invention of the present invention. In step 101 the subscriber 12 logs onto the central server 21 by entering a username and password to access the system. After logging onto the central server 21, the subscriber 12 chooses one of numerous instruction options in step 102. The choices include but are not limited to a live lesson, a group lesson, accessing the database/archive, schedule future lesson, download video for later analysis, on-the-run advice, etc. Items such as on-the-run advice are provided for users to obtain quick answers to specific questions. Such advice may be useful during a round of golf when a subscriber needs advice on how to hit specific types of shots with specific clubs (i.e. driving, hitting fairway woods and irons, putting, chipping, bunker shots, etc.) in different types of conditions (weather, type of lie, condition of greens, fairways, and rough). The on the run advice selection will allow either interactive advice from an instructor or access to the archives for a refresher lesson or a review of a lesson on the particular situation being encountered. When selecting a lesson, the lesson may provide a selection such as swing advice which will provide a professional's suggestion of a particular swing and aid a golfer in establishing a "game plan" tailored to the skill level and abilities of the subscriber for best results on the course. This selection will provide both standard game plans for a course or may involve a subscriber and instructor establishing a personal game plan. This option will also help a subscriber learn how to best prepare a game plan tailored to their skill level, the course to be played, and the course and weather conditions for the day on which the subscriber plays the course.

When the subscriber 12 selects the live lesson option, the subscriber is brought to step 103. At step 103, the subscriber 12 is provided two options. If the subscriber 12 had previously scheduled a live lesson with a particular golf instructor 14, the subscriber 12 selects the option to be directly linked to the live lesson with the scheduled golf instructor 14 in step 104. If the subscriber 12, however, has not previously scheduled a lesson, the subscriber 12 can select from a list of golf instructors 14 presently available to administer a lesson at the time the subscriber 12 is logged onto the central server 21 in step 105. The list of available instructors 14 is sorted by expertise. For example, one instructor may specialize in short game while another specializes in putting. Additionally, if the subscriber 12 is unfamiliar with the instructors 14 available, the subscriber 12 may click on a link to read a bio of the instructor(s) 14 as well as comments from other subscribers who have taken lessons from the instructor. After the subscriber 12 selects a golf instructor 14, the subscriber 12 is connected to a live lesson with the selected instructor 14 in step 106.

When the subscriber 12 selects the group lesson option in step 107, the subscriber 12 is provided two options. Similarly to the live one-on-one lessons, if the subscriber 12 scheduled a group lesson ahead of time, the subscriber 12 selects the option to be directly linked to the group lesson with the scheduled group and golf instructor 14 in step 108. If the subscriber 12, however, does not have a previously scheduled group lesson, the subscriber 12 can select an option from a list of group lessons that are available at the time the subscriber 12 is logged onto the central server 21 in step 109. The list of available lessons is sorted by in categories such as skill level and area of game covered. For example one group lesson my cover iron play for advance golfers while another specializes on gripping a golf clubs for beginners. If the subscriber 12 is unfamiliar with the lesson being offered, the subscriber 12 clicks on a link to read a brief description of the offered lesson as well as comments from other subscribers who have taken that particular group lesson. After the subscriber 12 chooses a group lesson to participate in, the subscriber 12 is connected to the group lesson in step 110.

If the subscriber 12 selects access the database/archive for general information or archived video data from previous lessons, the subscriber 12 is subsequently connected to the database/archive containing the information the subscriber previously stored and intends to view in step 111. The available general information and archived video data are cataloged in the system. The subscriber 12 can choose from a personal archive of lessons/notes or a general archive of lessons made available to all subscribers. The subscriber's previous lessons, instructions, analysis and game plans, as well as conversations and video data, are stored within the personal archive. The information and video data can be sorted by the subscriber 12 by skill level and/or particular area of the golf game, such as short game, iron play, or putting. Once the subscriber 12 selects a particular database, the subscriber can then either read the information and/or video data from the subscriber's 12 display screen 18 or the subscriber 12 can download the information and/or video data from the central server 21 onto the first computer 18 for future viewing in step 112.

Figure 7:
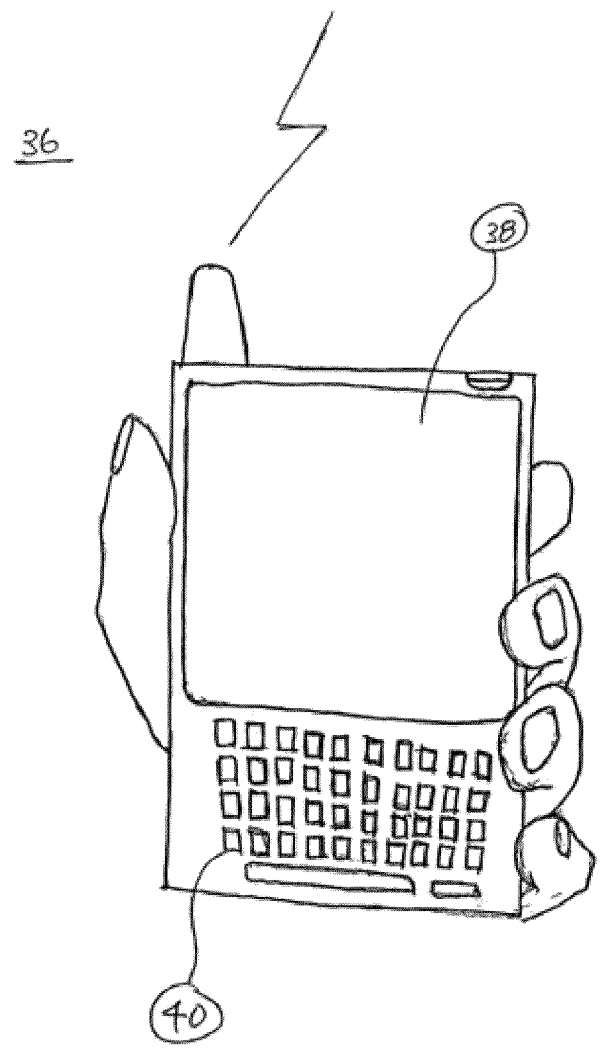
FIG. 7 is an illustrative view of a handheld device used in connection with one embodiment of the present invention for communicating with the central server and receiving information concerning golfing.

FIG. 7 is an illustrative view of a handheld device used in connection with one embodiment of the present invention for communicating with the central server 21 and receiving information concerning golfing. The handheld device 36 consists of a screen 38 and a keypad 40 and is used for communicating with the central server 21 and receiving information concerning golf. The handheld device may be a conventional Personal Desk Assistant (PDA) or smart phone which is able to access the internet. In a preferred embodiment the handheld device may be any handheld telephone or other communication device connected to an adapter to convert its signals to digital data for VOIP. In another preferred embodiment, the handheld device 36 connects to the central server 21 via wireless broadband. Alternatively, the connection may be established by dialup up on a cellular phone line, wireless connection to a network router and modem or any other known wireless connections. Alternatively, subscribers 12 may access the features of the system through a voice menu making selections to an audio menu using either audio commands or depressing keys on the alphanumeric keyboard. The subscriber 12 is able to access all features available through a similar connection described herein before with a computer such as club selection or the type of swing the subscriber should take depending on certain parameters including ball position and course conditions. Such information is available using the handheld device. However, the handheld device is normally used to obtain more immediate specific information and may be used in remote locations during play to receive advice on specific situations the subscriber is currently experiencing. In accordance with a preferred embodiment, as long as a wireless connection is available and the handheld device is capable of accessing the web and executing a web browser with multimedia and application player, such as the Adobe® Flash® Player plug-in, which allows for the execution of ActionScript sequences or similar embedded functionality in the web pages being displayed, the services of the system should be fully accessible. The information is provided from a subscriber-specific database. This information can further include notes and images from previous lessons administered by the golf instructor 14. Real-time information can also be provided over the internet to the handheld device by a golf instructor. Additionally, the subscriber 12 can utilize the handheld device 36 to communicate with the golf instructor either by voice or by text messaging. The compact size of the handheld device 36 makes it practical to be used while on the golf course, allowing the subscriber 12 to look up or receive instruction in real-time without geographic limitations. If the handheld device includes speaker phone, video capabilities and a camera, the subscriber will have access to all the function provided by the system and obtainable at any computer workstation.

Figure 8:
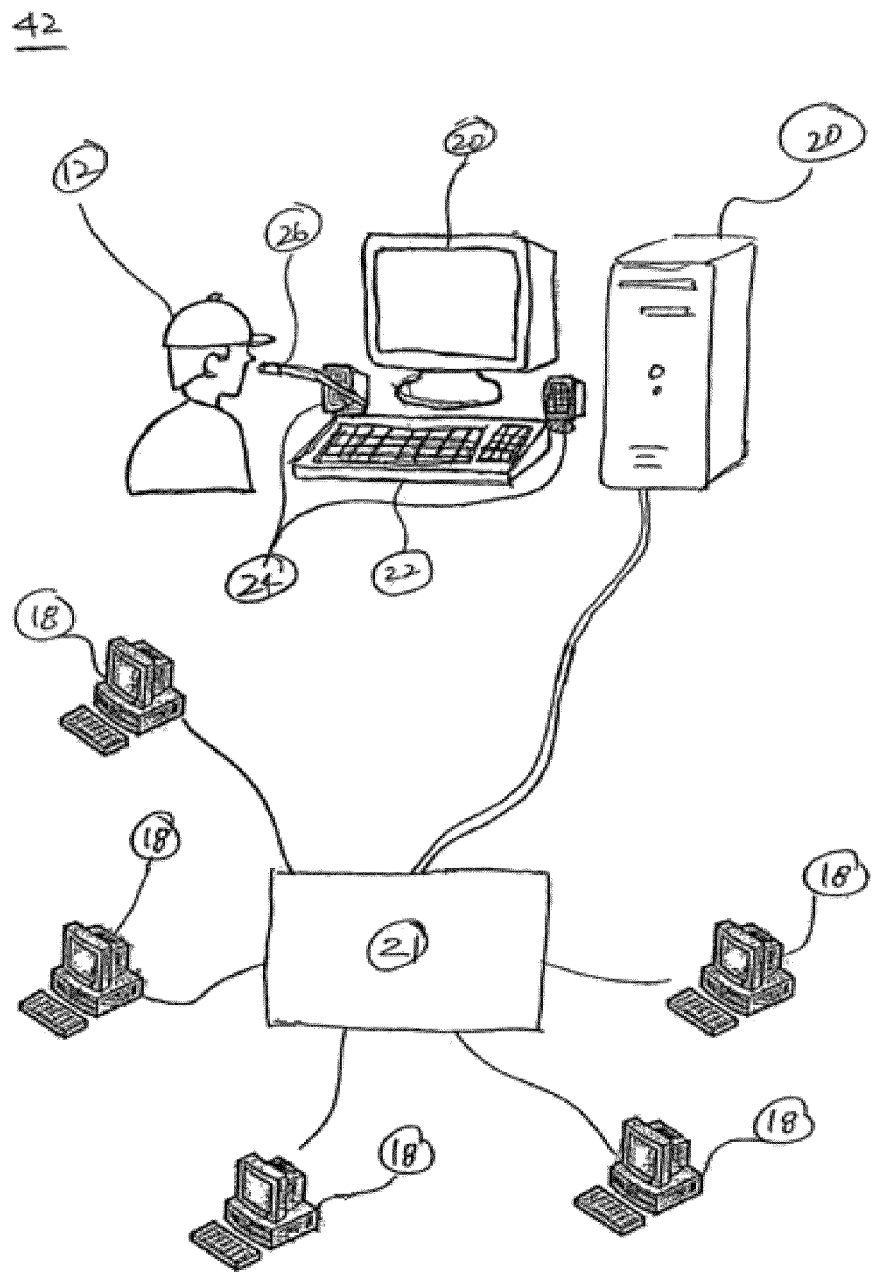
FIG. 8 is an illustrative view of a video conferencing setup for providing web based interactive group golf lessons in accordance with one embodiment of the present invention.

FIG. 8 is an illustrative view of a video conferencing setup for providing web based interactive group golf lessons in accordance with one embodiment of the present invention. Alternatively, the video conferencing setup may be used to establish chat groups between subscribers wherein subscribers may relay and share experiences with other subscribers. When being used for a video conference, the video conferencing system 42 consists of the second computer 20 on the instructor's end and two or more first computers 18 on the subscriber's end connected to the central server 21 for providing web based interactive group golf lessons. Alternatively, subscribers may connect directly to the central server 21 and may either establish or select a preformed chat group to join. Subscribers 12 at different locations and the golf instructor 14 are able to communicate with one another in real-time and/or delayed by logging onto the central server 21. Once logged on, the subscribers 12 are able to receive golf instructions from the golf instructor 14 while the golf instructor 14 is able to receive comments and/or questions from the subscribers. The subscribers 12 are able to +upload video data to the central server 21 for viewing and analysis by the instructor 14. The golf instructor 14 is able to perform video demonstrations by uploading videos to the central server 21 for viewing by the subscribers 12. All subscribers 12 logged into a group lesson or chat room are able to view and/or listen to all communication by any subscriber 12 or instructor 14 within the group lesson. All video conferences and chat groups are saved and cataloged on the central server so that subscribers may search the database and view the conferences or dialog from a chat group at a later time.

The golf instructor 14 and subscribers 12 are able to communicate by telephone, including without limitation VOIP telephony, or through online voice communication via the central server 21. To communicate by voice, the golf instructor 14 utilizes the microphone 26 and speakers 24 attached to the instructor's computer 20. The golf instructor 14 can also use text messaging to converse with the subscribers 12 by typing on the keyboard 22. The golf instructor 14 can also choose to send golf instruction, and receive question and comments, through a time delayed medium. The subscribers 12 and golf instructor 14 can exchange emails or leave voicemails for one another. A benefit of utilizing web based communication is the ability to archive the conversations on a computer. By having previous conversations and videos archived, the subscribers 12 can review past golf lessons administered by the golf instructor 14. This allows the subscriber 12 to quickly remedy a swing fault which has already been addressed by the golf instructor 14 in a previous lesson. This would also make golf lessons more efficient as it eliminates the need for the golf instructor 14 to review previous lessons with the subscriber 12 during a current session.

The ability to have a group of subscribers 12 taking web based lessons simultaneously with one golf instructor also has several benefits. One obvious benefit is the cost savings. While group lessons are offered at golf facilities today, it is a common occurrence that not enough subscribers sign up for group lessons to constitute a group, let alone enough subscribers of the same skill level. Offering group lessons through web based video conferencing eliminates the geographic limitations of having subscribers being from the same locale. With additional subscribers, it's also easier to create groups of the same skill level, thereby providing the most effective instruction for all subscribers. Furthermore, being exposed to the perspective of other subscribers of like skills can offer further insight on the golf instructions.

The present invention uses a "game plan" to summarize the lessons in a format that can be used on any course for the purpose of helping the subscriber 12 recall lessons while playing. In one embodiment, the subscriber 12 is provided with the option to establish a game plan for each type of shot and club tailored to the skill level and abilities of the subscriber for best results. In this embodiment, the game plan takes into consideration, but is not limited to, the following aspects of the subscriber's golf game: subscribers overall length with specific golf clubs (woods, irons, wedges), natural shot shape (draw, neutral, or fade), and playing to the subscriber's strengths (driving, iron play, short game, putting). The game plan instructs the subscriber 12 on how to execute a particular golf shot in specific conditions/situations. The golf game plan further allows the subscriber 12 to use previously learned lessons on any golf course. The game plan may be provided interactively with the system based upon the subscriber's answers to questions provided by the system concerning the subscriber's golf game or with an instructor in a personalized lesson. In one embodiment, the system may also provide guidelines so the subscriber is able to develop a personalized game plan on the run.

The system of the present invention also includes website development and membership plans. The website is hosted on the central server 21. Information that will be available on the website includes but is not limited to subscriber's 12 name, address, account balance, and hyperlinks to golf instructions. Other information stored on the central server 21 includes membership info, usage data, and referral data.

Figure 9:
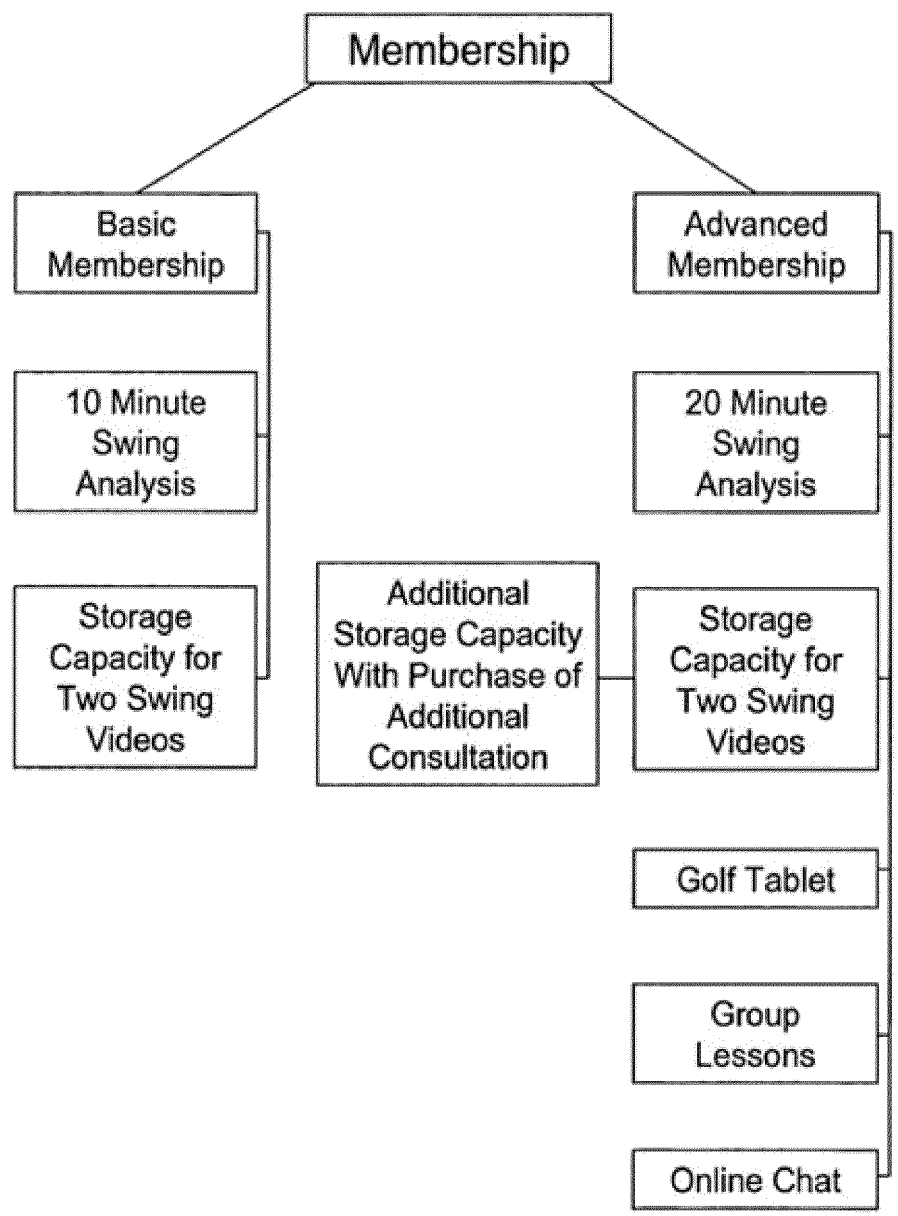
FIG. 9 is a chart of the membership structure of one embodiment of the present invention.

FIG. 9 is a chart of the membership structure of one embodiment of the present invention. The plan may include an initial a basic membership and an advanced membership. With an exemplary basic membership, a subscriber 12 may receive a 10 minute analysis and storage capacity for video data representing 2 swings. A subscriber 12 is further provided with storage capacity for two swing videos. With an advanced membership with different levels allowing access to different features, a subscriber 12 may receive a 20 minute initial swing consultation with the advisory staff. A subscriber is also has access to developing a customized game plan for course/training to suit the subscriber's needs. Additionally, with each additional 10 minute consultation booked by the subscriber 12, the subscriber 12 receives additional disk space to store two additional video data. The subscriber 12 also gains access to a golf tablet that stores each of the subscriber's lessons as well as allows the subscriber to view pro's swings for self analysis. Furthermore, the advanced membership provides access to group lessons as well as an online chat room. By offering a variety of memberships, a subscriber 12 can choose a membership that fits the subscriber's budget and needs. Additional memberships such as unlimited membership which may grant a subscriber with unlimited access and use of all system features are also provided.

Figure 10:
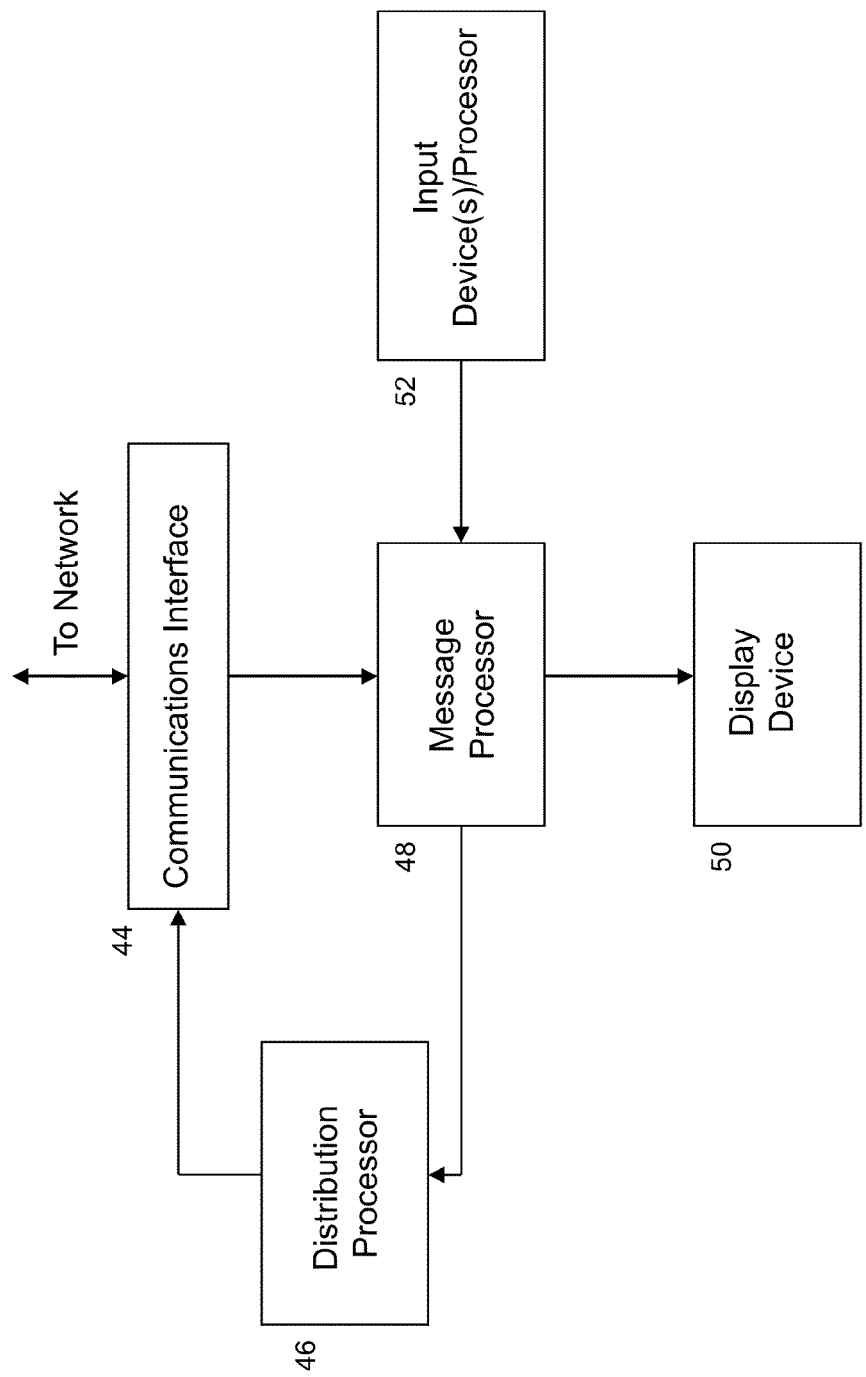
FIG. 10 is a diagram of the Internet compatible system for providing data representing golf instructions in accordance with one embodiment of the present invention.

FIG. 10 is a diagram of the Internet compatible system for providing data representing golf instructions in accordance with one embodiment of the present invention. The communication interface 44 receives a message which includes data representing a request for golf instruction from the distribution processor 46. The communication interface 44 transmits the data representing a request for golf instruction through the network, which connects the system to the subscriber end users. The data representing a request for golf instruction is sent by a subscriber 12. Such data may include but is not limited to text or video data. The message processor 48 examines the request provided by an input device/processor 52 and sends the request on to the distribution processor 46. The input devices/processors 52 include but are not limited to cameras 16, mouse 23, keyboards 22 and microphones 26. The subscriber 12, using the input devices/processors 52, sends a request to be linked to the desired instructional link. The subscriber 12 can choose to take individual lessons, group lessons, or review the archive. Once the subscriber 12 is linked to the system, the subscriber 12 can further use the input devices/processors 52 to send a video, text or audio request to the instructor 14. Upon receiving the data request, the instructor 14 can provide analysis in video, text, and or audio form to the subscriber 12 in the same fashion the subscriber 12 sends the request.

The message processor 48 also provides the signal to generate a display image on display devices 50 such as monitors, televisions or projectors. The display image provides a visual aid to the subscriber 12 thus allowing the subscriber to make requests through the input devices/processors 52. The signal to generate a display image may also comprise a video used for analysis.

Figure 11:
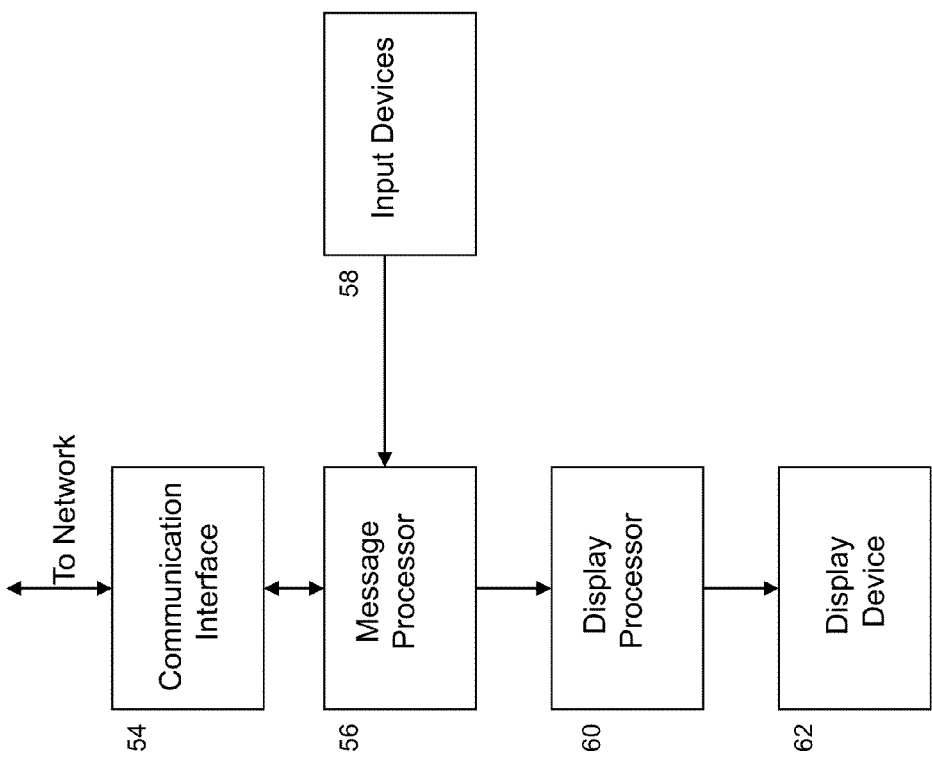
FIG. 11 is a diagram of the interactive system for receiving data representing golf instructions of one embodiment of the present invention.

FIG. 11 is a diagram of the interactive system for receiving data representing golf instructions of one embodiment of the present invention. A display processor 60 generates a user interface display image on a display device 62 such as a monitor, television or projector, enabling a user to enter a request to receive golf instructions. The display image provides a visual aid to the subscriber 12 thus allowing the subscriber to make requests through the input devices/processors 58. The signal to generate a display image may also comprise a video used for analysis. A message processor 56 receives data representing a request for golf instruction entered by a user via the input devices 58. The input devices/processors 52 include but are not limited to cameras 16, mouse 23, keyboards 22 and microphones 26. The subscriber 12, using the input devices/processors 52, sends a request to be linked to the desired instructional link. The subscriber 12 can choose to take individual lessons, group lessons, or review the archive. The communication interface 54 processes the request received from the message processor 56 to provide a formatted request message for communication and initiates communication of a formatted request message to a destination system. The communication interface 54 also receives a message responsive to the communicated formatted request message, and initiates the communication of the responsive message to said user. The communication interface 54 further transmits the data representing a request for golf instruction through the network, which connects the system to the subscriber end users. Data requests are sent from the communication interface 54 through the network. Additionally, analyses are also received by the communication interface 54 from the network.

A Preferred Embodiment

In a preferred embodiment, a lesson includes one or more subscribers who access the system from their subscriber computers. The subscriber computers execute web browsers that run a multimedia and application player, such as the Adobe Flash Player, which can play a variety of media files and perform executable applications written in the scripting language ActionScript.

Any personal computer, laptop, notebook, or handheld device capable of executing software that provides access to the network, a web browser, and multimedia player support may function as the subscriber computer or client processor. The lesson is conducted over the internet by an instructor acting as the host at an instructor computer running a web browser with multimedia player and utilizing VOIP communication and/or a computer microphone and a web or other camera. Any personal computer, laptop, notebook, or handheld device, including cell phones and personal digital assistant devices, capable of executing software that provides access to the network, a web browser, and multimedia player support may function as the instructor computer or client processor.

The lesson is managed by a central server. In one preferred embodiment, the functionality of the central server may be logically partitioned as comprising a Web Server, a Communication Server, a Phone Server, and optionally a VOIP Gateway. A unique identifier is assigned to a lesson when the lesson is originally scheduled, and the participants in the lesson are sent a notification that includes the unique identifier. In one preferred embodiment, the unique identifier is a key generated by the web server managing the lesson, using a hashing technique such as the MD5 algorithm for generating a 32-hexadecimal-digit key. The notification may be sent by email, text message, or by any method that provides a convenient way for the subscriber to access the lesson, and may include, for example, a link to the web page for the subscriber user interface to the lesson. One participant, the instructor, is designated as host of the session by virtue of that participant's role in the system. The data transferred among participants includes at least video and audio. At times during the session, the host may designate existing video files, may create text messages, and may select a participant's web camera feed or still images to be played or displayed to participants.

Data streams produced by participants during the lesson are recorded as raw data files at the web server that manages the lesson, at the communication server that receives web cam videos, and at the phone server. Each of the various data streams recorded or played during a lesson is associated with the unique identifier generated for the lesson. Each file recorded during the lesson is saved as a file accessible by a request to the web server, the communication server, or the phone server. The data streams may include audio, video, graphics and text message data created during a lesson. Media files created prior to a lesson may also be played or displayed by the host during the lesson. At the end of the lesson, a lesson data file is saved. The lesson data file includes commands that manage each event that occurred during the course of the lesson and that request and identify each of the existing media files sent to participants during the lesson. The VOIP telephone conversation may be recorded by the phone server in a raw format for audio data such as the way file format developed by Microsoft and IBM. At the conclusion of the lesson, the file may be recorded into a format more convenient for later playback, such as the mp3 file format.

The webcam digital streams from the participants are sent to and distributed by the communication server. When a webcam stream is selected by the instructor for display to all participants on the view screen, the stream being sent is recorded by the communication server. The webcam streams may be sent and recorded as flv (Flash® Video) format, or in any other format suitable for storage of video data and later playback by commonly available video player software. In one embodiment of the present invention, the system uses the TrueMotion VP6 video codec, software that enables video compression and/or decompression for digital video, developed by On2 Technologies. Another embodiment would instead follow the video compression/decompression standards of H.264/MPEG-4 AVC. Both may be implemented by Adobe's ActionScript Frameworks.

As the instructor uses the mouse or similar input device to draw on the view screen to call attention to a significant part of a playing video, the operating system on his computer captures the changing mouse positions. The mouse positions may be captured as vector graphics commands to allow the same drawing to be generated on the view screen of each participant in the lesson. However, the application software for the invention will save the mouse position data only at discrete time intervals, or time quanta, currently set to 40 ms., and will discard all interim mouse position data. Use of this time quantum setting enables the system to accurately capture the drawings on the screen with reasonable resolution, without creating an unduly large and inefficient drawing data file. The drawing commands that produce the vector graphics for display on the view screen may be sent to and saved by the communication server as xml data that contains swf commands executable by a Flash® Player.

SWF file format is a partially open repository for multimedia and especially for vector graphics under the control of Adobe. SWF files can be played by the Adobe Flash Player, working either as a browser plugin or as a standalone player. SWF files can also be encapsulated with the player, creating a self-running SWF movie called a "projector".

Other commands that affect the data being seen by participants in a lesson, such as text passages input by the instructor, or commands that split the screen display, may similarly be saved at the communication server as xml data.

Still images captured and displayed during a lesson may be sent by the instructor to the web server as JPEG files, or in similar formats suitable for storage of image data. The still images may be associated with text passages input by the instructor.

The video files that were previously uploaded by subscribers, (swing videos), may be stored on the web server as fly files. When the files are uploaded by subscribers, they may be recorded as flv files, using a frame rate suitable for replay over an Internet connection, or in a similar format suitable for later replay over the Internet. Again, in one embodiment of the present invention, the system uses the TrueMotion VP6 video codec, in another embodiment the system could instead follow the video compression/decompression standards of H.264/MPEG-4 AVC.

In a typical lesson, the instructor may display a first video of a golf swing that was previously recorded by a subscriber and uploaded to the instructor for analysis. While discussing the video, the instructor may create drawn graphics on the video by drawing on the screen with a mouse or similar input device as the video plays, to indicate relevant features of the video and to recommend changes in the student's performance. The instructor may also demonstrate techniques using a web camera (web cam) to broadcast streaming images to the other participants. A subscriber can transmit web cam images of his own performance when that subscriber's web cam feed is selected for broadcast by the instructor. The instructor may also select a snapshot or still image for broadcast to illustrate some point. As the lesson progresses, the instructor may save still images from the screen along with text of significant points to remember as "tips." A still image may be associated with a saved tip as part of a student Game Plan for later display.

In accordance with one preferred embodiment, a lesson data file is created that identifies each media file used in or created during the lesson, and the time in the lesson at which each media item was played, paused, rewound, or skipped to a particular position. The lesson data file also references the VOIP main audio file. The features described herein as comprising a typical lesson may be applied to many other types of interactions in which a plurality of participants interact and exchange media, and the example given is meant to characterize but not to limit the utility of the system described.

Figure 12:
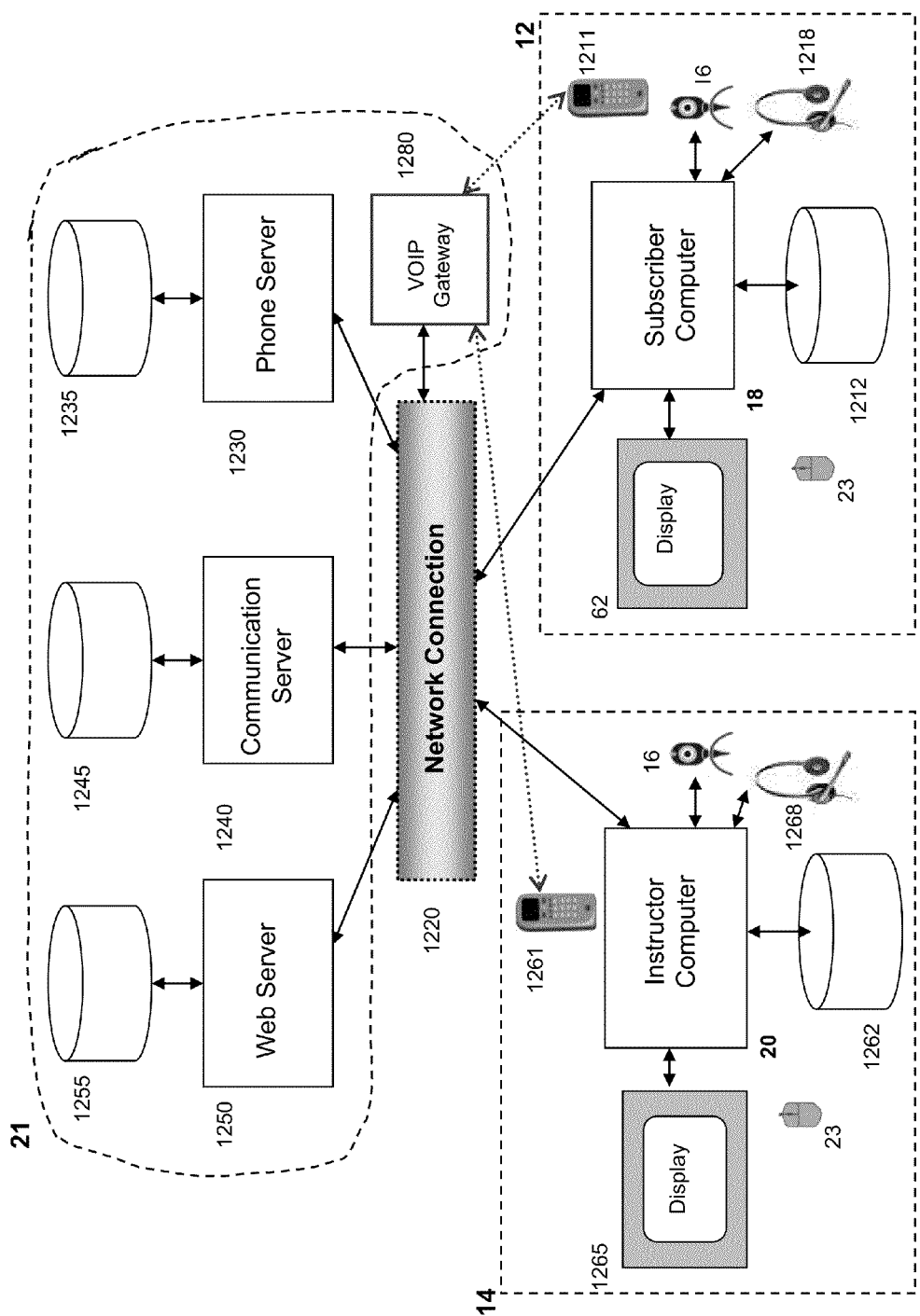
FIG. 12 is a block diagram of the logical structure of a system for providing real-time interactive golf instruction in accordance with one embodiment of the present invention.

FIG. 12 is a block diagram of the logical structure of a system for providing real-time interactive golf instruction in accordance with one embodiment of the present invention. In this preferred embodiment, the instructor uses the instructor computer 20, which is suitably connected to a video display 1265, a file system 1262, a VOIP telephone 1261, and optionally to a web camera 16. Each subscriber or student uses a subscriber computer 18, which is suitably connected to a video display 62, a file system 1212, a VOIP telephone 1211, and optionally to a web camera 16. The instructor computer and each subscriber computer are electrically connected to a network connection such as the Internet 1220. The instructor computer and each subscriber computer run a multitasking operating system and a graphically enabled web browser, through which they interact with the Internet. The executable procedures of the system described herein execute under a browser and utilize a commonly available multimedia and application player, such as the Adobe® Flash® Player plug-in, which is capable of executing ActionScripts or similar executable procedures embedded in web pages. The instructor computer and the subscriber computers may act as clients of a central server 21, which comprises a web server 1250, a Communication Server (Comm Server) 1240, a Phone Server 1230, and may comprise a VOIP Gateway 1280.

The web server 1250 is provided for managing the lesson and may be connected to a database 1255 and to the Internet 1220. The web server may be a computer that runs a general purpose HTTP server, such as the Apache HTTP Server developed by the Apache Software Foundation, under a general purpose operating system such as Linux and using a database management system such as the MySQL relational database manager provided by MySQL AB, a subsidiary of Sun Microsystems. The web server is able to connect to each of the participants and to a database. The web server is able to process requests received from clients and send back organized constructed content from the database and from its file system to each client processor. The Communication Server 1240 (Comm Server) is provided for managing the transfer of digital information among the instructor and students and is connected to a file system 1245 and to the Internet 1220. The Communication Server may be a computer that runs a multimedia and data server with scripting capability for server-side scripts and remote procedure calls, such as the functionality provided by the Adobe® Flash® Media Server. The Comm Server is able to accept, controls and terminate all transfer of digital information with each participant during the session in real-time.

The Phone Server 1230 for listening for incoming connections from each participant's VOIP telephone and receiving and managing VOIP data is connected to a file system 1235 and to the Internet 1220. The phone server may be a computer that runs an Internet Protocol-PBX software package to handle switching control of VOIP communications, such as the Trixbox® telephony application support software developed by Fonality. The phone server is able to listen for incoming connections from each participant's telephone, accept and record VOIP data, and communicate VOIP status to the communication server.

If the instructor and subscriber wish to communicate using conventional phones or cell phones rather than soft phones on their computers, a VOIP Gateway 1280 is able to provide a connection between the conventional phone service and the Internet or network. The VOIP Gateway may be a device or service provided by a third party such as Telasip, Inc.

The logical separation and identification of the servers shown in the diagram does not necessarily reflect their physical configuration, and other configurations may be contemplated as long as the functions set forth herein are able to be performed.

Figure 13:
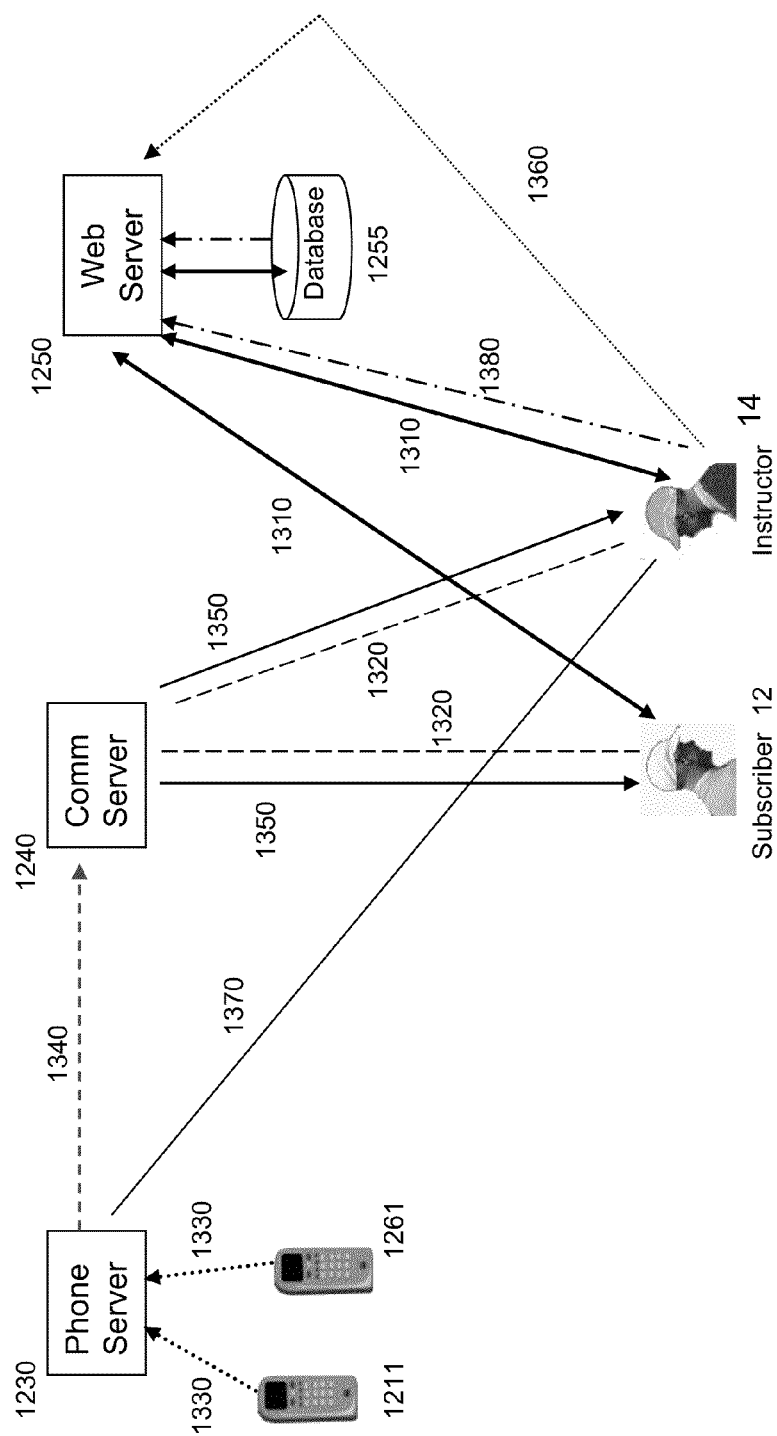
FIG. 13 is an exemplary diagram showing interactions between the instructor, the subscriber, and the system during a real-time interactive golf lesson in accordance with one embodiment of the present invention.

FIG. 13 is an exemplary diagram showing interactions between the instructor, the subscriber, and the system during a real-time interactive golf lesson in accordance with one embodiment of the present invention. In this preferred embodiment, although only one subscriber 12 is shown, multiple subscribers may participate in a lesson. The sequence of operations performed is similar for each subscriber participating in a lesson. The logged in instructor 14 and subscriber 12 can request the lesson interface web page, identification key, and the swing video from the Web Server 1250 via messages 1310. Via messages 1320, the instructor 14 and the subscriber 12 are able to establish a real-time lesson connection with the Communication Server 1240 by providing the identification key. In one embodiment, the system uses the RTMP protocol supported by Adobe, Inc., which supports a persistent connection to enable the use of streaming video, but alternative protocols may be used. Signal 1330 represents the instructor 14 and the subscriber 12 calling the number provided in the interface, using their telephones 1211, 1261 to establish the real-time lesson connection. The phone signals are then routed to the Phone Server 1230. When all logged in participants have called the phone server 1230, the phone server 1230 may begin recording the conversation and may instruct the communication server 1240 to start the lesson via message 1340. The Comm Server may then send a message to the instructor 14 and to each subscriber 12 that the lesson is beginning, indicated by signal 1350. At the completion of the lesson, the instructor 14 may send Game Tip media to the web server 1250, to be converted into the proper format for later display and saved on the web server 1250, as indicated by the message 1360, The instructor 14 may then send a message to the phone server 1230 to indicate that the lesson has ended, indicated by signal 1370, and the phone server 1230 is able to convert the recorded phone conversation to a format suitable for storage on the phone server 1230 and for later replay upon request. The instructor 14 may also notify the web server 1250 that the lesson has terminated as indicated by signal 1380, and the web server 1250 can then save the lesson transmissions to the database and the Game Tips for later replay upon request.

Figure 14:
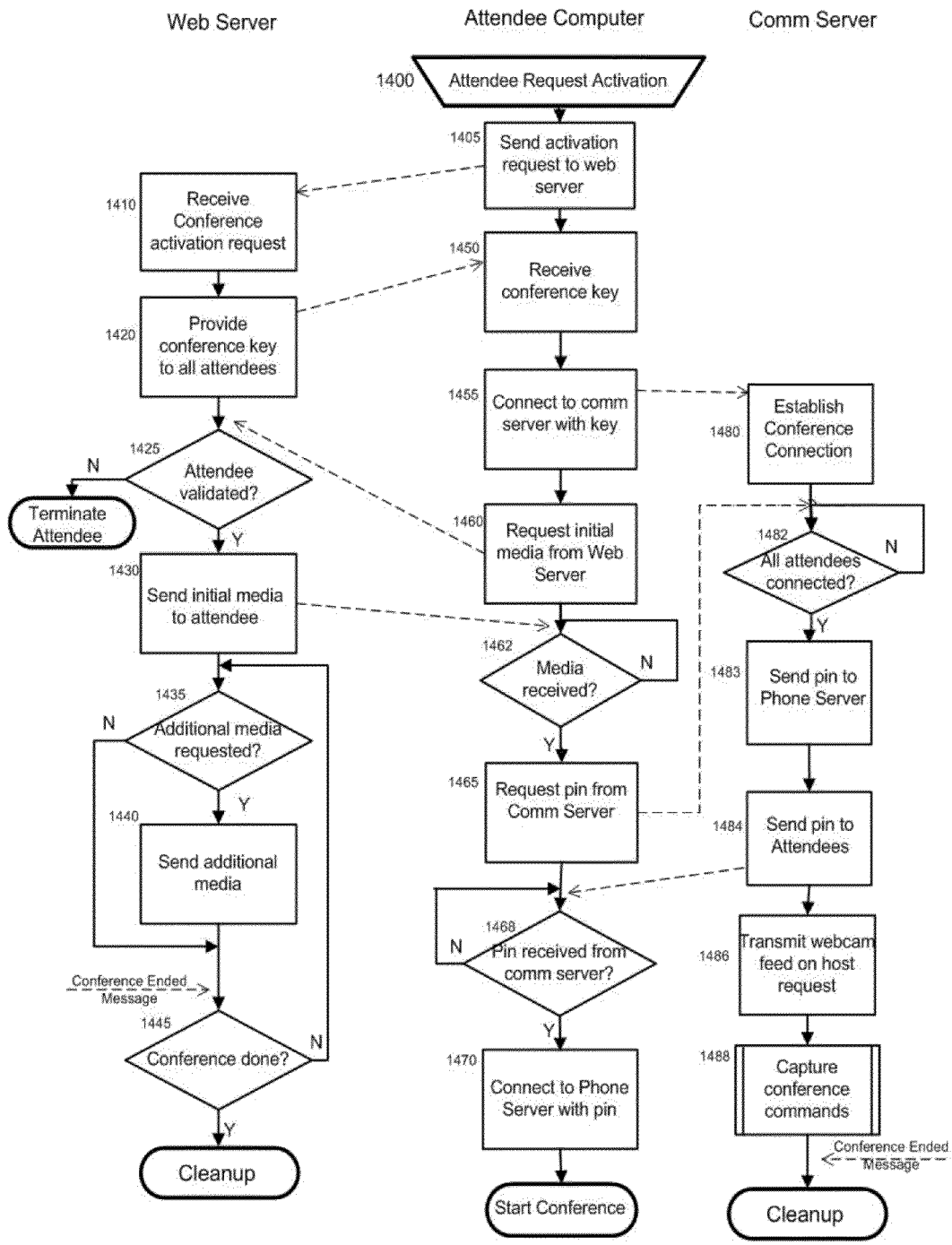
FIG. 14 is an illustrative flow chart of the logical operations of some of the processors for providing a real-time interactive golf lesson in accordance with one embodiment of the present invention.

FIG. 14 is an illustrative flow chart of the logical operations of some of the processors for providing a real-time interactive golf lesson in accordance with one embodiment of the present invention. It also shows the operations and interactions of the web server, the application software executing on an attendee computer, and the communication server. The operations and interactions represent one preferred embodiment of the invention when an attendee (instructor 14 or subscriber 12) requests activation of a live lesson or conference (step 1400). In one preferred embodiment activation involves a live process activation. The attendee may activate a control on his user interface to request the lesson. A message requesting conference activation is sent from the attendee computer to the web server (step 1405). In step 1410, the web server receives the activation request. In step 1420, the web server sends the conference key to the requesting attendee. In step 1450, the attendee receives the conference key. In step 1455, the attendee computer uses the conference key to request connection with the Communication Server. In step 1480, the communication server establishes a conference connection for any requesting attendee, using a persistent protocol such as RTMP. The attendee requests download of the initial media from the web server (step 1460). The web server checks (step 1425) that the attendee is validated to participate in the lesson before sending the requested media. If the attendee is not on the list of allowed participants, no content will be sent and the application will not continue for the invalid attendee (step 1428). If the attendee is valid, in step 1430 the web server sends the initial media to the requester, including the user interface page, associated executable procedures, and the initial swing video. After receiving the initial media, the attendee computer requests a pin for the telephone conference call from the communication server in step 1465. In step 1482, the communication server tests whether all attendees have connected to it. When all attendees are connected to the communication server, in step 1483 the communication server determines an available pin for the telephone conference call and sends the pin to the Phone Server (not shown in this diagram). In step 1484, the communication server sends the pin to the requesting attendee. When the pin is received from the communication server, the attendee computer uses the pin to connect to the Phone Server in step 1470. When the phone server determines that all participants who have requested activation and been validated have successfully called in, the conference can begin. In step 1486, the communication server transmits the webcam feed from the host computer in response to a host request that it be made available to other attendees. During the lesson, the communication server captures all commands from the host (step 1488), as well as all transmitted webcam feeds. During the lesson, the web server listens for requests for additional media from the host (step 1435) and sends the requested media (step 1440). When the host ends the conference or lesson by ending the telephone call (not shown), a message is sent to the web server and to the communication server that the conference has ended. The communication server terminates the connection, and sends the captured command data to the web server. The web server then does necessary housekeeping to properly format, identify, and save the conference data for later replay.

Figure 15:
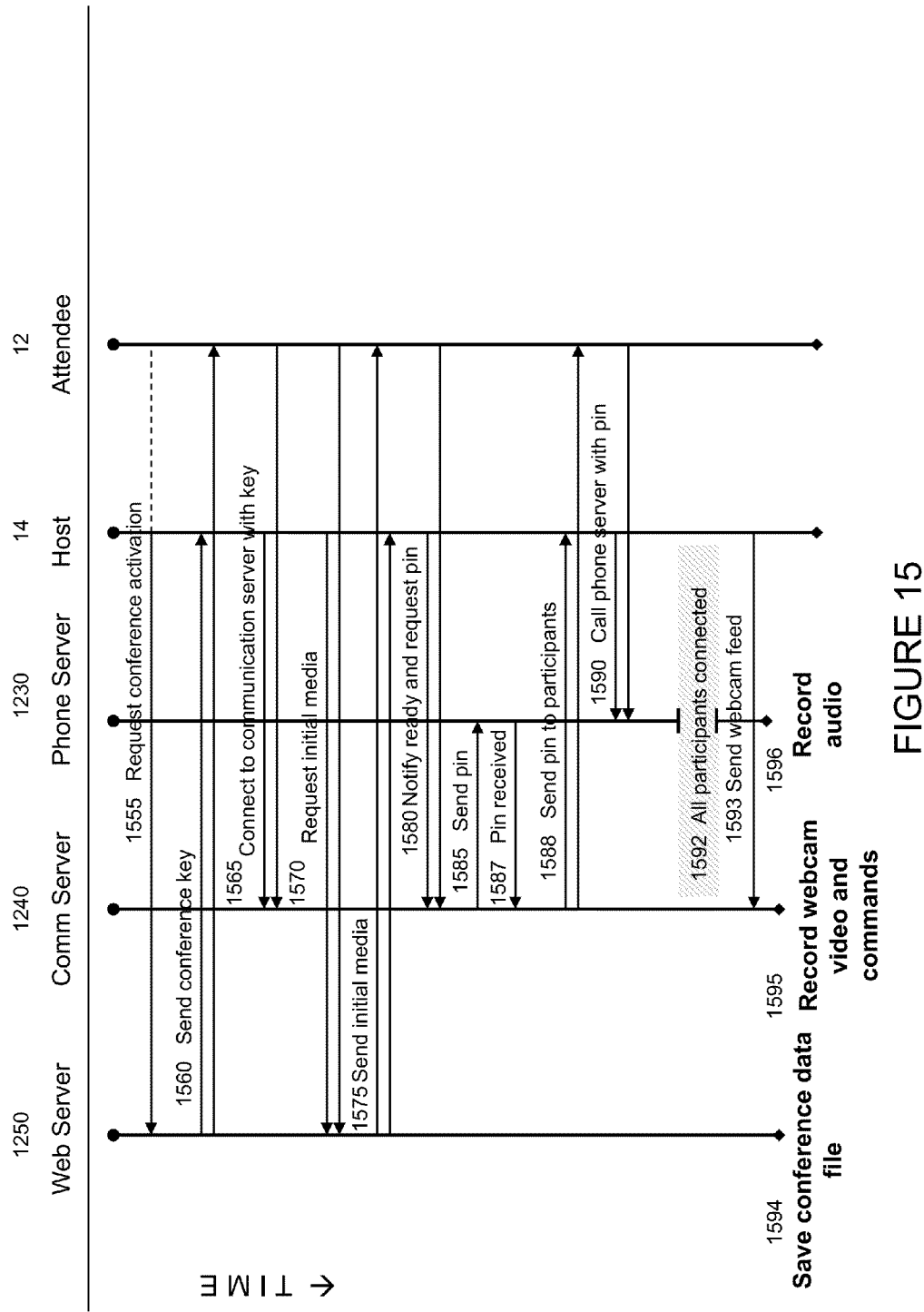
FIG. 15 shows an exemplary sequence diagram of the processes performed by the various processors in initiating a real-time interactive group golf lesson in accordance with one embodiment of the present invention.

FIG. 15 shows an exemplary sequence diagram of the processes performed by the various processors in initiating a real-time interactive group golf lesson in accordance with one embodiment of the present invention. In this preferred embodiment, an instructor and a list of identified subscribers have a scheduled lesson or conference. The instructor (host) 14 or one of the subscribers (attendees) 12 requests activation of the conference from the web server 1250 in step indicated by signal 1555. The web server responds by initializing a conference file and sending a conference key to each attendee and the host as indicated by signal 1560. The key is a unique 32 byte value generated according to known techniques, for example, by using the MD5 hash technique or a similar cryptographic hash function. The key is generated by the web server when a conference is scheduled by the host. The key is used throughout the system to reference a particular conference. Each participant then connects to the communication server using the conference key as indicated by the signals 1565 and automatically requests the conference initial media (for example, the initial golf swing video to be evaluated) from the web server as indicated by signal 1570. The student when he/she requests a lesson identifies the initial media to the server. The web server retrieves the initial video from its database and sends it to each participant (signal 1575). Each participant notifies the communication server that the initial media has been received and requests a pin for the telephone call as represented by signal 1580. When the communication server determines that all attendees are connected, it selects an available pin for the telephone conference call and sends it to the phone server as indicated by signal 1585. After the phone server responds that it has received the pin by signal 1587, the communication server sends the pin to each participant as shown by signal 1588. Each participant then calls the phone server with the telephone pin to begin the conference conversation as shown by signal 1590. At 1592, all participants have called in with the pin and been connected to the phone server, and the lesson can begin. The host sends the webcam feed to the communication server as indicated by 1593, to be sent to all attendees. During the conference, the phone server records all audio from the VOIP telephone conversation as indicated at 1596. The communication server saves all webcam video that is sent to conference attendees and all commands from the host during the lesson as shown at 1595. At the end of the conference, the web server saves the conference data file, which is a record of all events during the lesson that affect data transmitted to the participants. The present invention can also utilize audio for other sources, such as audio from the computer's microphone.

Description of One Preferred Embodiment of a Session

Figure 16:
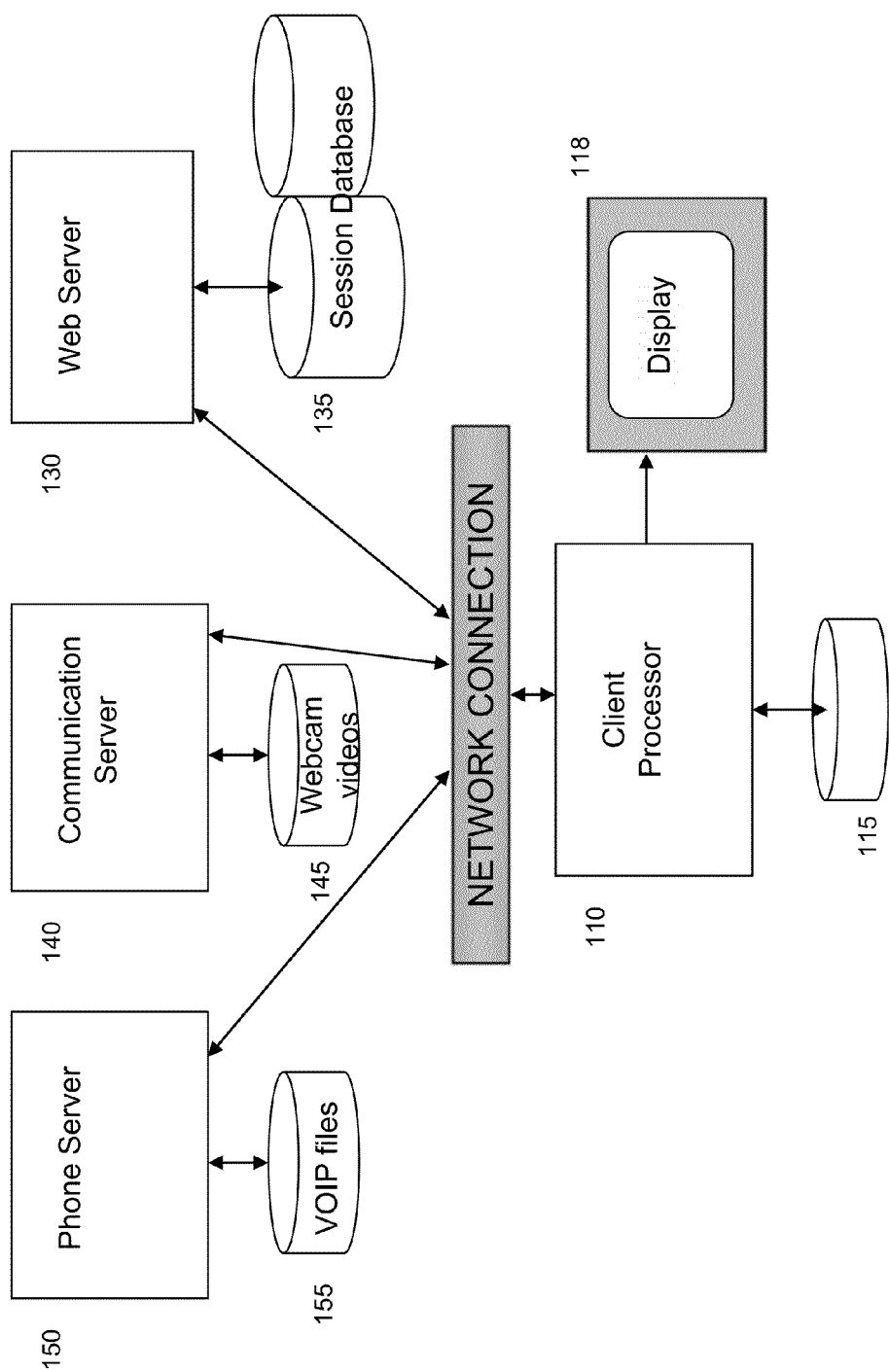
FIG. 16 shows an exemplary a block diagram of a playback control system in accordance with a preferred embodiment of the present invention.

FIG. 16 shows an exemplary a block diagram of a playback control system in accordance with a preferred embodiment of the present invention. In this embodiment, a session includes at least two participants. Personal computers, laptops, notebook computers, or any handheld device capable of executing software that provides access to the network and a web browser with multimedia player and application support may function as the participant, or client, processor. In this preferred embodiment, the session is conducted over the internet or a similar network by a host at a client processor 110 running a web browser with multimedia player and utilizing VOIP to support audible conversation, and an optional web camera to support live video. The session is managed by a web server 130. A unique identifier is assigned to each session when the session is originally scheduled, and the participants in the session are notified of the identifier. Participants in the session communicate via VOIP telephony, managed by a phone server 140. Participants are also connected via a communication server 150. During the session, the host may designate existing video files for play, may draw on the view screen using vector graphics, may create text messages, and may select his own or another participant's web camera feed or still images to be played or displayed to all participants.

The various data streams produced by participants during the session, audio, video, graphics and text, are recorded as raw data files at the web server that manages the interactive session, at the communication server 140 that receives web cam videos, or at the phone server 150 that handles the VOIP conversation. Each of the various data streams recorded or played during a session is associated with the unique session identifier that was generated for the session. Each file recorded during the session is saved as a file accessible by a request to the web server, the communication server, or the phone server. Media files created prior to a session and played or displayed by the host during the session are also identified as part of the session. In particular, one video file selected by the host is designated as a first video that is the first one broadcast to participants, although additional videos may be broadcast at other times during the session. When additional media files are designated for play or display, the designated file is downloaded to all participants, and a progress message is shown until the file has been received over the slowest participant connection. The time at which the requested media file has been successfully downloaded to the last participant is noted as the Max Download Time for the requested file. At the end of the session, a Session Data File is saved. The Session Data File includes commands that manage each event that occurred during the course of the session and that request and identify each of the existing media files associated with the session.

Creation of a Typical Lesson

One session with the features described above that is used in a preferred embodiment of the present invention is an on-line interactive lesson teaching golf skills. As an exemplary embodiment of the invention, the system can be implemented for playback of such a lesson via an internet connection. The lesson may be an individual or group lesson. A unique lesson identifier is sent to each participant in the lesson. Audio connections are provided via a phone server supporting VOIP. In the lesson, a student can demonstrate his swing for the instructor over a web cam, or the instructor can play a prerecorded video of the student's swing that has been previously uploaded to the system database and made available to the instructor for analysis. The instructor can use on-screen drawing tools to draw on the video as it plays to indicate improvements to the student's stance, address, swing arc, etc. while providing verbal commentary as the pre-recorded video plays. The instructor can also provide an exemplary swing from a database of available video files, and can place the exemplary swing in a full screen or a split-screen view to illustrate significant differences between the student's swing and the exemplary swing, noting the differences with on-screen drawing tools. The student may respond with questions, comments, and another web cam swing. The instructor may also provide tips and suggestions, either created in real-time or played from pre-existing files. In a group lesson, additional student videos, questions, and comments may be provided before or during the lesson for additional instructor comment. A student or instructor may request playback of the lesson at his own location any time after completion of the lesson by logging in and sending a request containing the unique lesson identifier to the web server.

In a typical lesson in accordance with a preferred embodiment of the system, the instructor displays a first video of, for example, a student golf swing that was previously recorded by a student and uploaded to the instructor for analysis. While discussing the video, the instructor draws on the screen with a mouse or similar input device as the video plays, to indicate relevant features of the video and to recommend changes in the student's performance. The instructor may also demonstrate techniques using a web camera (web cam) to broadcast streaming images to the other participants. A student participant can also transmit web cam images of his own performance when selected for broadcast by the instructor. Other students may also contribute comments and questions, as well as their own web cam images. The instructor may also select a snapshot or still image for broadcast to illustrate some point. A still image may be associated with a saved tip as part of a student Game Plan for display during playback at the end of the session. The instructor may close with another pre-recorded video offering some final tips to reiterate instructive points.

In accordance with preferred embodiments the student and the instructor are provided with user interfaces relevant to them for the type of lesson and for playback of same. The user interfaces used in one preferred embodiment of the present invention for use with a golf lesson are shown for example in FIGS. 37, 45, 46 and 52.

Figure 37:
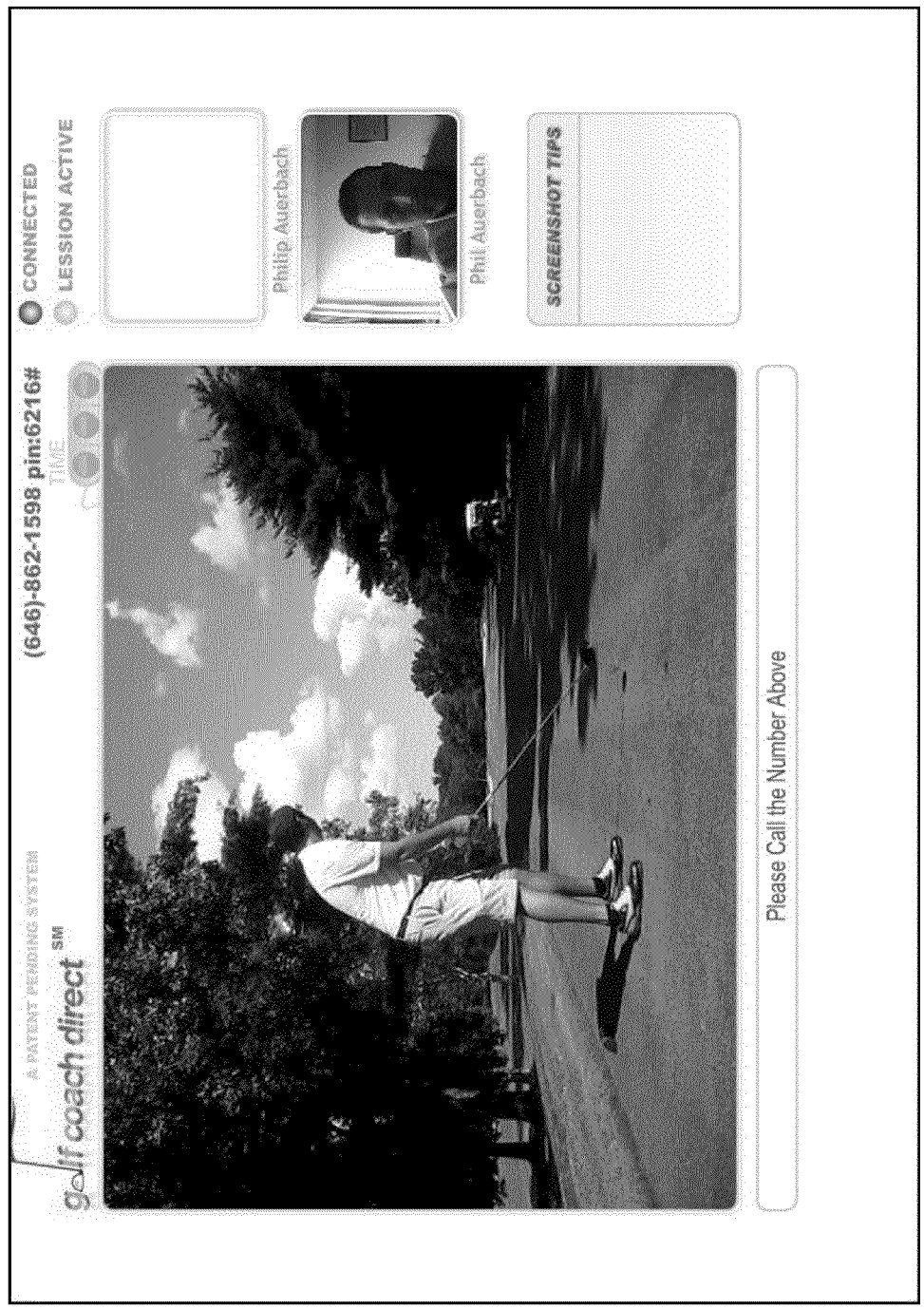
Figure 38:
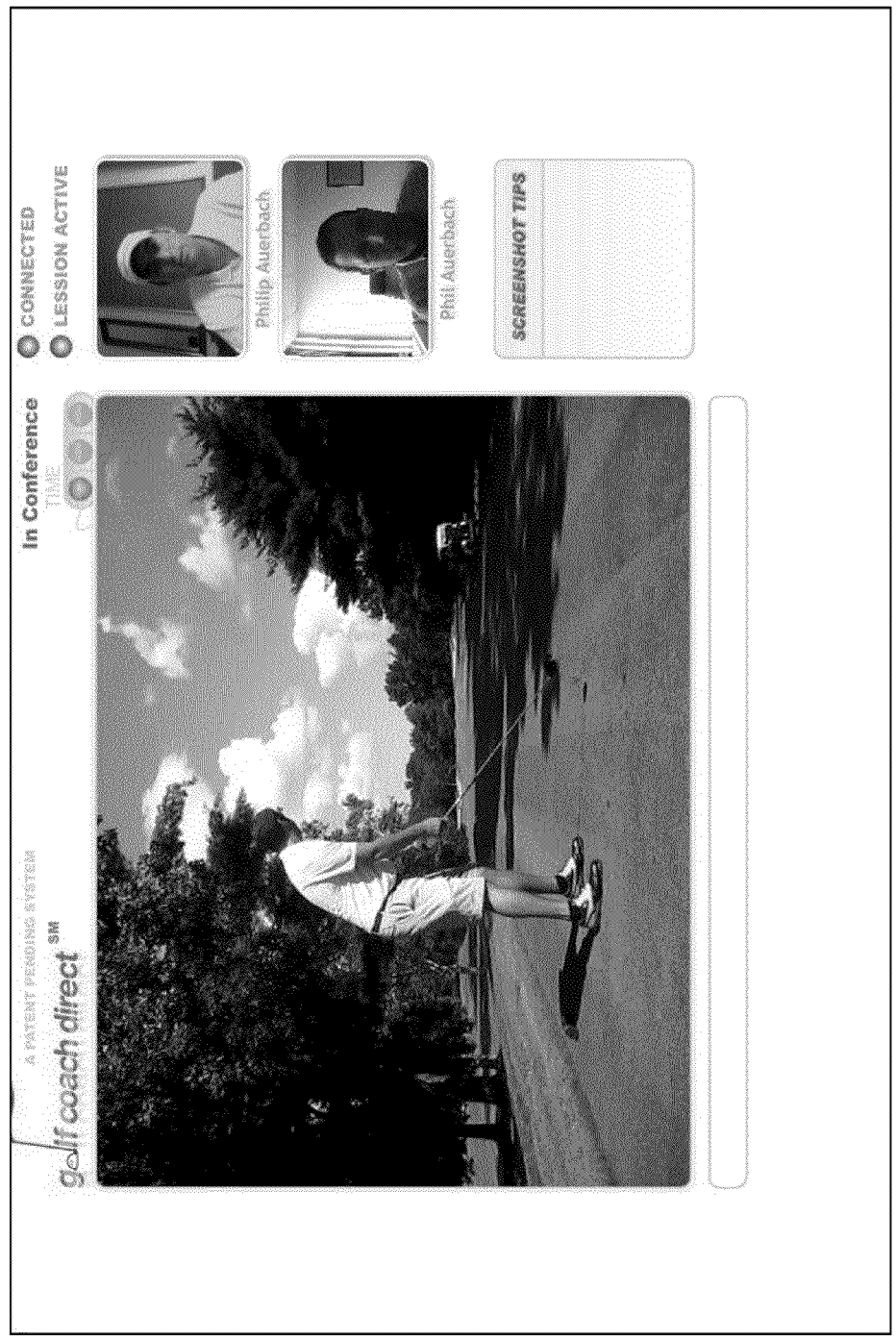

FIG. 37 shows a user interface for a student to receive real-time interactive golf instruction in accordance with one embodiment of the present invention. In this preferred embodiment, the subscriber's user interface (UI) comprises a web page that is sent by the web server when the subscriber has been validated as a lesson participant. The UI comprises a main view screen area, in which videos or selected web cam feeds will play. The UI further comprises a text message area, in which text messages typed by the instructor or status messages provided by the system will be displayed. The system further comprises an auxiliary view area, which includes the instructor webcam feed, the subscriber's own webcam feed, and a view of the last screenshot associated with a tip designated by the instructor during the course of the lesson. The UI also may include a lesson elapsed time indicator, a lesson status area, and a VOIP call number/pin identification. The status area displays visual feedback showing whether this user is connected to the communication server, whether all users are connected to the communication server, whether all initial media has been downloaded, whether the lesson is active, the time remaining in the lesson, and whether the lesson is currently paused for loading dynamically requested media.

Figure 52:
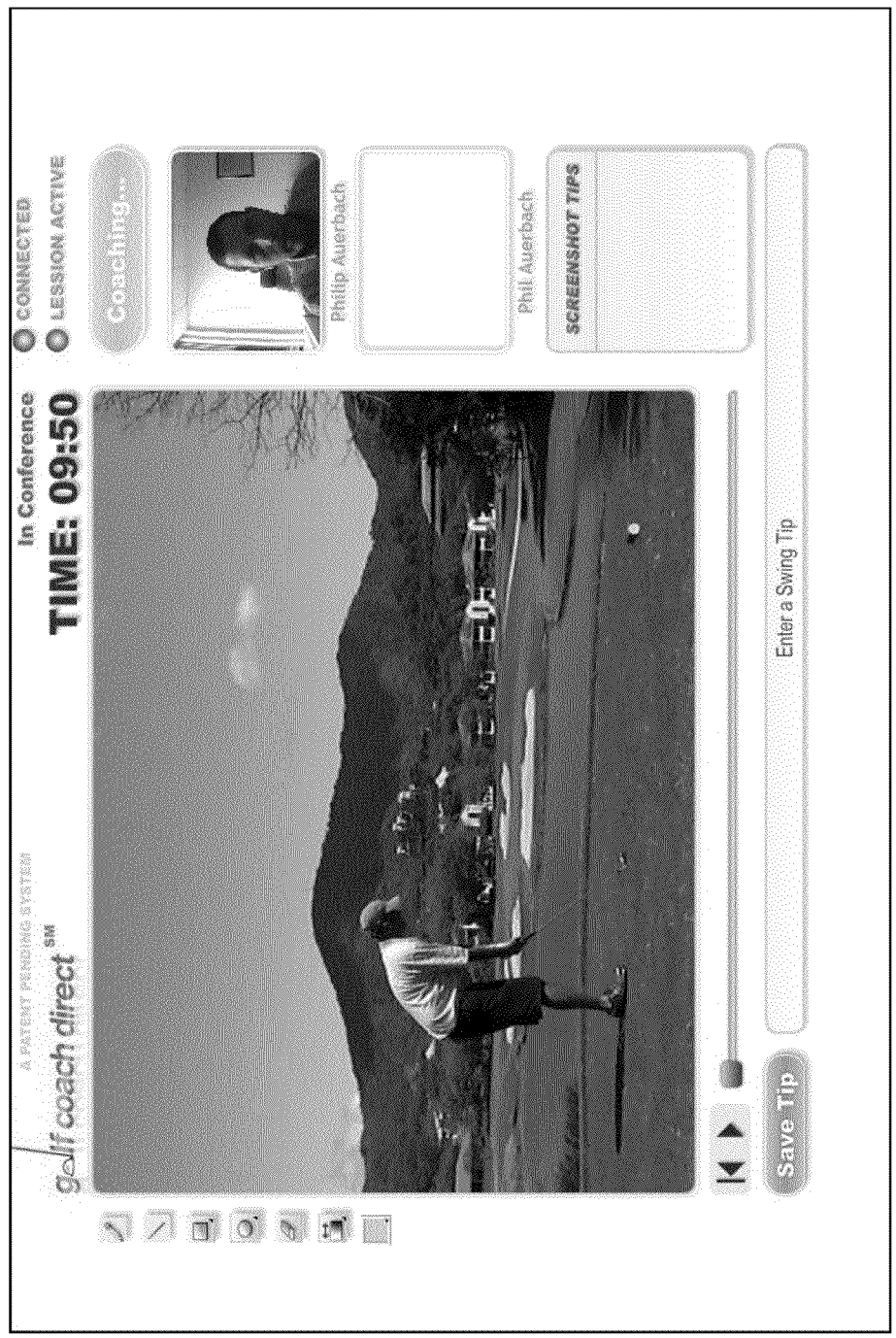
Figure 53:
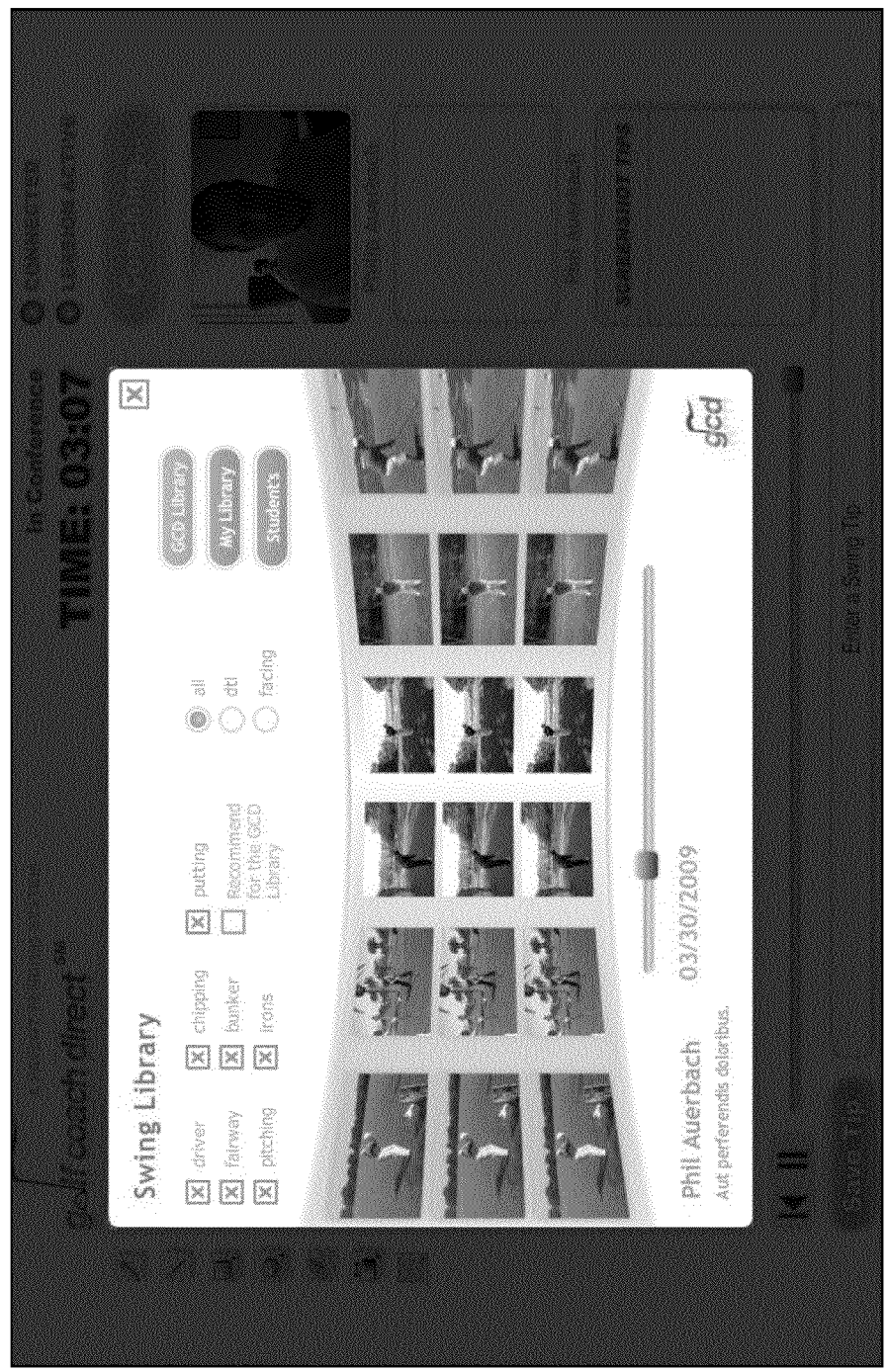
Figure 54:
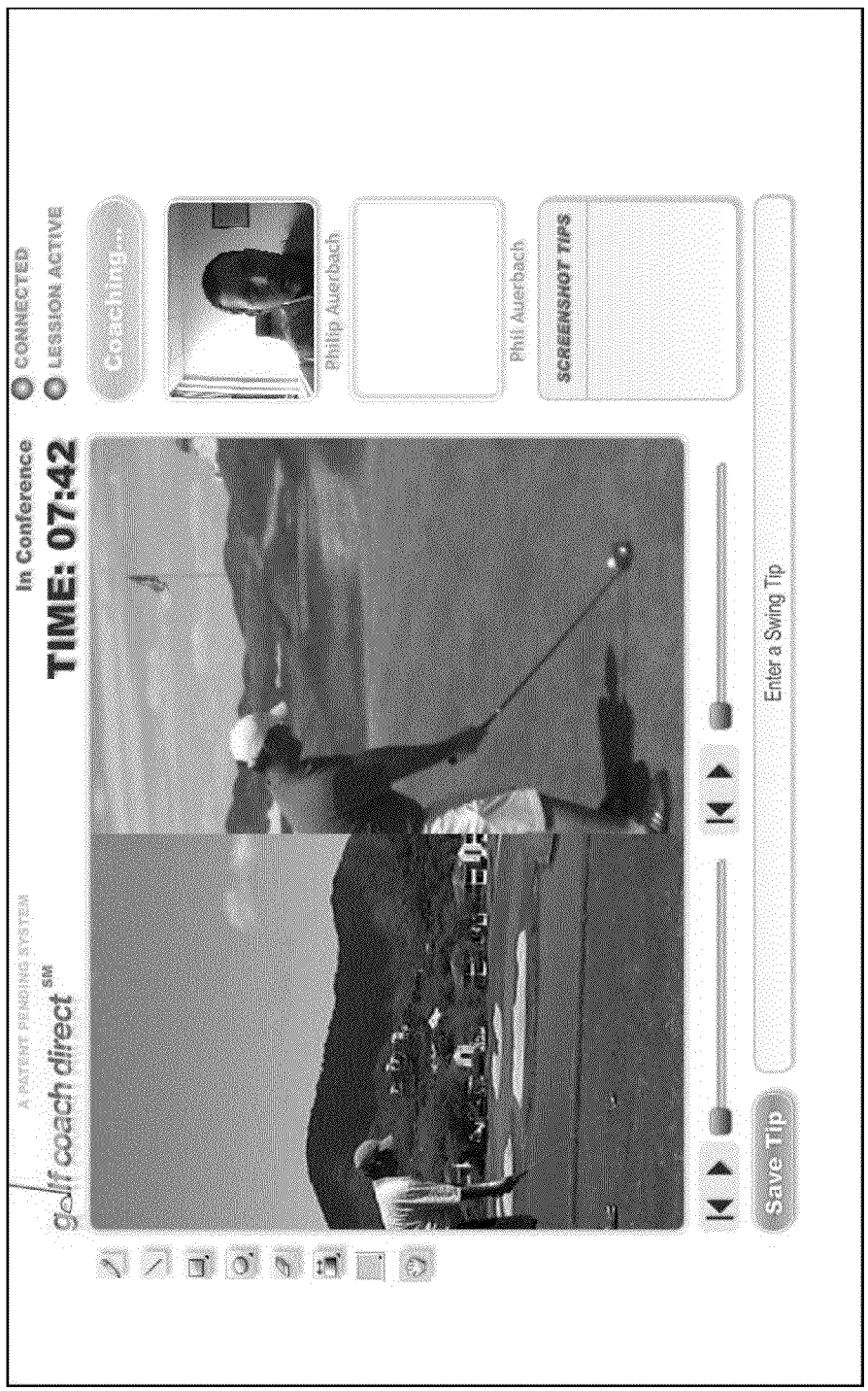
Figure 55:
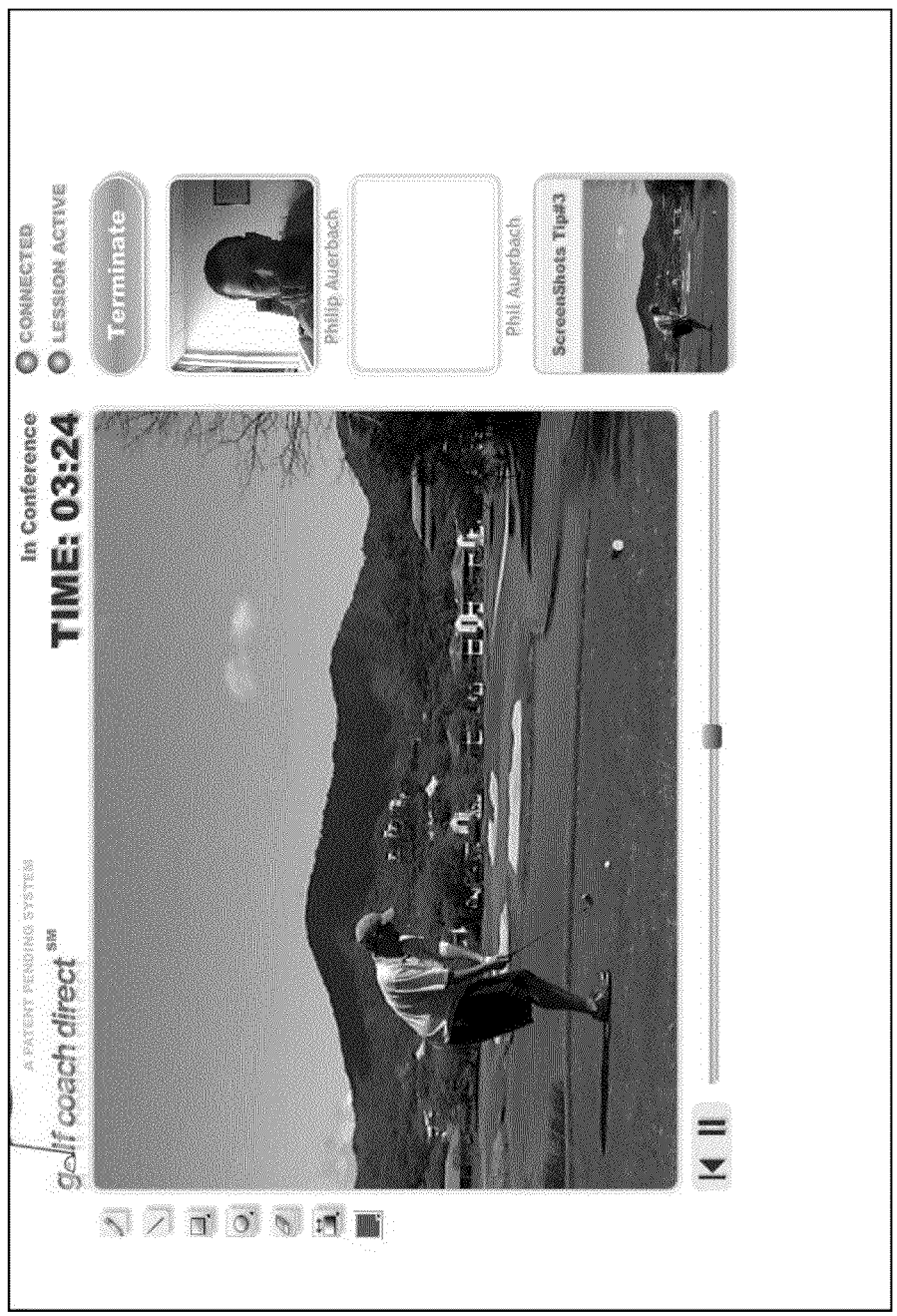

FIG. 52 shows a user interface for an instructor to provide real-time interactive golf instruction in accordance with one embodiment of the present invention. In this preferred embodiment, the instructor's user interface (UI) comprises a web page that is sent by the web server when the instructor has been validated as a lesson participant. The instructor's UI comprises a set of instructor drawing controls, video player controls, tip controls, and view area controls, as well as the main view display area and status area.

Figure 39:
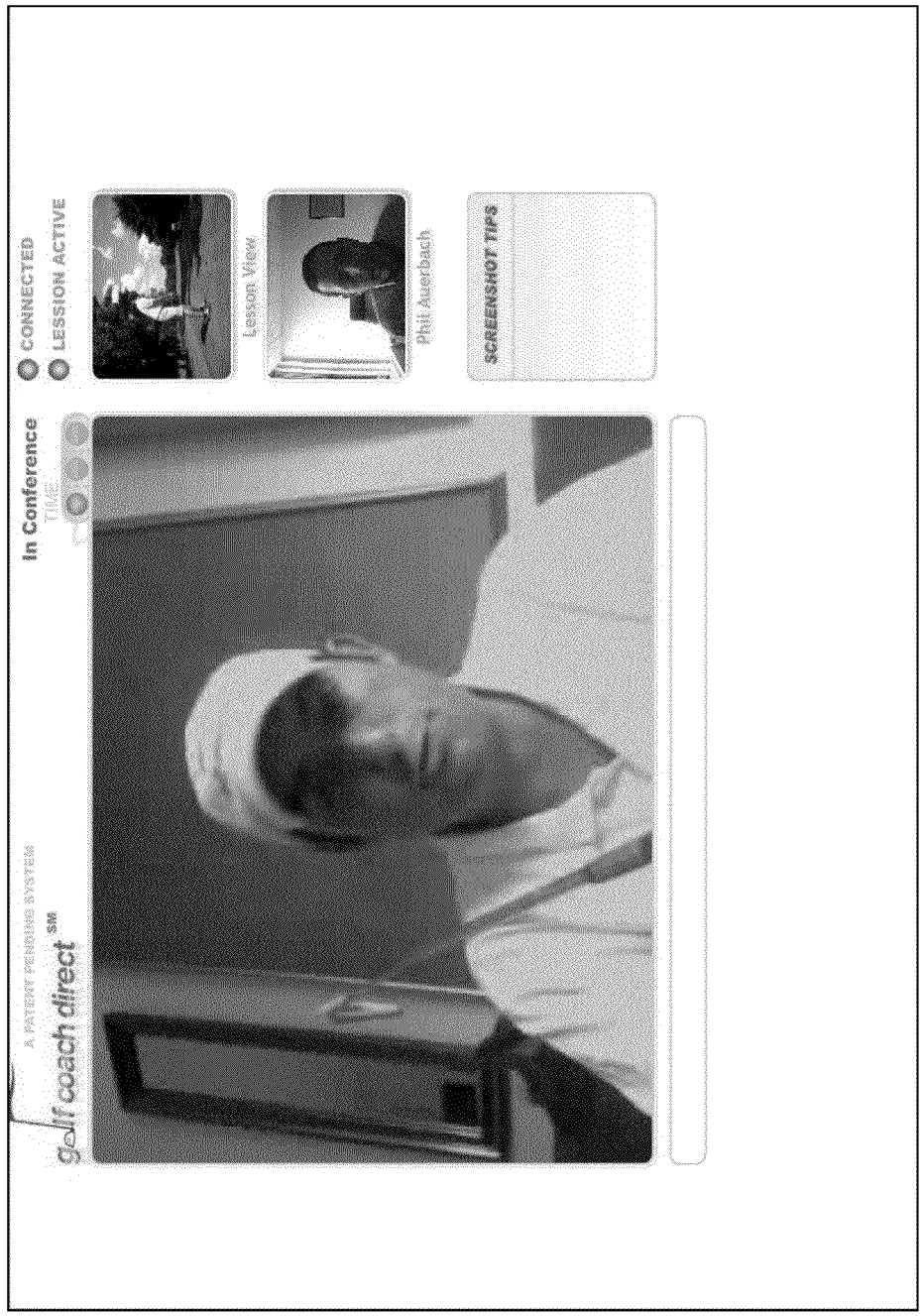
Figure 40:
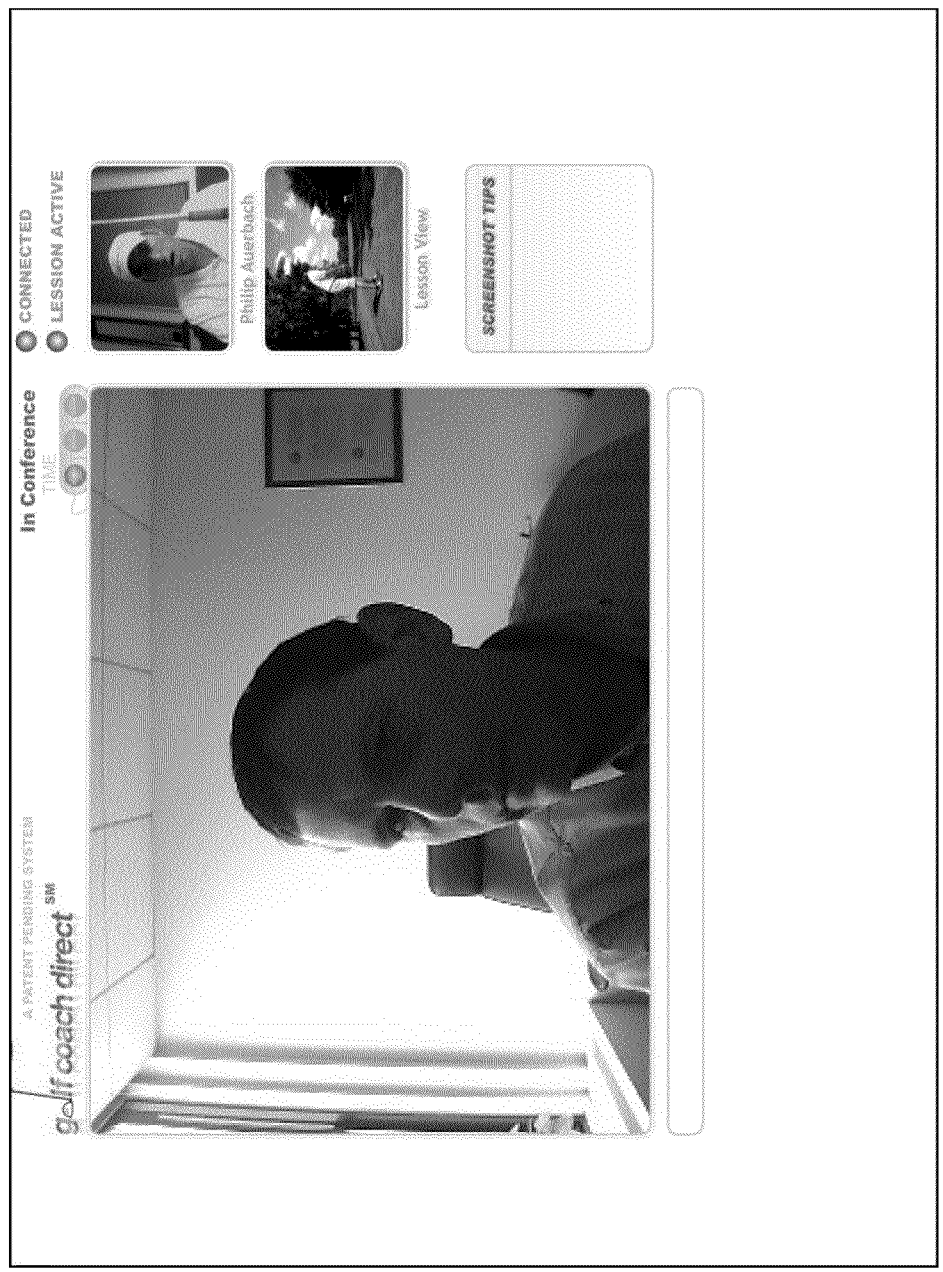
Figure 41:
Figure 42:
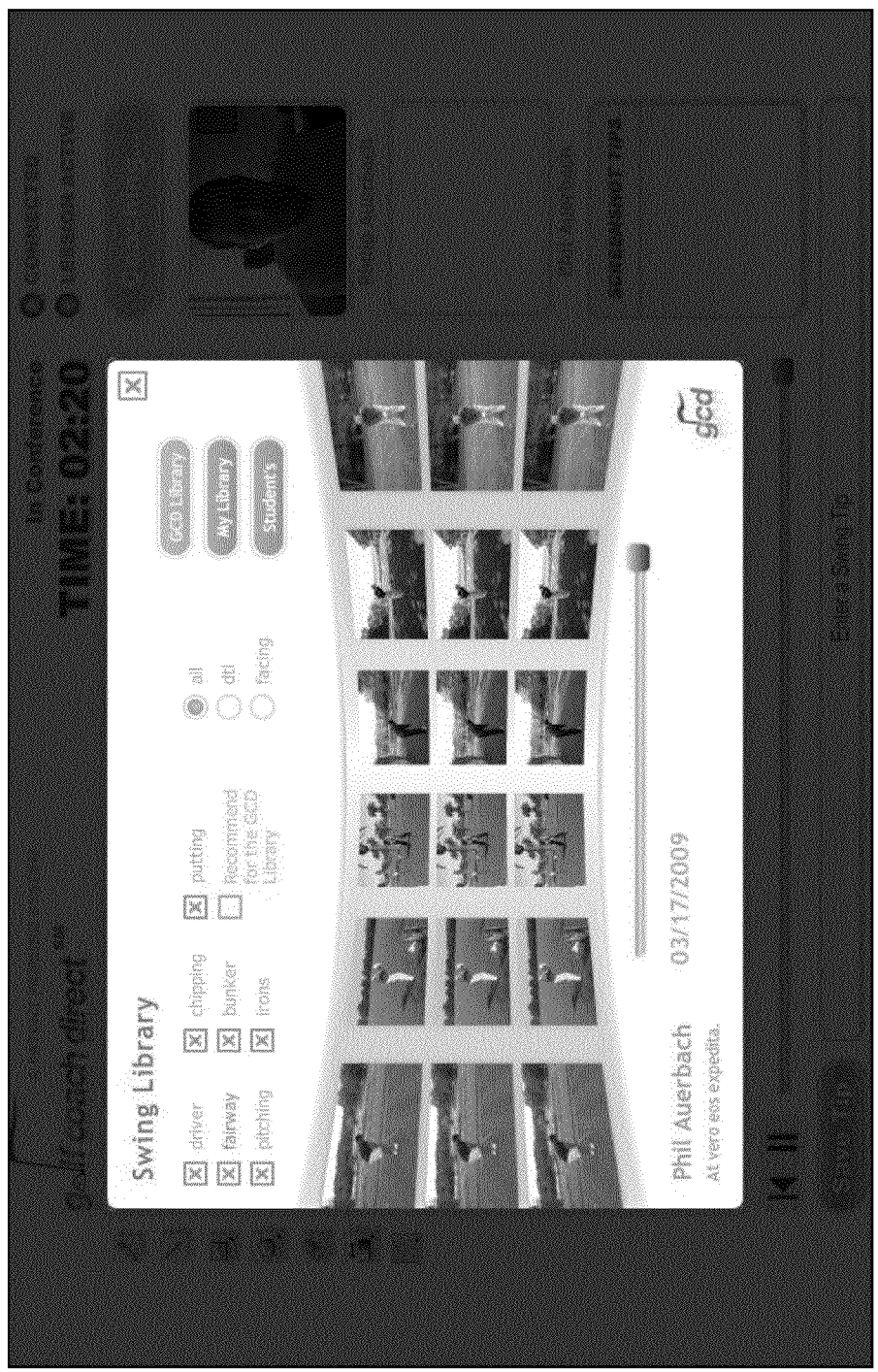
Figure 43:
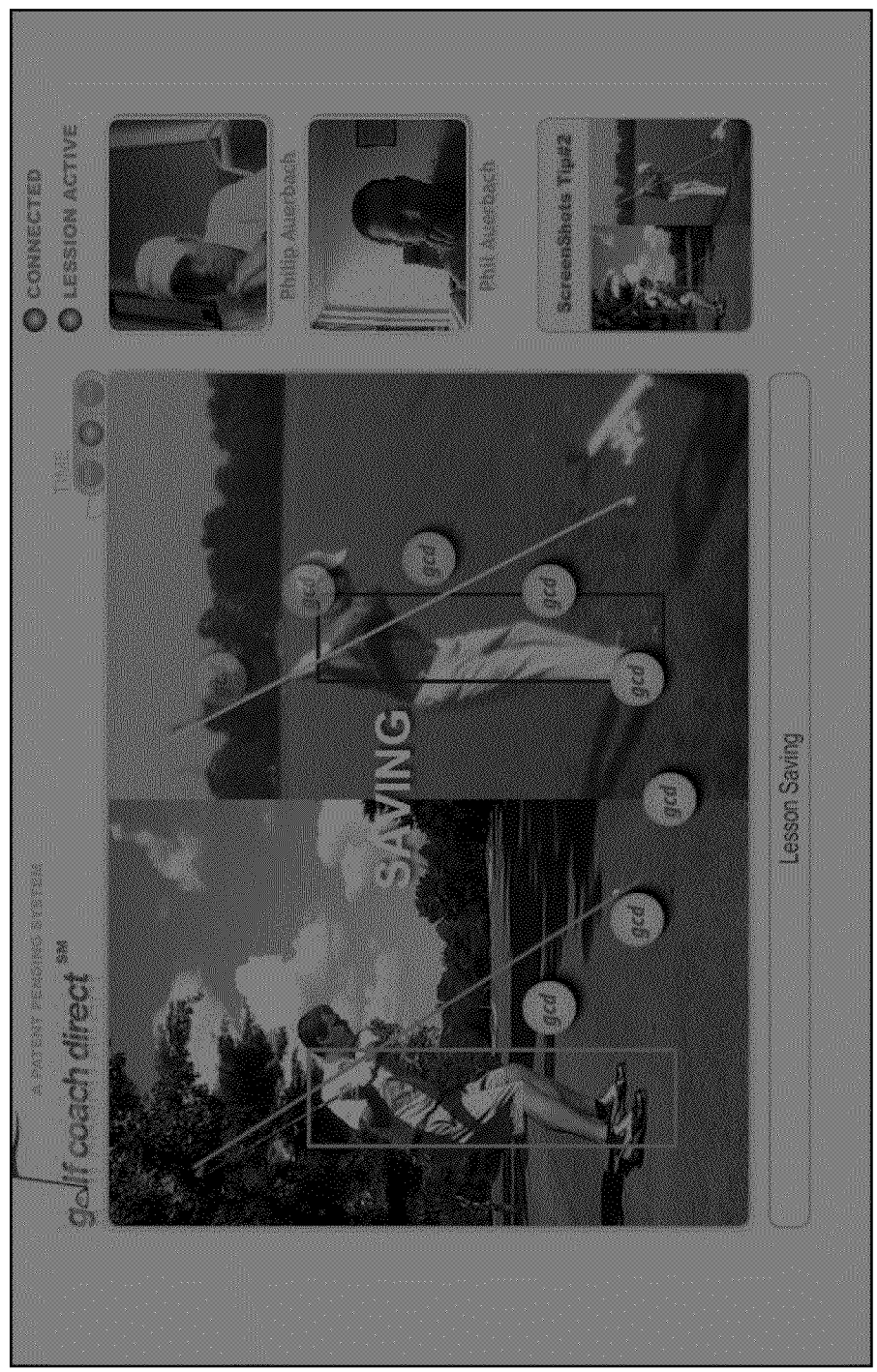
Figure 44:
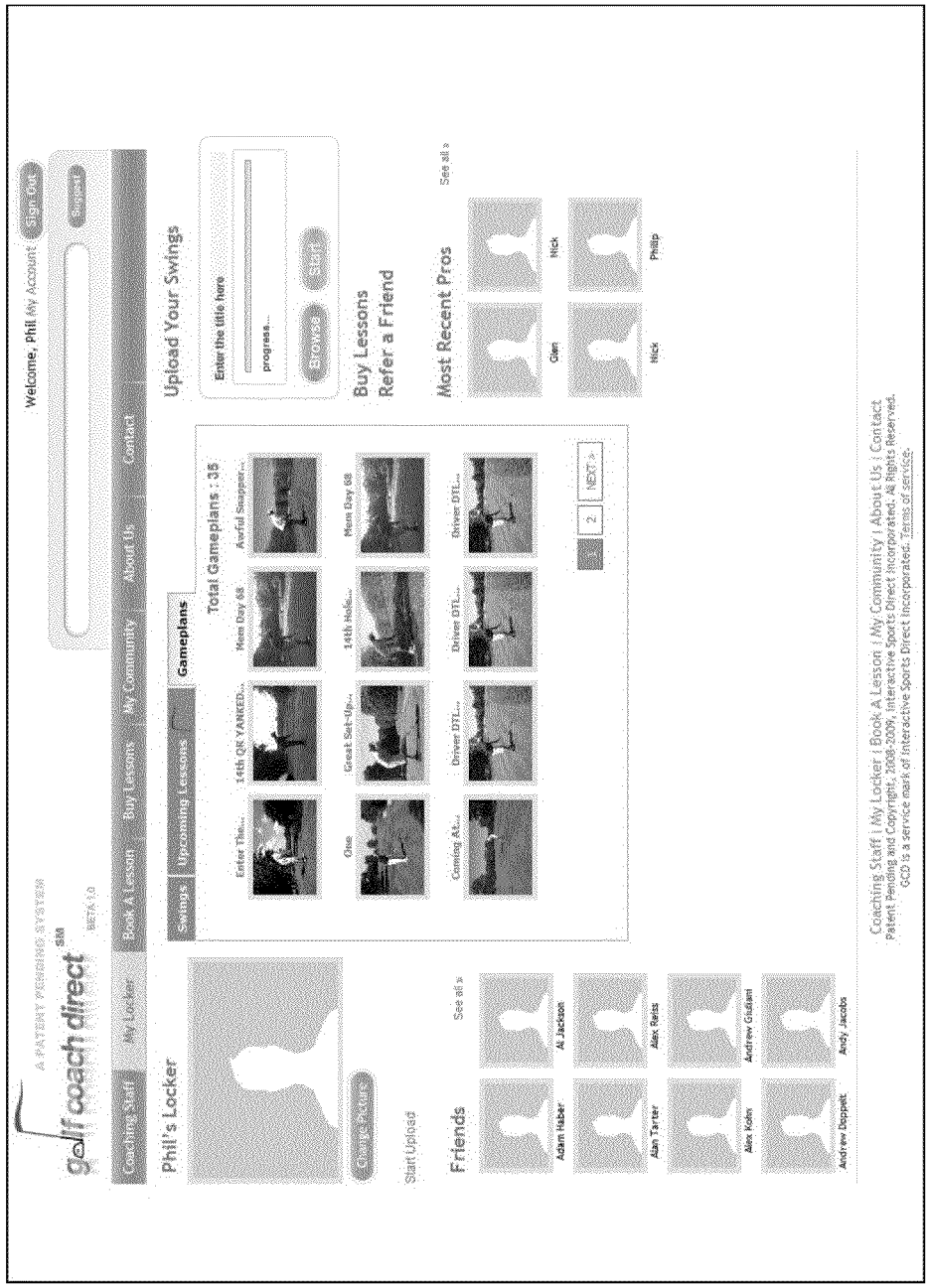

For the instructor, the auxiliary view area comprises controls that enable the instructor to select what will be displayed in the main viewing area. The instructor may click on the webcam feed of the student or the instructor to cause it to be displayed in place of the selected video in the view screen area. See FIGS. 39 and 40. The selected webcam stream is then recorded on the communication server as well as being transmitted to all participants, and becomes part of the playback records for the lesson. When one of the webcam feeds is selected for display in the main viewing area, its image in the auxiliary view area is replaced by the current frame of the video being displayed, so that the image area in the auxiliary viewing area acts as a toggle button. Optionally, the selected webcam stream can include audio, if the attendee needs to step away from the phone to demonstrate something.

Figure 45:

The tip controls comprise a text entry box for the instructor to enter text to be displayed to all participants, and a Save Tip button for saving the text that is currently displayed in the text entry box, along with a screen shot of the current main viewing area, as a Tip that comprises a game plan for the subscriber (see FIG. 45). During a lesson, the last screen shot selected by the Save Tip button will display in the Screenshot Tips area.

The video player controls comprise a standard positional slider that may be dragged to any point in the video file, and standard play and rewind buttons, allowing the instructor to control and reposition the video file in the main viewing area. When a webcam feed is selected for display in the main viewing area, the video player controls are disabled, since the webcam feed is live. The instructor drawing controls allow the instructor to use the mouse or input device to draw vector graphics that appear over the playing video, and to split the screen for display of two videos concurrently. The drawing controls comprise a freehand draw control, a straight line draw control, a rectangle draw control, a circle draw control, an eraser, and a split screen control. When the split screen control is clicked, a browser window can pop up to allow the instructor to select the media to be displayed from the instructor's library of videos or from a default library.

Figure 46:
Figure 47:
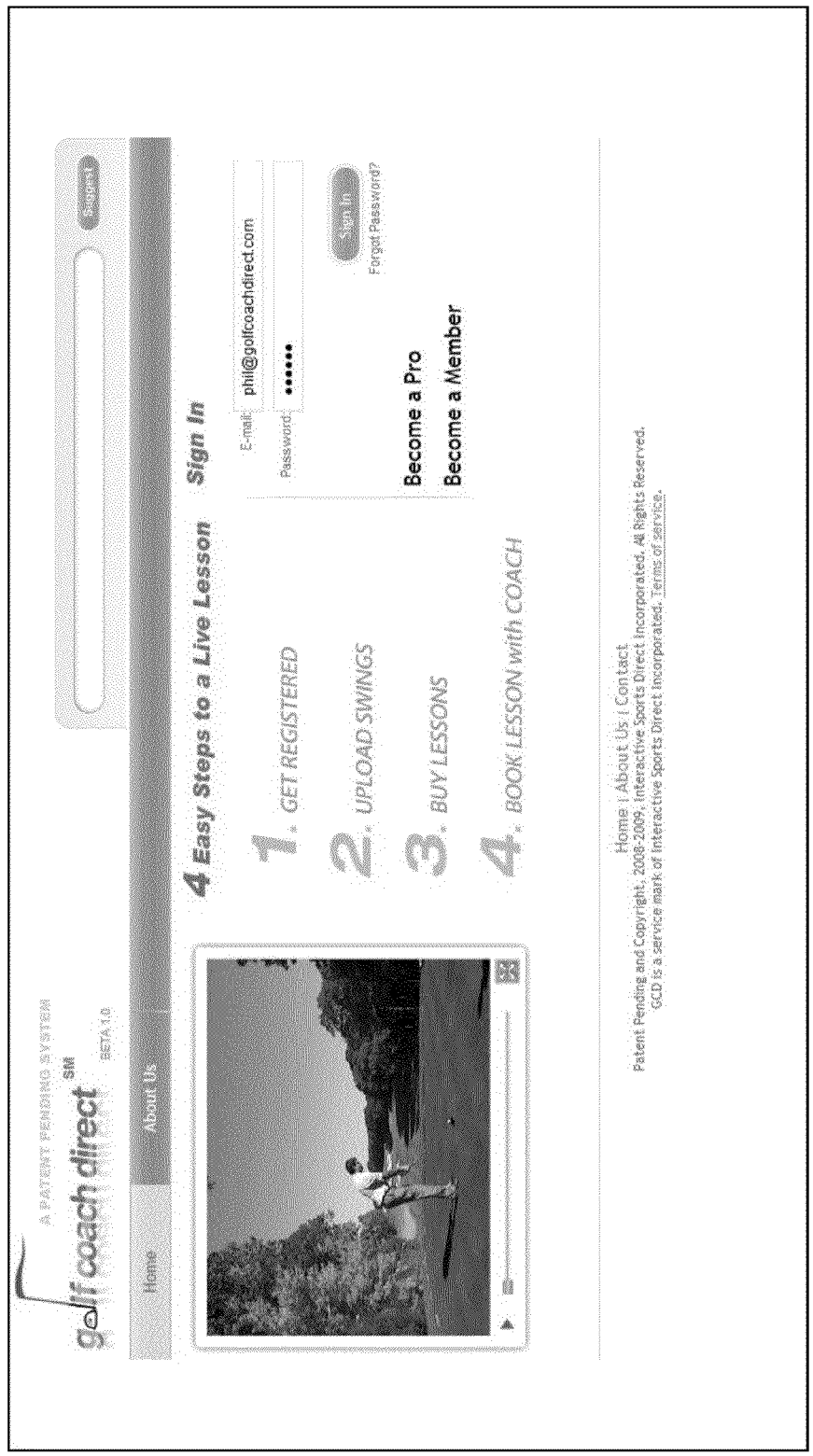
Figure 48:
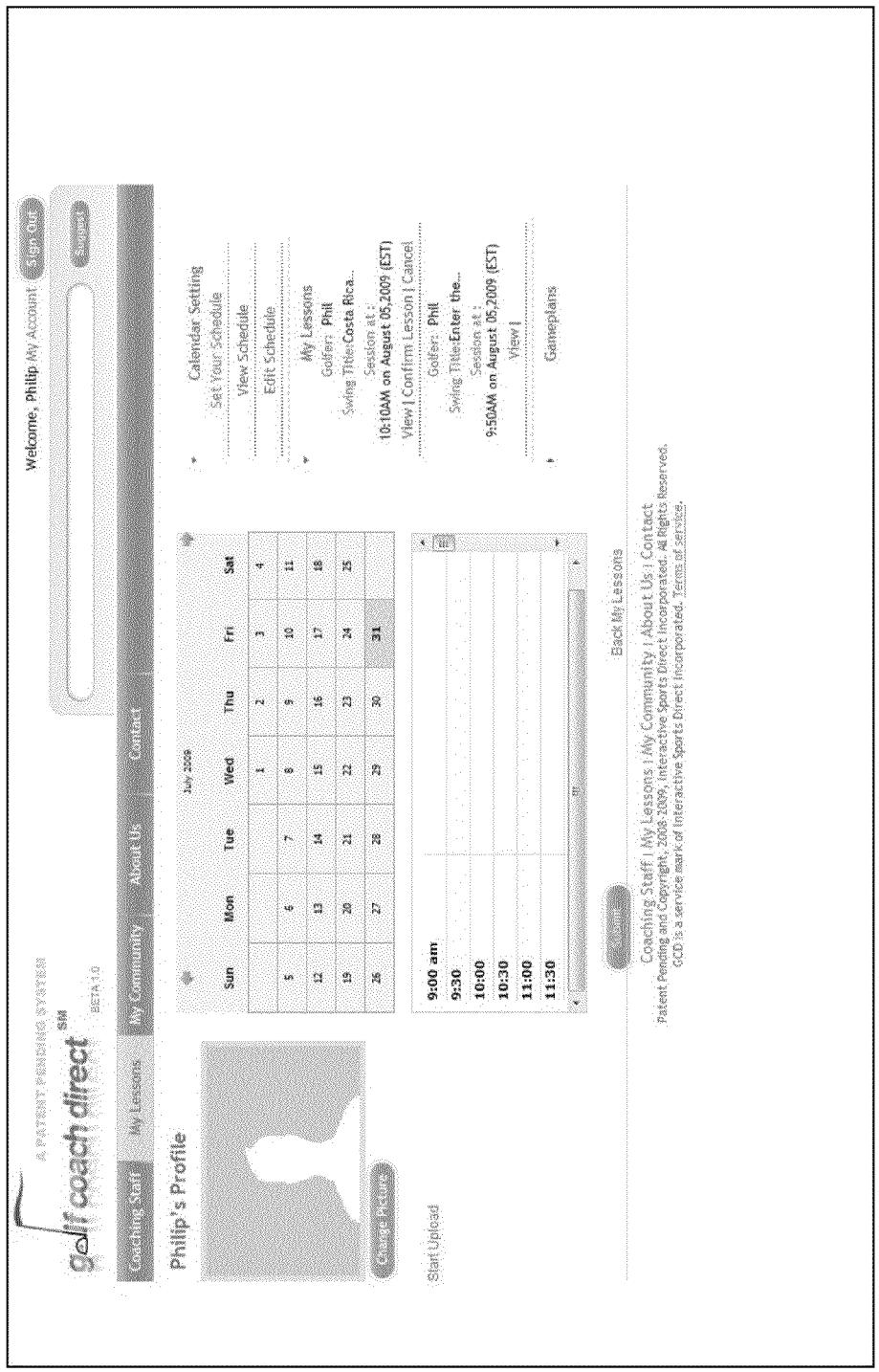
Figure 49:
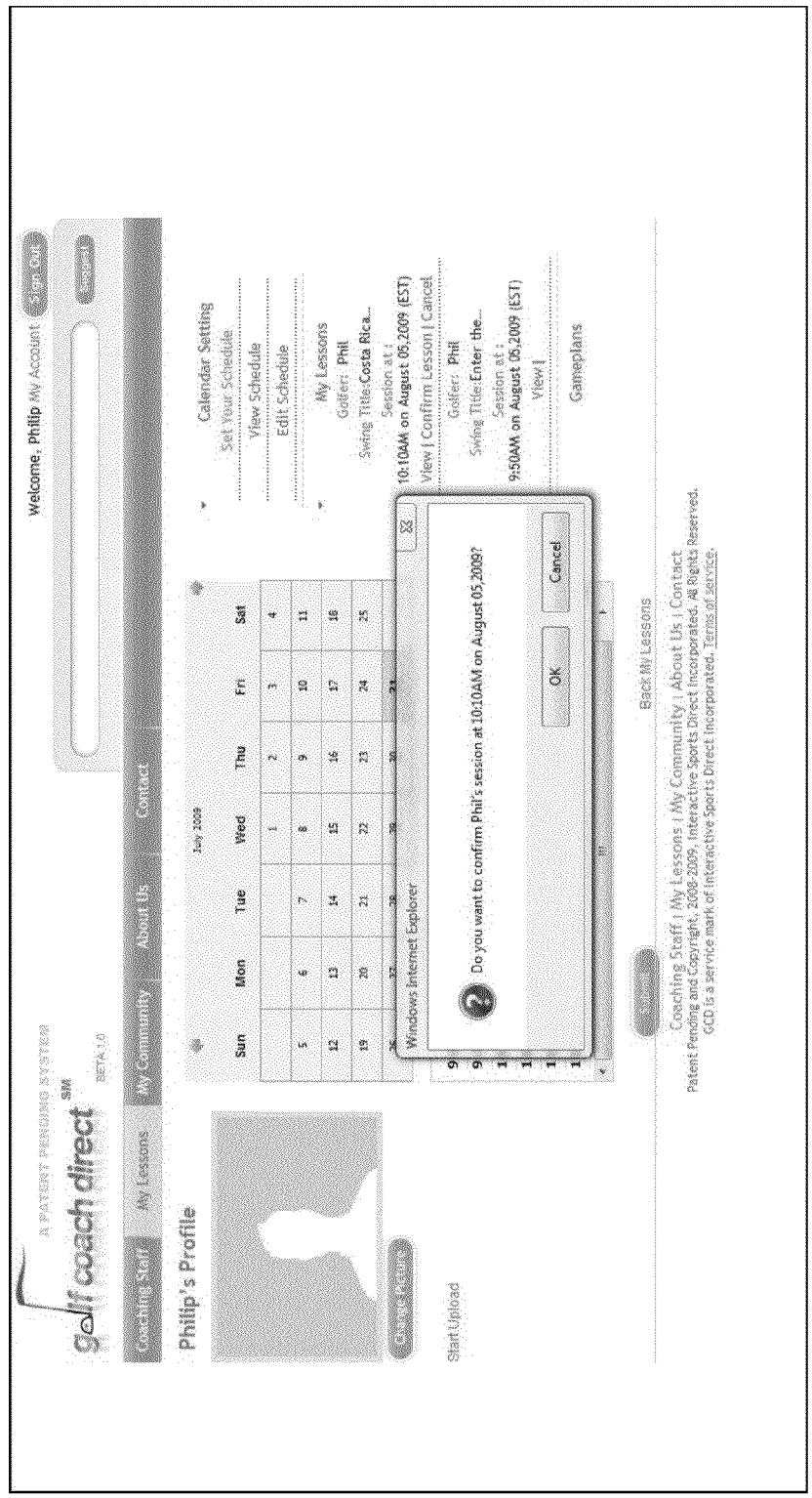
Figure 50:
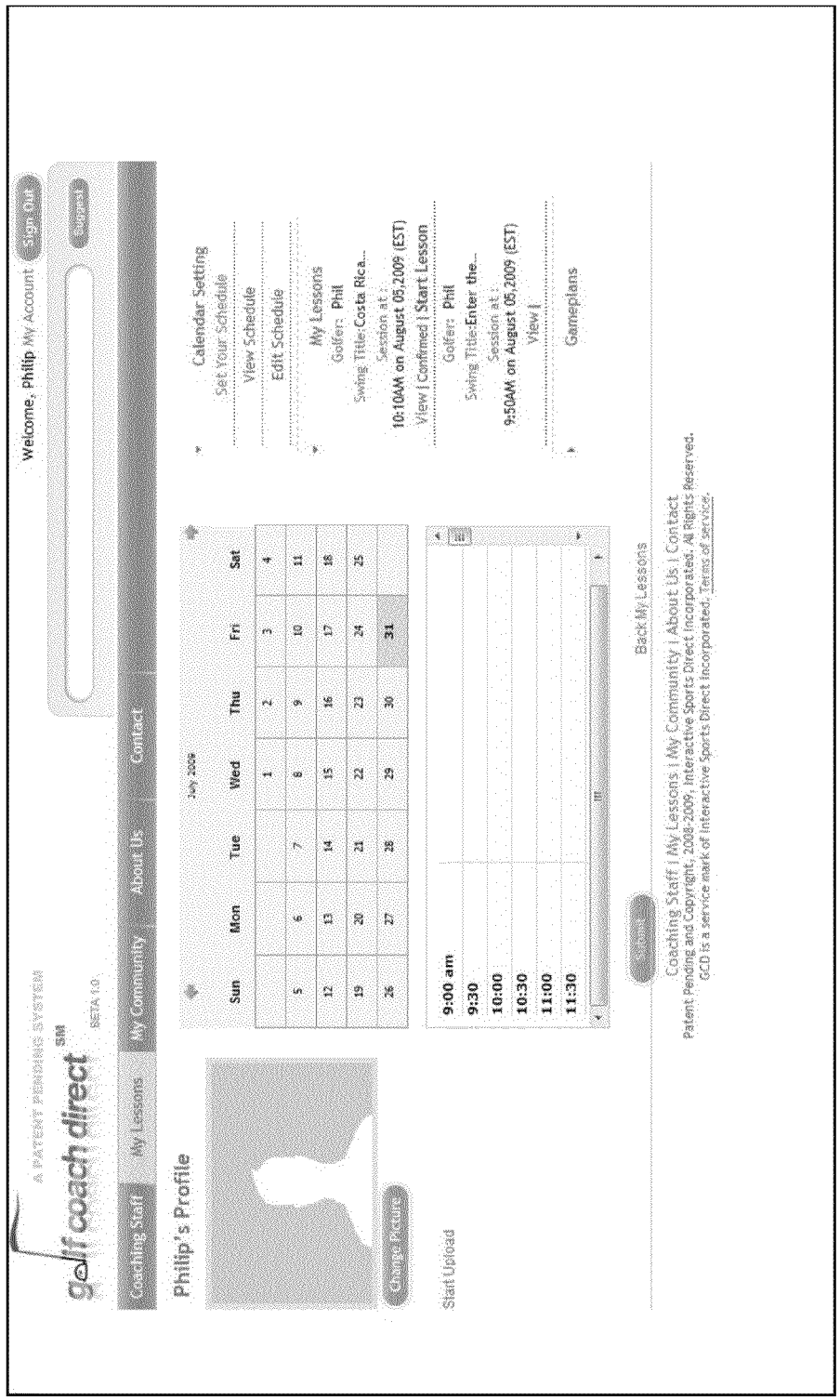
Figure 51:
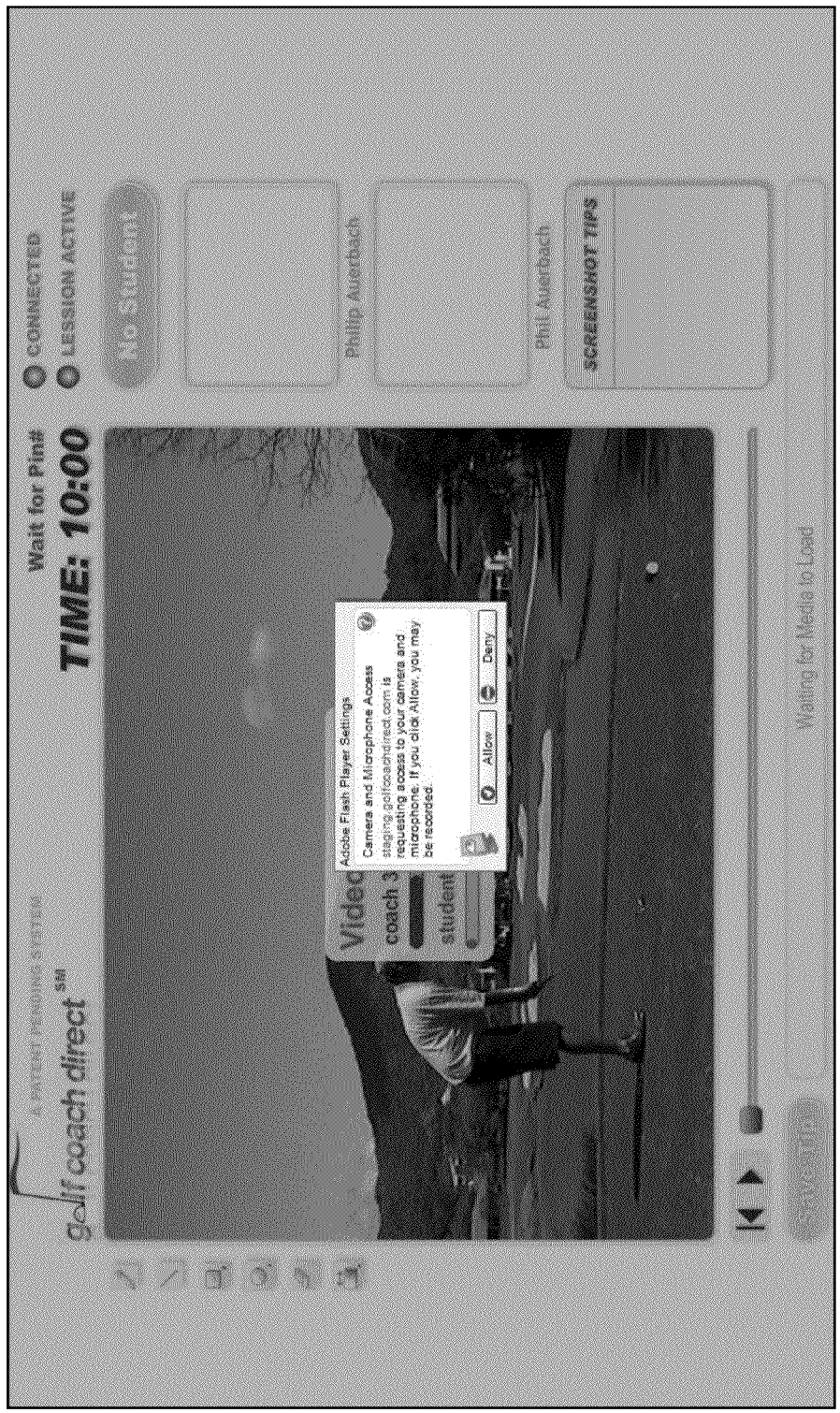

FIGS. 45 and 46 show a game plan provided by an instructor in accordance with one embodiment of the present invention. In this preferred embodiment, the game plan comprises an identified situation, and one or more text tips with still images captured from the main view screen area during the lesson. Basically, any images inside the view screen can be saved "as is", that includes, images from the video and/or from the web cam feed. The view screen is also referred to as the main viewing area. Additionally, all audio associated with the lesson session may be saved.

Although an exemplary golf lesson is described, the features and elements comprising a typical session may be applied to many other types of interactions in which a plurality of participants interact and exchange media, and the example given is meant to characterize but not to limit the utility of the system described herein. In another preferred embodiment, the participants in a session are all are equally enabled to draw, play video, send text, and select webcam feeds.

Files Used for Recording a Session

During the session, a Session Data File is created that identifies each media file used in or created during the session, and the time in the session at which each media item was played, paused, rewound, or skipped to a particular position. The Session Data File includes commands that manage each event that occurred during the session. The Session Data File also references the VOIP File. In a preferred embodiment, the Session Data File is saved as an XML file, but any file format suitable for parsing and interpretation of the file names and events therein may be used.

The VOIP File is a record of the conversation among the participants conducted via VOIP telephony that is saved by the phone server at the end of the session in a standard format, such as the way file format developed by Microsoft and IBM, or the mp3 compressed audio file format developed by MPEG.

Pre-existing video files may be designated for play during the session. In a preferred embodiment, these files are available on the web server, preferably as swf format files, supported by the Adobe® Flash® Player or other video player plugins, or in another format suitable for play on a multimedia enabled web browser.

During the session, software developed for the application translates movements of the mouse or other input device into vector drawing instructions. The vector drawing instructions are sent to and may be saved on the communication server. In a preferred embodiment, these vector drawing instructions are recorded and saved to the communication server only at regular intervals, and interim values of the mouse position are discarded. This interval of time is sometimes referred to as a time quantum. In this preferred embodiment, a 40 millisecond time resolution is sufficient for the representation of the drawn data. Though in other embodiments a different interval of time to execute, record, and/or save instructions, may be warranted by performance issues. The vector drawing instructions may be saved in XML format expressing commands, or in any format suitable for later execution during playback by the media player software on the client processor.

The webcam digital streams from the participants are sent to and distributed by the communication server. When a webcam stream is selected for display to all participants on the view screen, the stream being sent is recorded by the communication server. The webcam streams may be sent and recorded as flv (Flash® Video) format, or in any other format suitable for storage of video data and later playback by commonly available video player software.

Text data for display during the session is saved in XML format within the Session Data File.

Still images for display during the session may be available on the web server. Snapshots of playing video or webcam feeds may be saved on the web server as JPEG files.

Improved Session Playback

The playback control system enables the playback of the media files created or used during a live teleconference, or distributed interactive session. During a session, at least two participants use their computers to exchange multiple types of information in real-time, including VOIP conversation and at least one video file. The files created or used during a session may also include text data, drawn vector graphics, and web camera (webcam) feeds. A description of such a session and the files created and used therein will facilitate the detailed description of the playback control system follows. See also FIGS. 18 through 28, Database Schema Tables 1 through 39 and the action script files found in the source code below for further description of preferred embodiments of the present invention.

Major Components of Playback System

The block diagram shown in FIG. 16 shows a system that supports, on a Client Processor 110 executing a multitasking operating system and graphically enabled web browser, the retrieval and playback of the captured media files to reproduce a previously completed session, synchronizing the files as they play so that the data of each file is played or displayed at the proper time relative to the other files. The system comprises a client processor 110 executing a multitasking operating system such as Microsoft Windows XP or Macintosh OS X and including a Display 118 and Local Storage 115. The executable procedures of the system execute under a browser and utilize a commonly available multimedia and application player, such as the commonly installed Adobe® Flash® Player plug-in, which is capable of executing Action-Script sequences or similar embedded procedures in the web pages being displayed. The system further includes a Web Server 130 with a Session Database 135, a Communication Server 140 with its file system 145, and a Phone Server 150 with its file system 155, each server being electronically connected to the client processor. In a preferred embodiment, the servers and the client processors are connected via a network connection such as is provided by the Internet.

The web server 130 runs a general purpose HTTP server, such as the Apache HTTP Server developed by the Apache Software Foundation, under a general purpose operating system such as Linux and using a database management system such as the MySQL relational database manager provided by MySQL AB, a subsidiary of Sun Microsystems. The web server also provides a capability for creating and serving dynamic web pages, such as, for example, the PHP scripting language produced by The PHP Group. During a session and during playback, the web server is able to connect to each of the participants and to a database. During a session and during playback, the web server processes requests received from clients and sends back organized constructed content from the database and from its file system to each client processor.

The phone server 150 runs an Internet Protocol-PBX software package to handle switching control of VOIP communications, such as the Trixbox® telephony application support software developed by Fonality. During a session, the phone server listens for incoming connections from each participant's telephone, connects to each participant's telephone, accepts and records VOIP data, and communicates VOIP status to the communication server. During playback, the phone server responds to requests for previously recorded files containing VOIP data.

The communication server 140, runs a multimedia and data server with scripting capability for server-side scripts and remote procedure calls, such as the functionality provided by the Adobe® Flash® Media Server. During the session, the communication server establishes a persistent connection with each participant, using a protocol for persistent connection such as the Real Time Messaging Protocol (RTMP) supported by the Adobe Flash Media Server. During the session, the communication server manages the persistent connection among participants and accepts, controls, and terminates all transfer of digital information with each client in real-time except for the VOIP data, saving the webcam feeds and the commands that affect the data played or displayed to participants. Webcam feeds are formatted and saved by the communication server as flv files during the live session. During playback, the communication server manages a persistent connection with the user, receives and processes requests for web camera playback files, and sends the requested files to the client processor.

Of course, there is no requirement that these servers be physically separate. The logical separation and identification of the servers shown herein does not necessarily reflect their physical configuration, and other configurations may be contemplated as long as the functions set forth herein are able to be performed.

Playback of a Session

In a preferred embodiment, to initiate playback, a participant at a client processor 110 sends a request via his browser to the Web Server 130 for playback of a session. The page returned includes executable procedures for performing the playback functions, as well as graphics that provide affordances for control of the playback functions and a unique identifier that identifies the session to be played. The Session Data File, which characterizes the session and is stored on the Web Server 130 in the Session Database 135, is returned. After analysis of the retrieved Session Data File to identify the various media files created or used in the session, the identified media files are requested and retrieved by the Client Processor 110 from the Web Server 130, from the Phone Server 150 and its file system 155, and from the Communication Server 140 and its file system 145. Media files retrieved by the client processor may be temporarily saved on the client processor local storage 115 for play at the appropriate time on the display 118.

Modules of the Playback System

Figure 17:
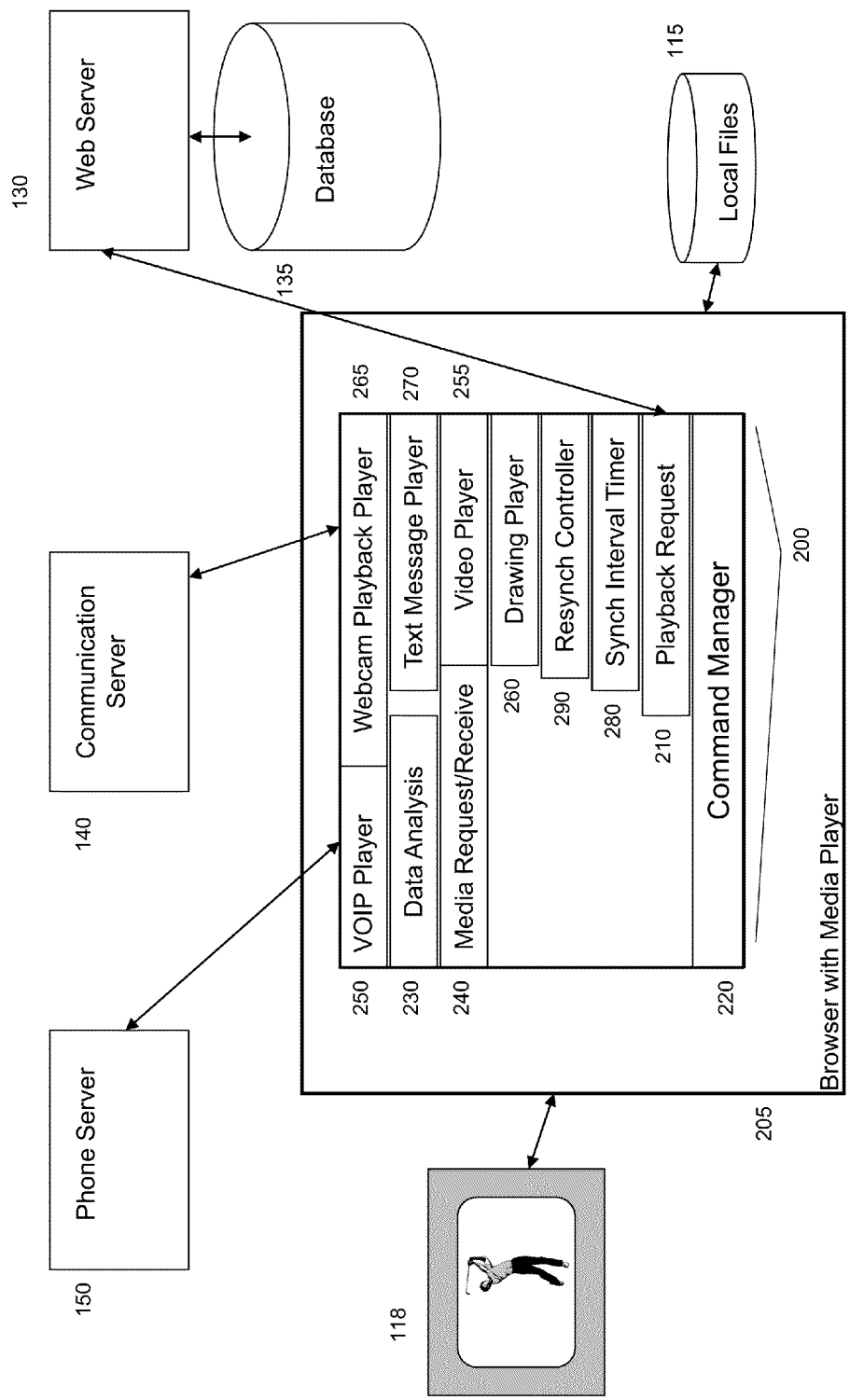
FIG. 17 shows exemplary modules of a playback control system that execute on the client processor in accordance with a preferred embodiment of the present invention.

FIG. 17 shows exemplary modules of a playback control system 200 that execute on the client processor in accordance with a preferred embodiment of the present invention. The Playback System operates under a Browser with Media Player and application execution capability 205. The modules comprise Playback Request 210, Data Analysis 230, Media Request/Receive 240, Command Manager 220, Synch Interval Timer 280, Resynch Controller 290, and the various player modules. In one preferred embodiment, the players comprise the VOIP Player 250, Video Player 255, Drawing Player 260, and Webcam Playback Player 265. In alternative embodiments, additional or alternative player modules may be added to support other types of media. The function of each of the modules that comprise the Playback System 200 will now be described by discussing their operation.

Figure 18:
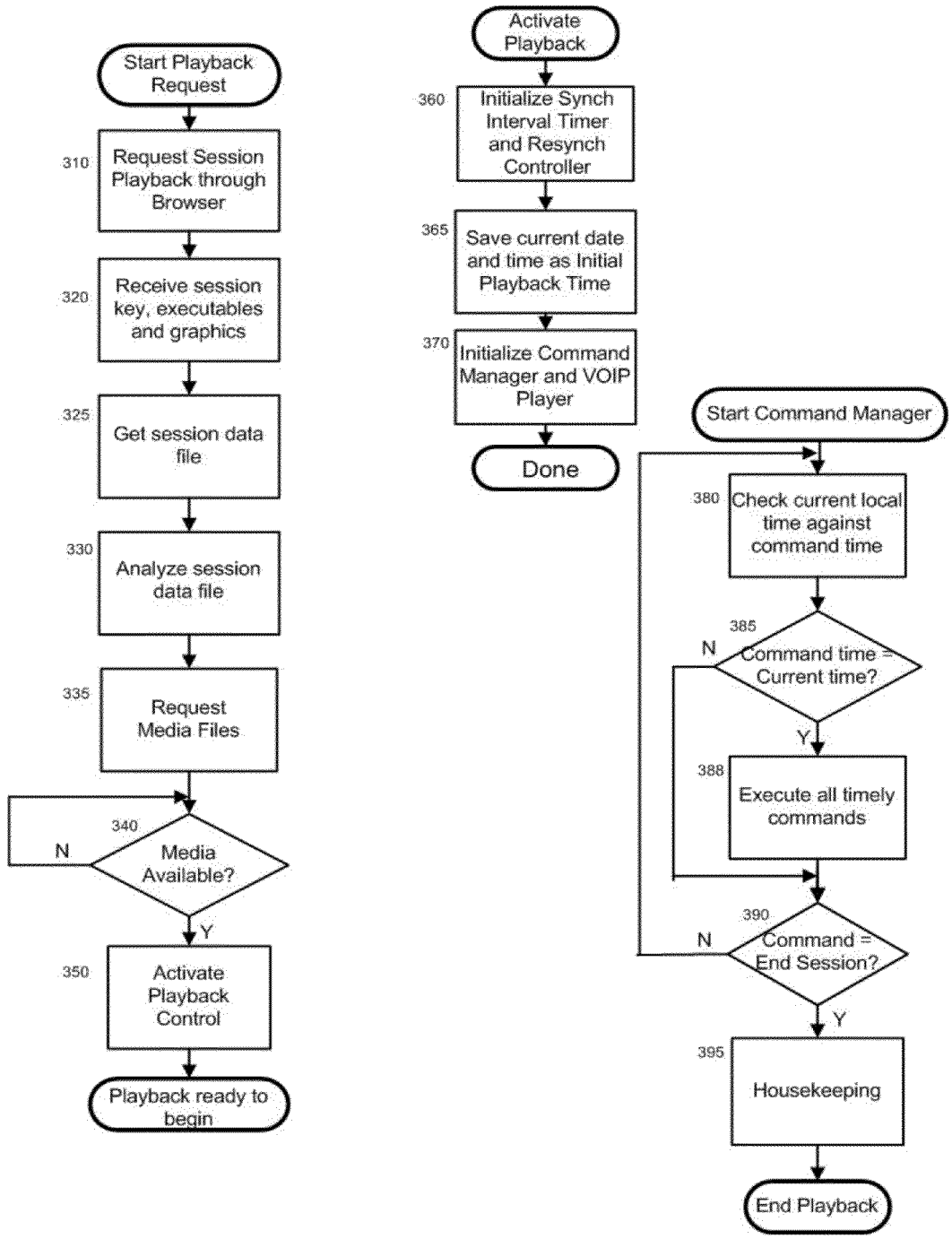
FIG. 18 shows an illustrative high level flowchart of the operations performed in requesting and playing back the captured data from various sources in one embodiment of the present invention.

FIG. 18 shows an illustrative high level flowchart of the operations performed in requesting and playing back the captured data from various sources in one embodiment of the present invention.

Figure 19:
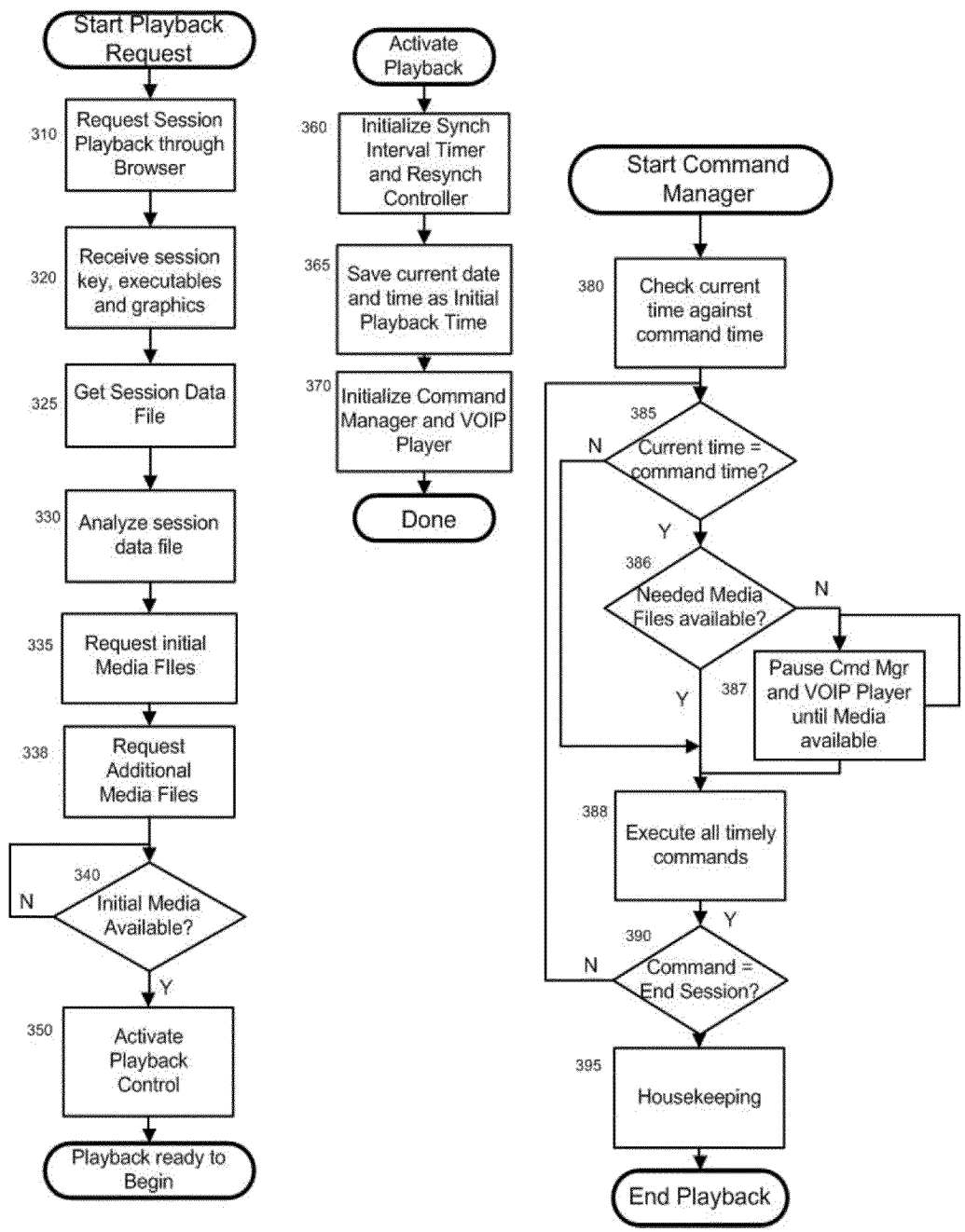
FIG. 19 shows an illustrative high level flowchart of the operations performed in requesting and playing back the captured data from various sources for another embodiment of the present invention.

FIG. 19 shows an illustrative high level flowchart of the operations performed in requesting and playing back the captured data from various sources for another embodiment of the present invention. In this preferred embodiment, only the VOIP File and the initial video file need be requested 335 and downloaded 340 before the playback control graphics are activated and playback can begin.

The following discussion refers mainly to FIGS. 17, 18 and 19.

Requesting Playback

Figure 20:
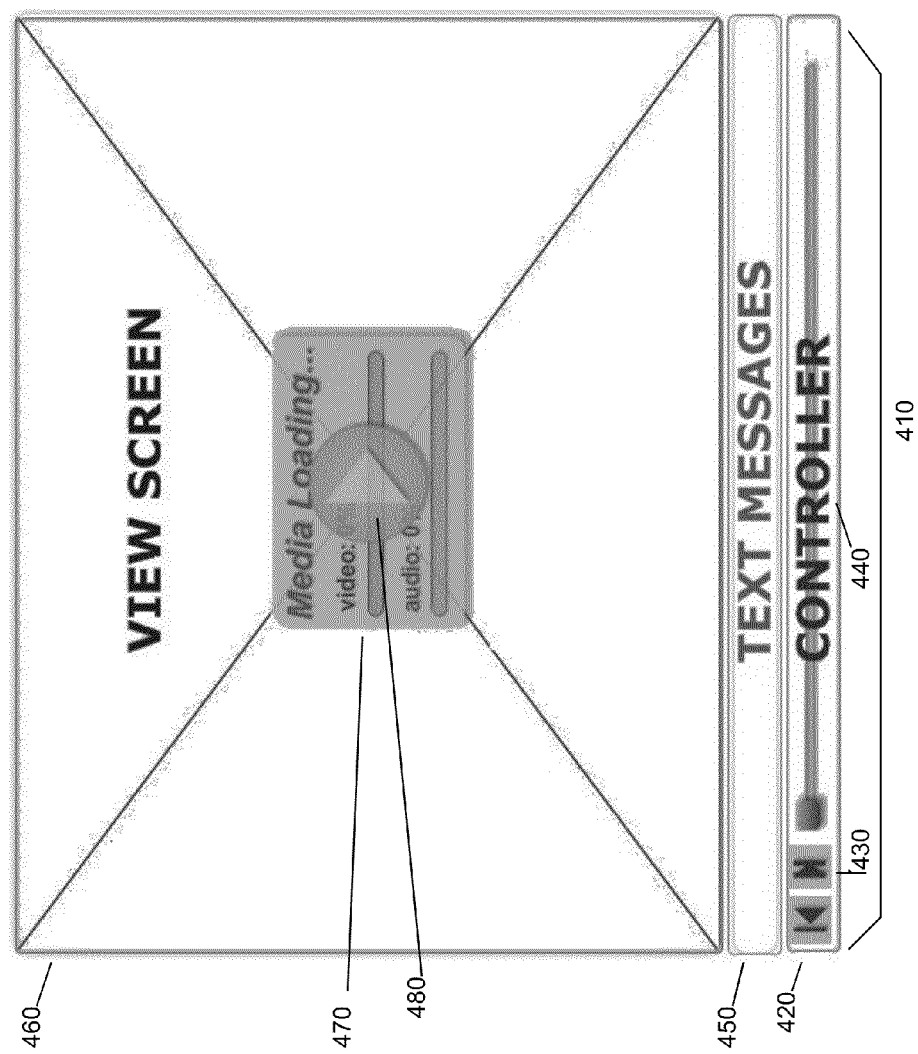
FIG. 20 shows an illustrative design arrangement for a user interface for playback control for one embodiment of the present invention.
Figure 21:
FIG. 21 shows an exemplary user interface for playback control for one embodiment of the present invention.

When activated by a user, the Playback Request module 210 sends to the web server 130 a request for playback of a session 310. The request is made by activating a control on a web page, or by clicking a particular link provided to the user for requesting playback. The user's browser then requests and receives the session key and also an interface page that includes the playback executable code 320. In one embodiment, the playback executable code comprises a set of procedures in ActionScript, which can be executed by the media and application enabled web browser. FIGS. 20 and 46 show illustrative design arrangement for a user interface for playback control for one embodiment of the present invention. In this embodiment, the interface page comprises a display area and controls to enable viewing and controlling the playback of the session. After verifying that the client is permitted to access the requested session, the web server also returns the Session Data File that identifies the events and files associated with the session 325.

The Data Analysis module 230 analyzes the received Session Data File 330 to identify all media files needed for the session, including the VOIP File. The Media Request/Receive module 240 sends requests 335 to the appropriate servers for download of the identified files. The VOIP File is requested from the Phone Server 150; any pre-recorded video files to be played are requested from the Web Server 130, and any webcam playback files are requested from the Communication Server 140. When the files have been successfully downloaded to the local computer as determined in step 340, the playback control graphics are activated 350, and the user can begin playback by pressing the Master Play Button 480.

Additional media identified by the Data Analysis module 230 may be requested separately 338 and may be downloaded in background by the Media Request/Receive module 240 while playback is in progress.

The Synch Interval Timer 280 is responsible for determining when it is time to resynchronize the playback media files as they are playing. It keeps track of the time since the last resynchronization. In a preferred embodiment, the Synch Interval Timer is nominally initialized to a 30 second interval, but the initial value of the Synch Interval Timer may be adjusted by user input to provide more or less frequent resynchronization checks. In an alternative embodiment, the initial Synch Interval Timer value may be automatically adjusted by incorporating feedback into the system to adjust the interval if the calculated time difference of the separate media files is greater or less than threshold limits.

The VOIP Player 250 controls play of the record of the telephone conversation that occurred during the session (the VOIP File). In one preferred embodiment, the VOIP File begins when the session begins and continues to the end of the session. However, the VOIP File cannot function as a controlling timeline for the session, because playing the VOIP File under the security restrictions imposed by the browser and multimedia player environment can cause play of the file to deviate from actual elapsed time, and the VOIP File must therefore be resynchronized with the play of other media files.

In one embodiment of the present invention the VOIP Player is implemented as PhoneCall.as, which appears in the source code below. It manages the audio phone conference file (VOIP File). It contains functions to request download of the VOIP File (_playbackLoaded), check progress of the VOIP File during playback (_progressHandler), play the VOIP File, and pause and resume the VOIP File.

The remaining player modules, Video Player 255, Webcam Playback Player 265, Text Message Player 270, and Drawing Player 260, each execute under control of the Command Manager 220 to play or display the corresponding type of media.

The Video Player 255 controls play of any pre-recorded video files to the display 118 of the client processor. Because the session uses VOIP telephony for its audio communication, sound data associated with the pre-recorded video files may be disabled from play, as is done in one preferred embodiment, but sound could optionally be enabled and played in addition to or instead of the VOIP File. The Video Player 255 operates in response to instructions from the Command Manager 220.

The Webcam Playback Player 265 plays any webcam feed files that were sent to all participants during the session. These files were saved by the communication server. Because the session uses VOIP telephony for its audio communication, sound data associated with the webcam files may be disabled from play, as is done in the current embodiment, but webcam sound could optionally be played in addition to or instead of the VOIP File. The Webcam Playback Player 265 operates in response to instructions from the Command Manager 220.

The Text Message Player 270 displays text message and status message data entered or displayed during a session. In a preferred embodiment, the text and status messages are saved on the communication server and are later sent to the web server as part of the Session Data File. The Text Message Player 270 operates in response to instructions from the Command Manager 220. The Drawing Player 260 plays vector graphics that were "drawn" to the screen by use of the computer mouse or other input device and were sent to all participants. The commands to create these vector graphics were stored as a sequence of commands in the Session Data File that is saved to the database 135 of the Web Server 130. The Drawing Player operates in response to instructions from the Command Manager 220.

Playback User Interface

FIG. 20 illustrates a user interface for playback selection and control in accordance with a preferred embodiment of the present invention. At the bottom of the screen is a text message display section 420. The text message display section 420 displays messages that were sent during the session by either the host or the system. Above the text message display section 420 is the control bar 410 with capability for user control of the playback process. Standard media controls are provided, including play/pause 414, rewind 412, and a positional slider 416. Above the controller 410 is the main view screen area 430. The view screen area displays a selected video in full or split screen as specified during the session, and also displays on top of the video any vector graphics drawn there by the presenter during the session. The view screen area will also display webcam playback files when a particular webcam data stream was selected by the host for broadcast to session participants. Before the session playback is activated, a download progress message 470 displays over the view screen area to inform the user of the download status, along with a Master Play button 480 that is enabled when media file download is complete. In one embodiment, session playback begins when the initial main audio and first video files have been downloaded. If a requested media item is not available when the session has reached the point at which the media item should be played, the system will pause the VOIP File and will display a download progress message 470 indicating the progress of the media request. See also, FIG. 21 which shows an exemplary user interface for playback control for one embodiment of the present invention.

Operation of the Command Manager

In one embodiment of the present invention, the Command Manager is implemented as Commands.as, which can be found in the source code below. It manages the commands from the session file. At initialization of playback, it saves the current date and time. On each execution, it then computes the elapsed time, converts the value to time quantum units, and executes any commands in the session data file with time values equal to the elapsed time quantum. Commands are executed in order according to the event type, by instantiating the appropriate command player (CamController, DrawScreen, etc.). It also contains functions to pause, resume, and restart the execution of commands.

The Command Manager 220, FIG. 17, executes the commands from the Session Data File. The commands executed by the Command Manager were created during the original session to reflect all actions of selecting, requesting, playing, and controlling various media for the session participants. The commands are stored in the Session Data File in XML format or other format suitable for parsing and execution. The structure and nature of the commands are described in more detail below. The Command Manager begins by repeatedly examining the Playback Elapsed Time, which it computes by querying the master clock and subtracting the value of the saved Initial Playback Time, to determine how much time has actually passed since the Initial Playback Time was saved and playback began 380. FIGS. 18 and 19. After determining the Playback Elapsed Time, the Command Manager compares the Playback Elapsed Time with the next Command Time in the file of commands 385. Because the Command Time is saved in the command as a number of time quanta (nominally, in units of 40 milliseconds), the Command Time must be converted to the same units of milliseconds to make the comparison. If the Playback Elapsed Time is equal to the next Command Time, all commands for that time will be executed 388, using the various media players to perform the operations 385 and 388. If the command that was executed was a command to End the Session 390, then some housekeeping tasks are performed 395 and playback is ended; otherwise, execution returns to check the current local time again until the next Command Time is equal to the Playback Elapsed Time.

Commands and Command Formats

FIG. 22 shows a sample command executed by the Command Manager 220, FIG. 17. The command is represented in XML format, although it could be stored in alternate representations with appropriate associated parsing. Each command consists of an event 520, a time of occurrence value 510, and one or more arguments 530. In the example shown, the event is a draw_event. The time value 520 is represented as a multiple of 40 millisecond intervals measured from the beginning of the session, to provide for a frame rate of 25 frames/sec. for playing media files. This 40 millisecond interval is the smallest increment of time that will be differentiated within the system. It is referred to as a "time quantum." Thus, events that occurred between 800 and 839 milliseconds in the session will be recorded with a time quantum value of 20. In the example represented in FIG. 22, the time value 520 is 10513 time quanta, representing a session elapsed time of 7 minutes and 0.520 seconds. During playback, commands with the same time quantum value will be executed by the Command Manager at the same time. During a session, multiple events of the same type occurring within a single 40 millisecond interval, such as multiple values of a mouse position within a 40 millisecond interval, are not saved to the Session Data File. The establishment of this 40 millisecond interval as the smallest time increment keeps the system from being overwhelmed by, for example, a large but unnecessarily detailed data stream of mouse positions during drawing.

An event in a command is an occurrence that changes the data being displayed, such as selection of a new video, a movement of the mouse or pen during drawing, or display of a status or text message. Events are executed by the Command Manager according to their event type. Event types comprise session events, draw events, webcam events, video events, message events, and playback events. The events, except for the playback events, reflect occurrences during the session. Session events, which have the highest priority, include starting, saving, and ending the session, connection status events reflecting any change in connection status with any of the servers, and failure notices. Session events are always executed first in any time quantum. Draw events include vector graphic commands for placing marks on the video screen, such as freehand, straight line, circle, color change, and clear. As mentioned earlier, only a single draw event is saved for any given quantum of time. Webcam events include stream in, stream out, start full screen, and stop full screen. The webcam feed, unlike the video files, is streamed, since it was simply playing in real-time during the session. The video files, in contrast, exist in their entirety before the session begins and are downloaded before play, because a pre-existing video file might be skipped forward during the session to any arbitrary position. Video events include play/pause of the audio and of the video, split screening, dragging the video or seeking to a position, rewinding, and checking download progress. Message events include text messages and a lesson note sent from the host. Playback events are events generated during the playback itself, either by user inputs during playback to control the progress of the playback, or by the system. Playback events include pausing and starting the Command Manager and the VOIP Player, synching and resynching, and disabling and enabling the user interface. Some playback events thus share characteristics of the video events, since playing back a session is similar to playing a video, and some are status events.

The arguments of a command are parameters identifying the particular event, such as the drawing action to be performed, and other information needed to perform the event, such as co-ordinates for a drawing action, or an identifier for the media file to be played. In the example in FIG. 22, the draw event is the command freehand_down (first argument) at screen position 262 horizontal (second argument) and 93 vertical (third argument). FIG. 23 illustrates a partial list of command events in one embodiment of the invention. Certain events are not allowed to occupy the same time quantum as others. For example, draw events cannot occupy the same time quantum as some video commands, such as SEEK_TO, and SEEK_TO cannot occupy the same time quantum as DRAG.

In an alternative preferred embodiment of the Command Manager that corresponds to the Playback Request module embodiment of FIG. 19, some media files may have been requested and are being downloaded in background while playback is in progress. If playback is begun before all media files have been downloaded, the Command Manager will verify that a needed media file is available before executing the command that requires the file. Media that was requested in background and has been preloaded will not be played until the time point at which the media began playing in the original live session. This time point, the Max Download Time, can be calculated from information in the Session Data File, because the event of Media Loaded was saved for the requested file for each participant. While the system is waiting on a media download, the user interface is disabled and no resynching will be performed by the Resynch Controller. During playback, because it is not necessary to wait for data transmission to the slowest client connection, and the client processor does not have an open communication stream; the playback is likely to download the requested media more rapidly than the live session did. However, when the command to be executed during playback requires a particular media file, the Command Manager will check whether download of the needed file has completed 386, and will pause both the Command Manager and the VOIP Player (step 387) if necessary until file download is complete, at which point command execution resumes 388.

Playback Operation

When the user presses the Master Play Button to begin playback of the session, the Synch Interval Timer 280, FIG. 17, which will determine when to resynchronize the playing files, and the Resynch Controller 290, which will maintain synchronization of the media files as they are played, are both initialized 360. The current date and time from the local master clock are saved as the Initial Playback Time 360. The Resynch Controller 290 then initializes the Command Manager 220 and the VOIP Player 250 to play the session. The VOIP Player 250 and the Command Manager 220 execute as separate processes.

In accordance with one preferred embodiment of the present invention, the playback module retrieves the playback commands. The recorder utility records the commands during the live session. The Command Manager, which is playback specific, only processes the commands during playback.

Figure 24:
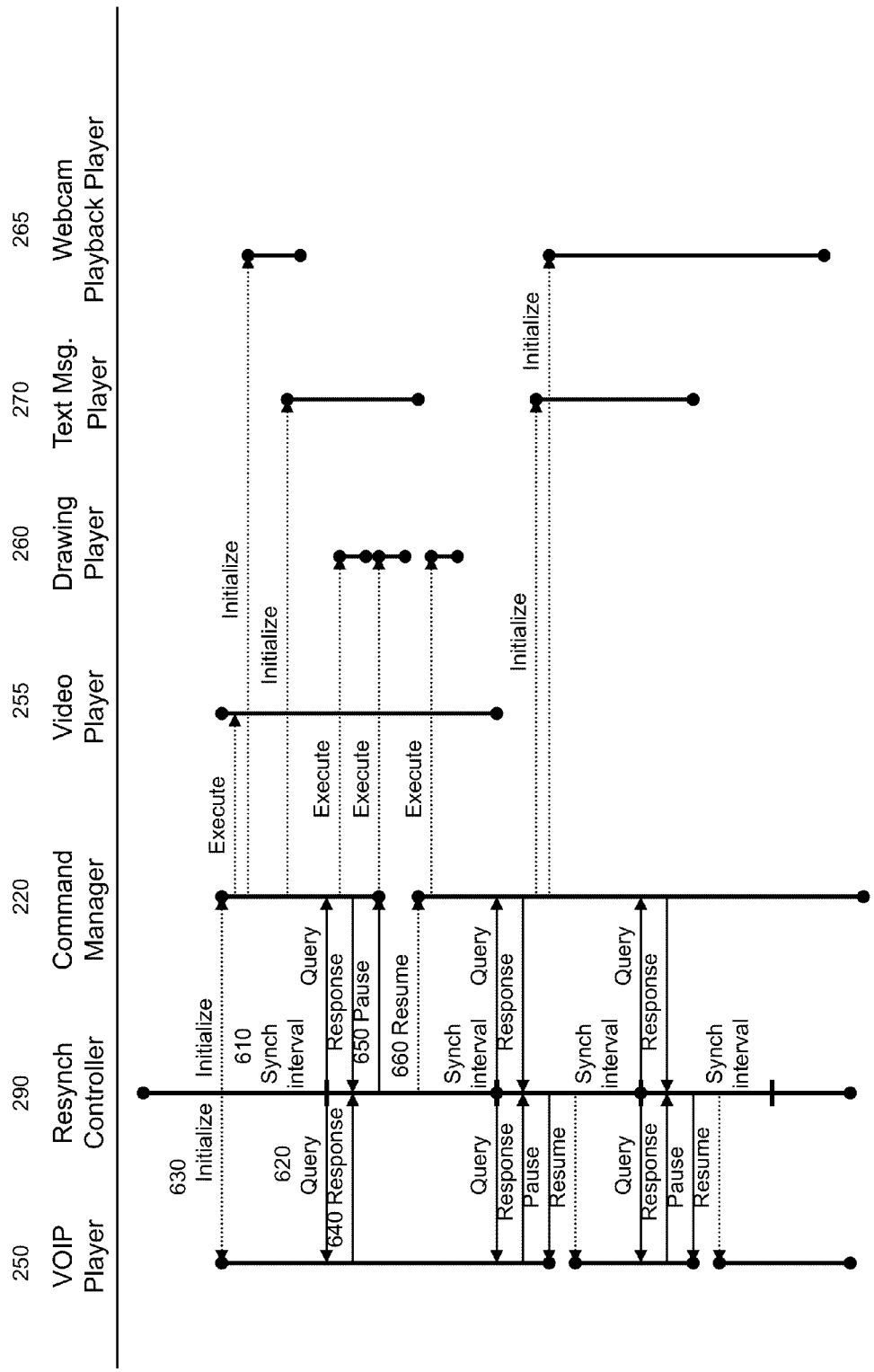
FIG. 24 shows an exemplary diagram of separate process threads during a portion of the execution of playback of a typical session for one preferred embodiment of the present invention.

FIG. 24 illustrates a sequence diagram for one embodiment of the present invention that shows the messages exchanged by FIG. 17 modules, namely Command Manager module 220, the VOIP Player module 250, the Resynch Controller module 290, and the other player modules during part of the playback of a session. In FIG. 24, the client has requested playback of a particular session; and the initial files, the Session Data File, the VOIP File, and the initial video file, have all been downloaded. After having downloaded the VOIP File and initial video file, the Resynch Controller initializes 630 the Command Manager and the VOIP Player. The Command Manager initializes the Video Player, which pauses at the first frame of the initial video until further commanded. In response to commands in the session file, the Command Manager initializes the Webcam Playback Player and the Text Message Player. At the expiration of the Synch Interval 610, the Resynch Controller queries 620 the VOIP Player and the Command Manager to respond with their current positions in playback execution. The Resynch Controller receives responses 640 from both the Command Manager and the VOIP Player. After evaluating and comparing the responses, the Resynch Controller computes the difference between the two elapsed execution times as the Pause Time. If one of the two queried processes has executed for more time than the other during the synch interval and thus is more advanced in its execution relative to the session initiation time, the more advanced process is Paused 650 for the Pause Time to allow the other process to catch up, and then Resumed 660. At the first Synch Interval, the Command Manager is paused. In response to data from the session file, the Command Manager executes operations using the Drawing Player to place vector graphics over the playing Video file. Because the Command Manager controls the operation of the other media players, and is maintained in synchrony with the VOIP Player, each command that affects a media player is synchronized with the VOIP File.

Videos used during the session are brief enough that separate synchronization with a playing video is unnecessary. In an alternative embodiment to support play of longer video files, the timing of the file being played by the Video Player may be included in the determination of which processes should be paused and which should be allowed to continue.

Resynchronization

The VOIP Player 250 and the Command Manager 220, FIG. 17, execute as separate processes, the VOIP Player playing the VOIP File, and the Command Manager executing commands from the Session Data File. The commands are generally accomplished by controlling the other media players. However, these separate processes can fall out of synchronization with each other as the multitasking operating system of the Client Processor 110 assigns time slots to execute higher priority tasks, resulting in incorrect playback. Thus, the system comprises procedures to maintain synchronization of the processes. The Resynch Controller performs periodic resynchronizations.

In accordance with one preferred embodiment of the present invention, the Resynch Controller resynchronizes the VOIP File played by the VOIP Player with the other media files played by the Command Manager. At initialization of the session playback, the Synch Interval Timer 280 is initialized to the Synch Internal Time. At the expiration of the Synch Interval Time, the Resynch Controller module 290 executes to bring the separate processes back into synchronization.

In one embodiment of the present invention, the Resynch Controller is implemented as SyncController.as, which can be found in the source code below. It controls the synchronization of the VOIP Player and the Command Manager. It initializes a timer to the RESINK_INTERVAL (30 seconds). It also defines functions to compare the values of the Command Manager and VOIP Player elapsed time of playback, and to pause execution of either the VOIP Player (PAUSE_PHONECALL) or the Command Manager (PAUSE_COMMANDS) for the length of time in milliseconds equal to the difference between the values. The functions are executed when the timer reaches the RESINK_INTERVAL value. Whichever process was paused is resumed at the end of the pause time. This module also contains code to check whether a split screen has been requested, and if so, to pause playback for the additional video file to be downloaded. Playback is paused for the time that the video downloaded in the live lesson.

Figure 25:
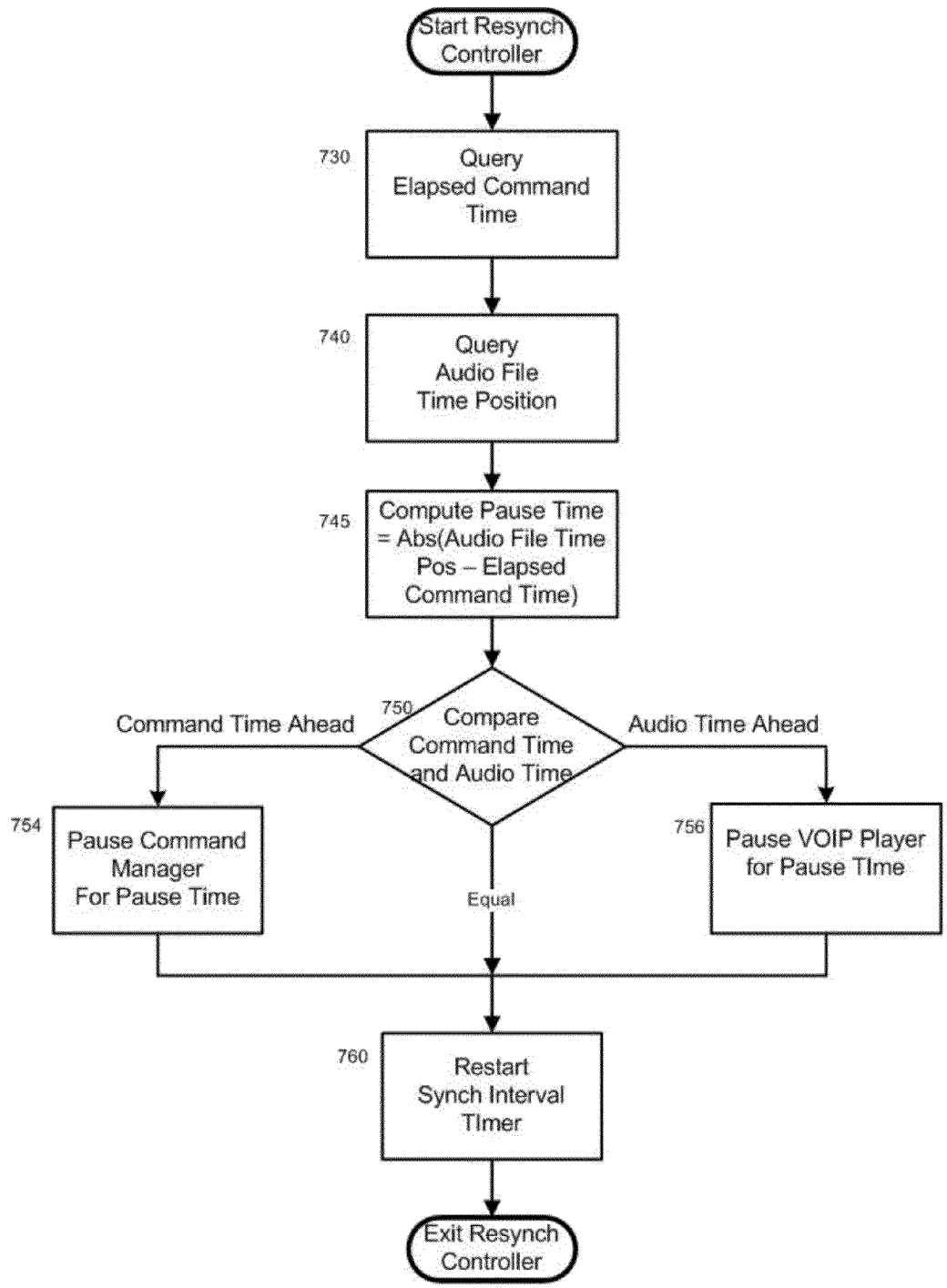
FIG. 25 shows an exemplary flowchart of the playback resynchronization operation for one preferred embodiment of the present invention.
Figure 26:
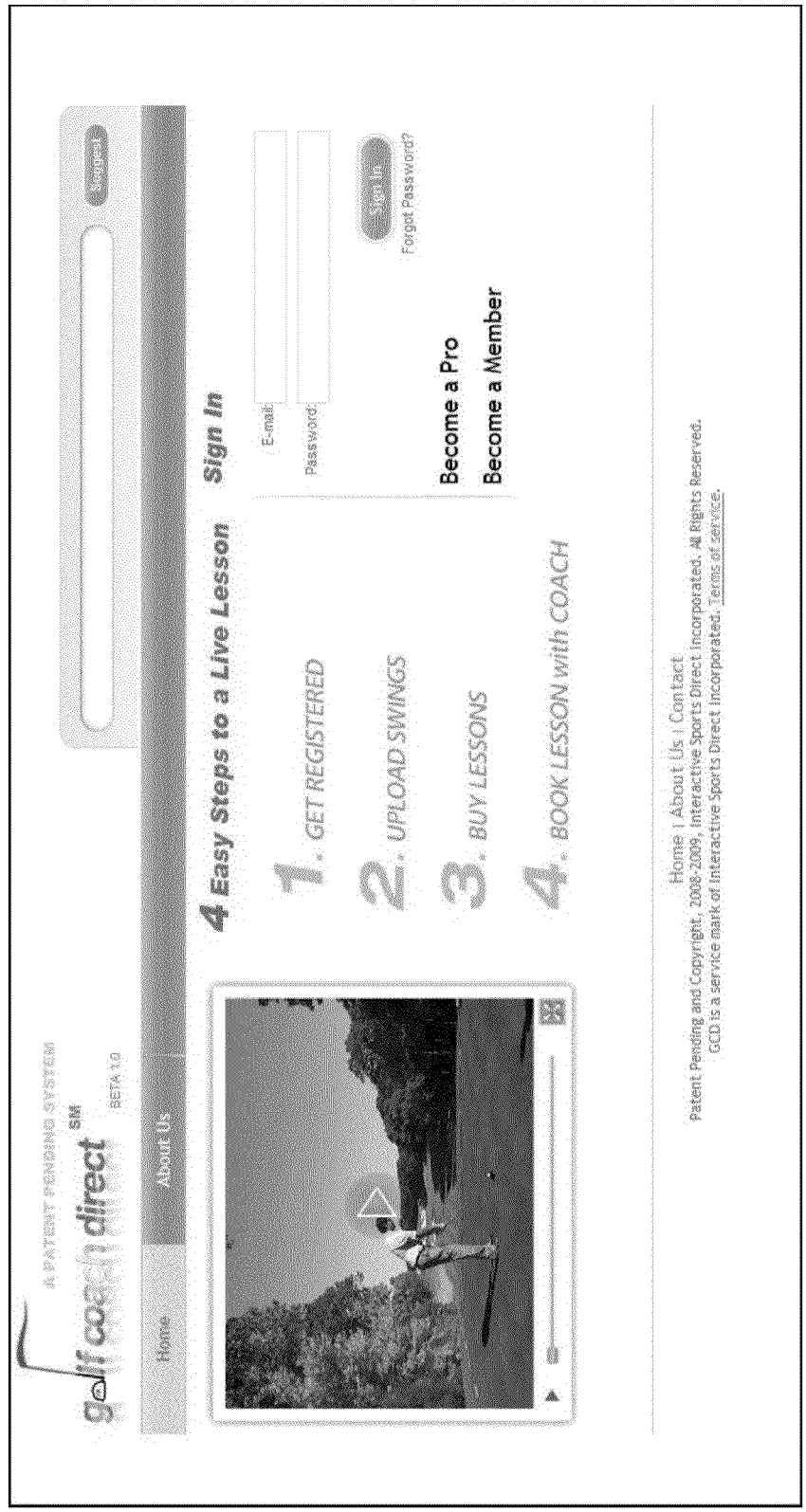
Figure 27:
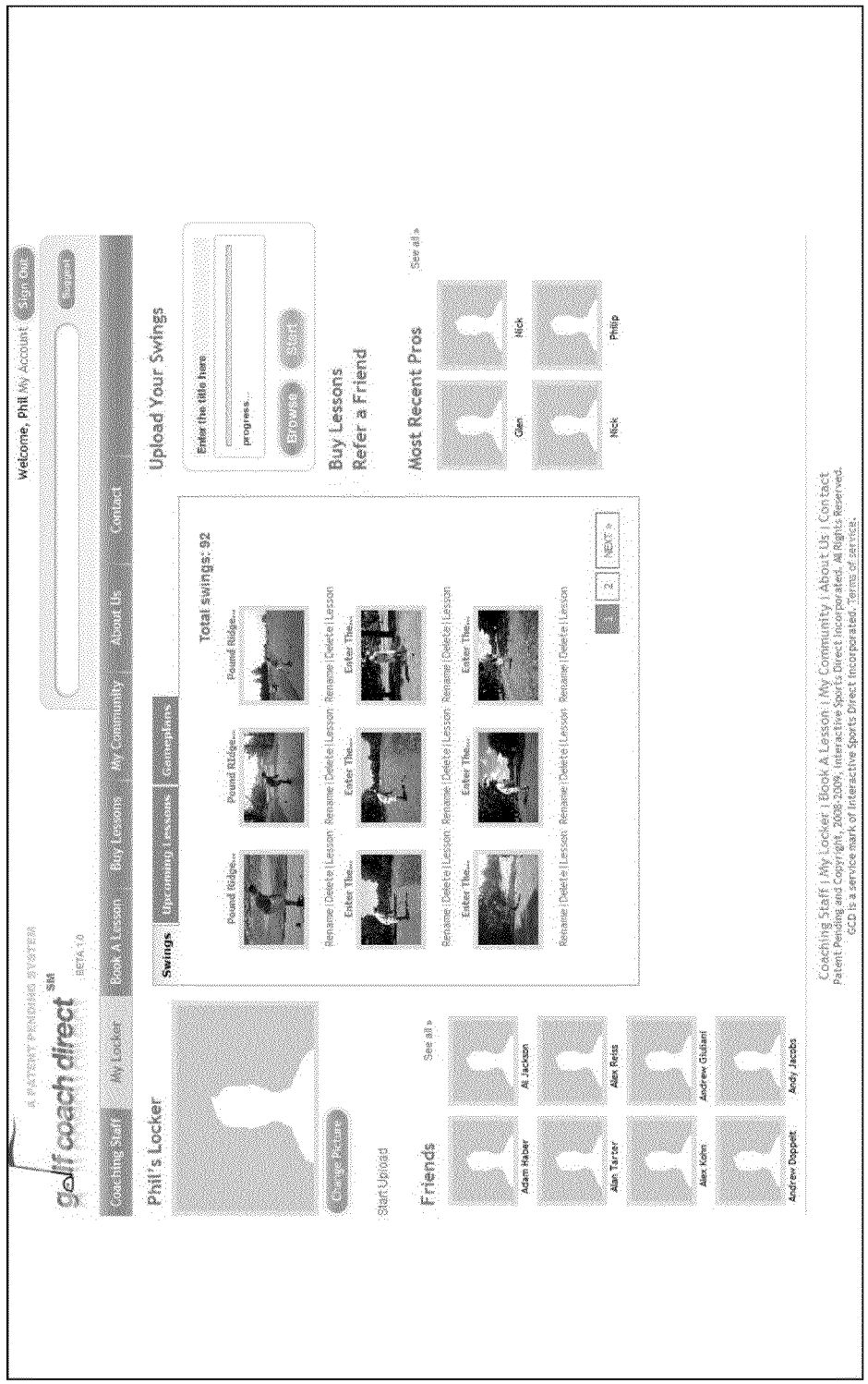
Figure 28:
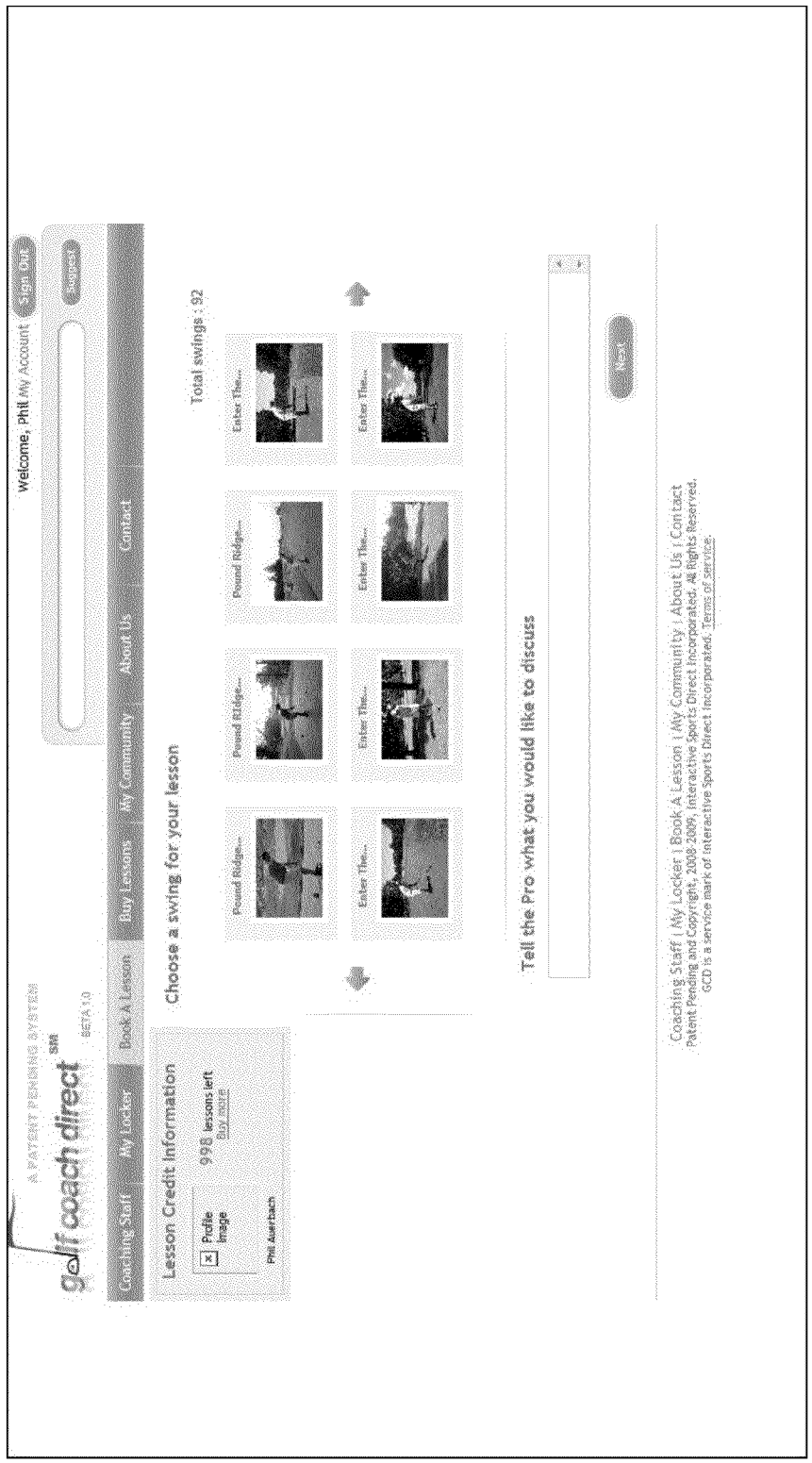
Figure 29:
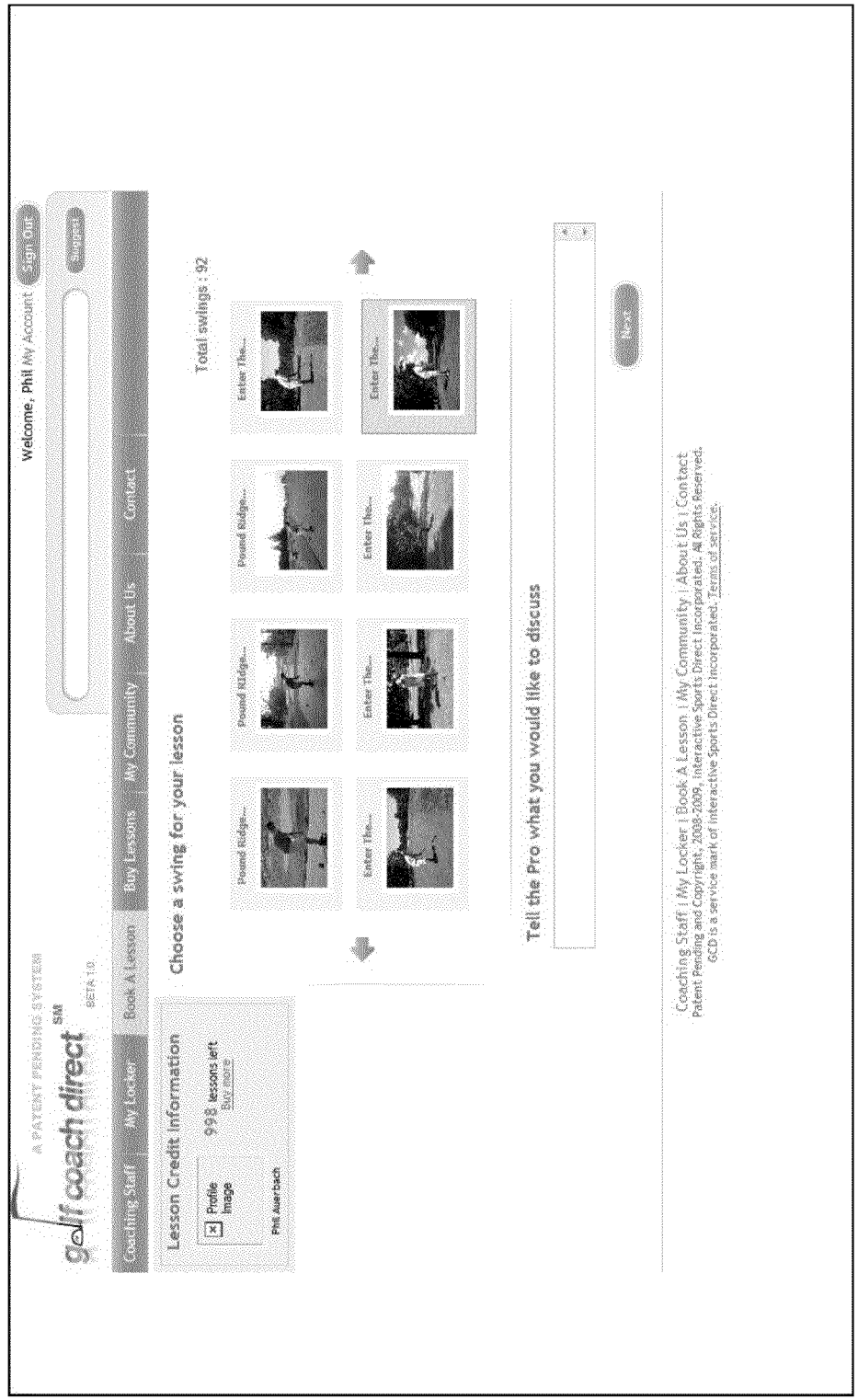
Figure 31:
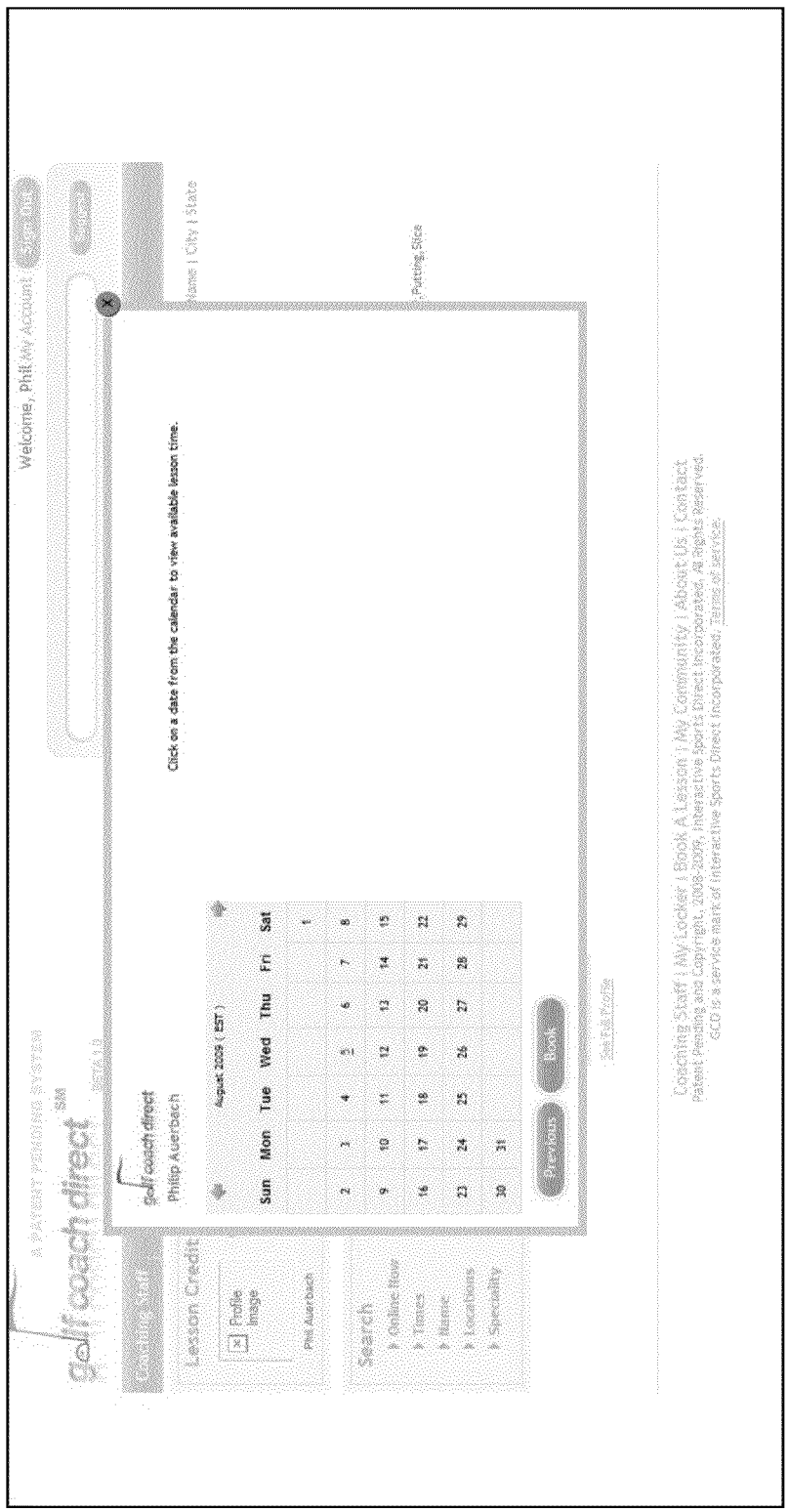
Figure 32:
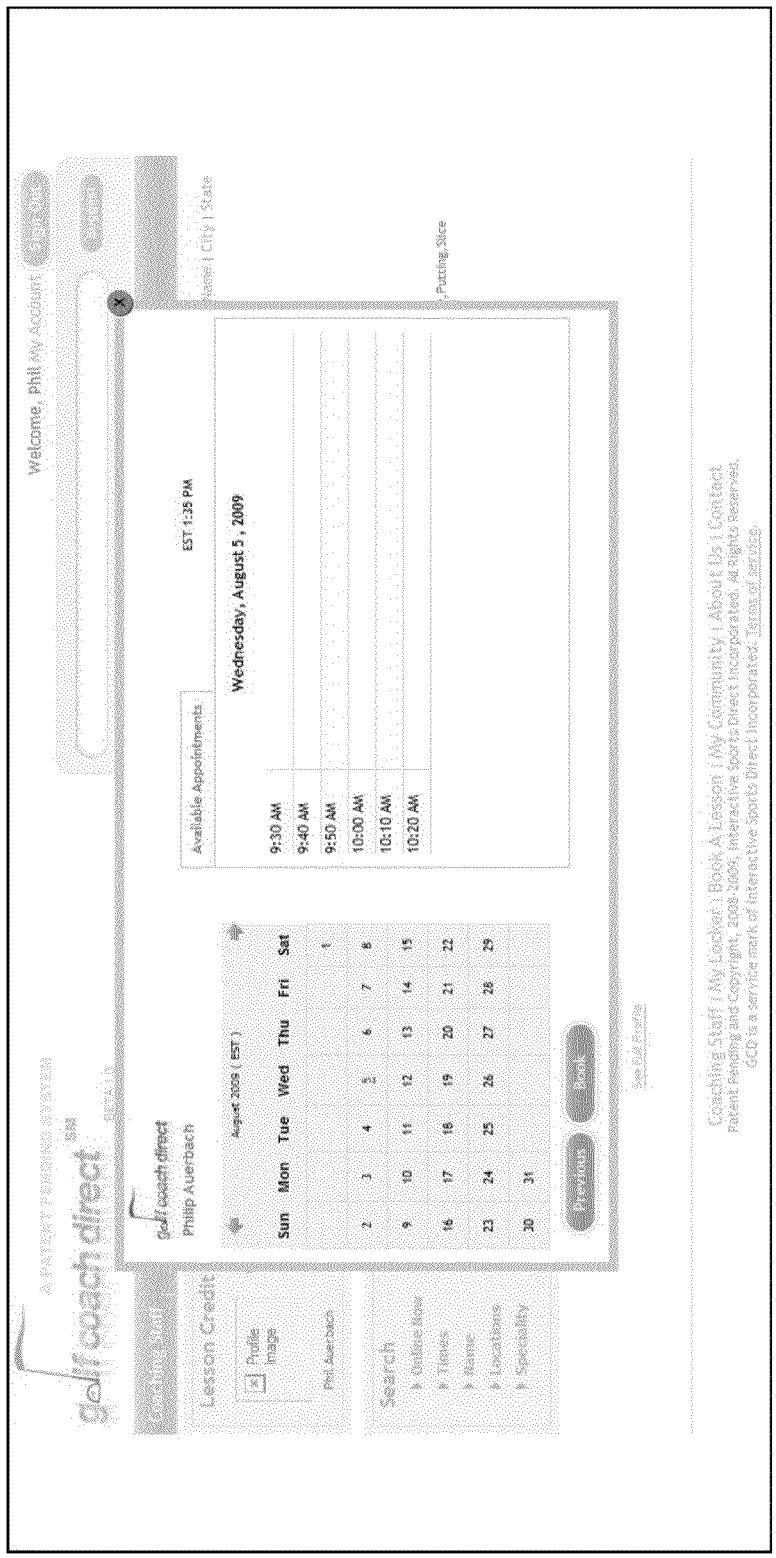
Figure 33:
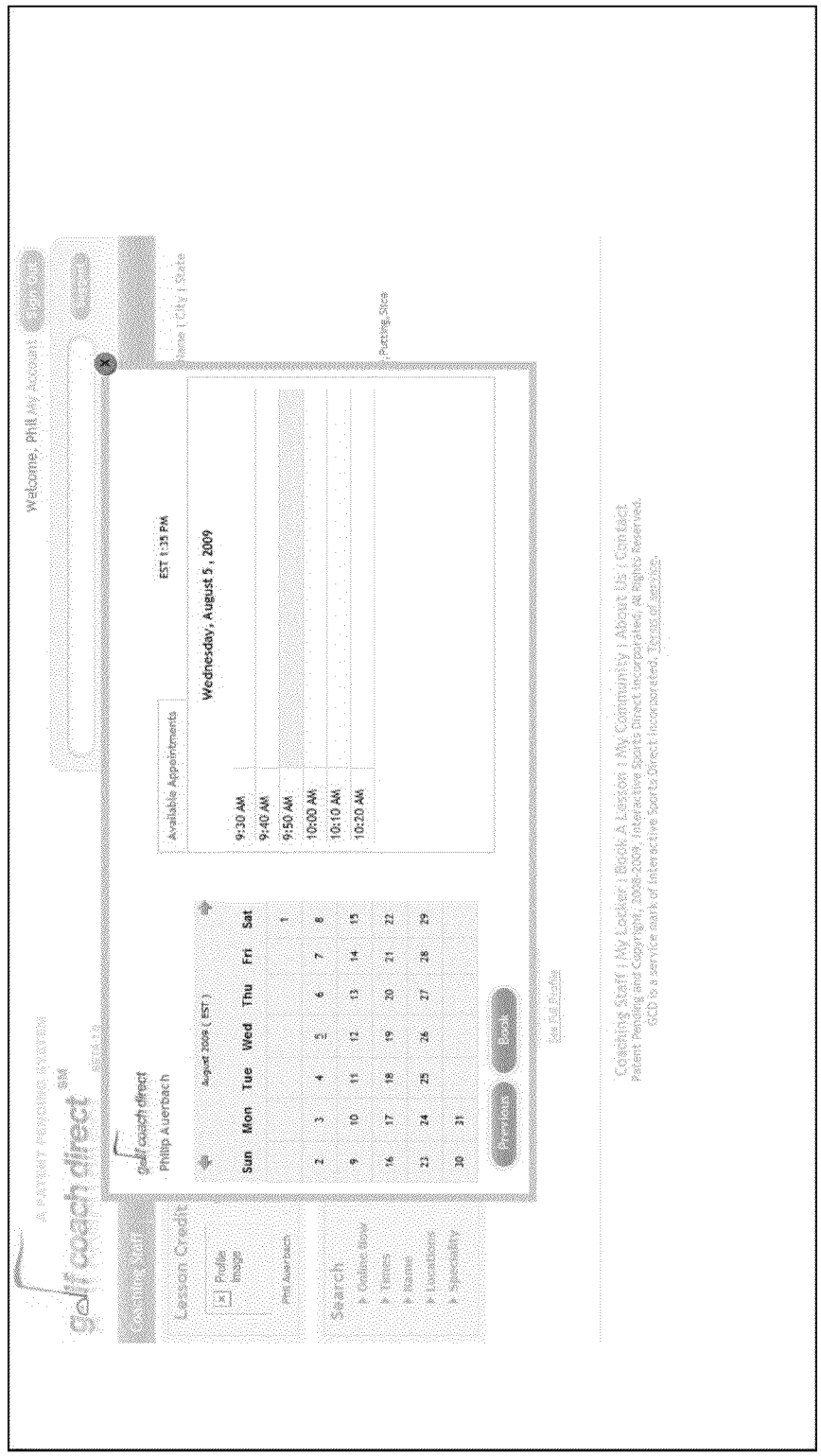
Figure 34:
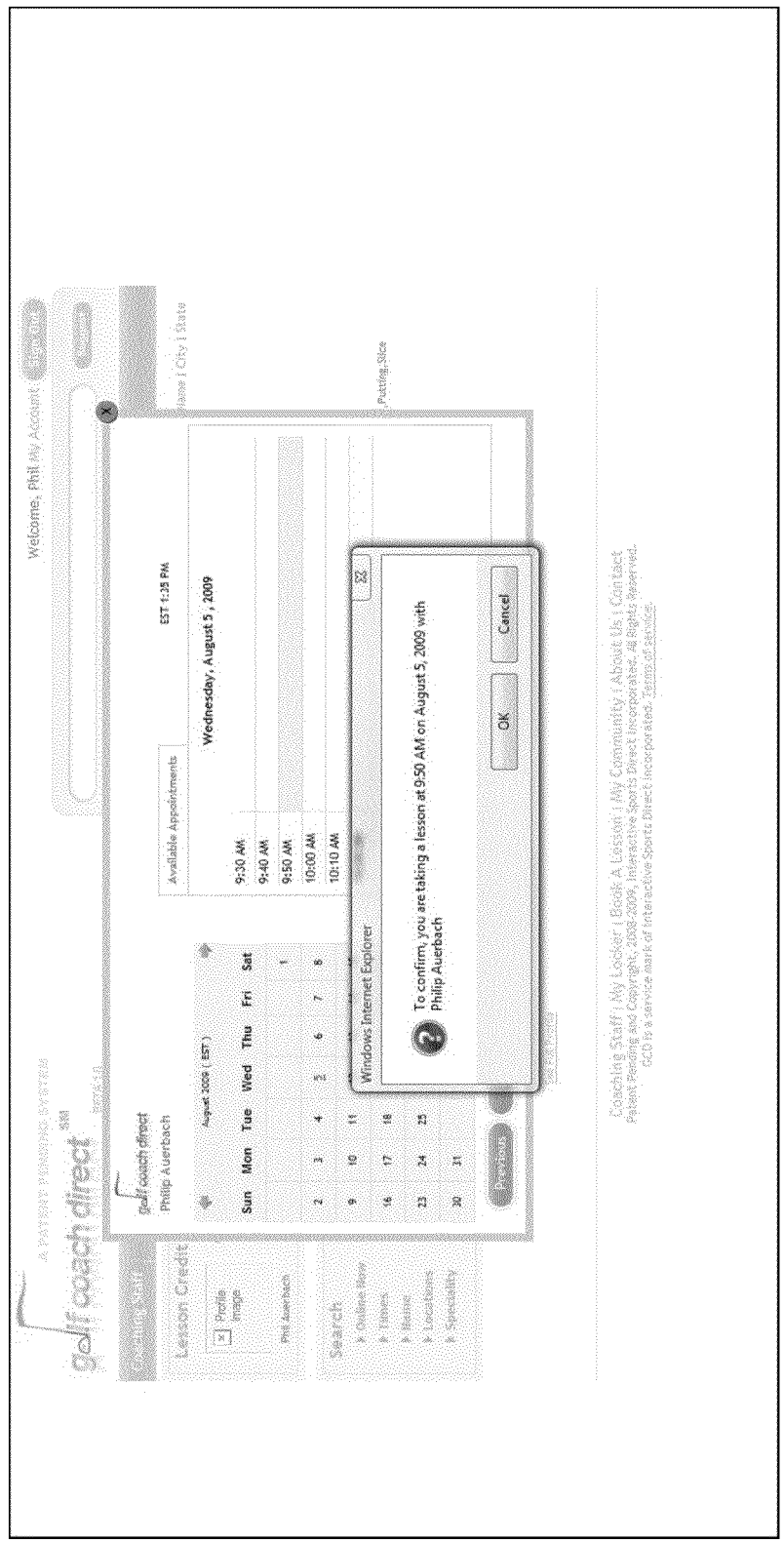
Figure 35:
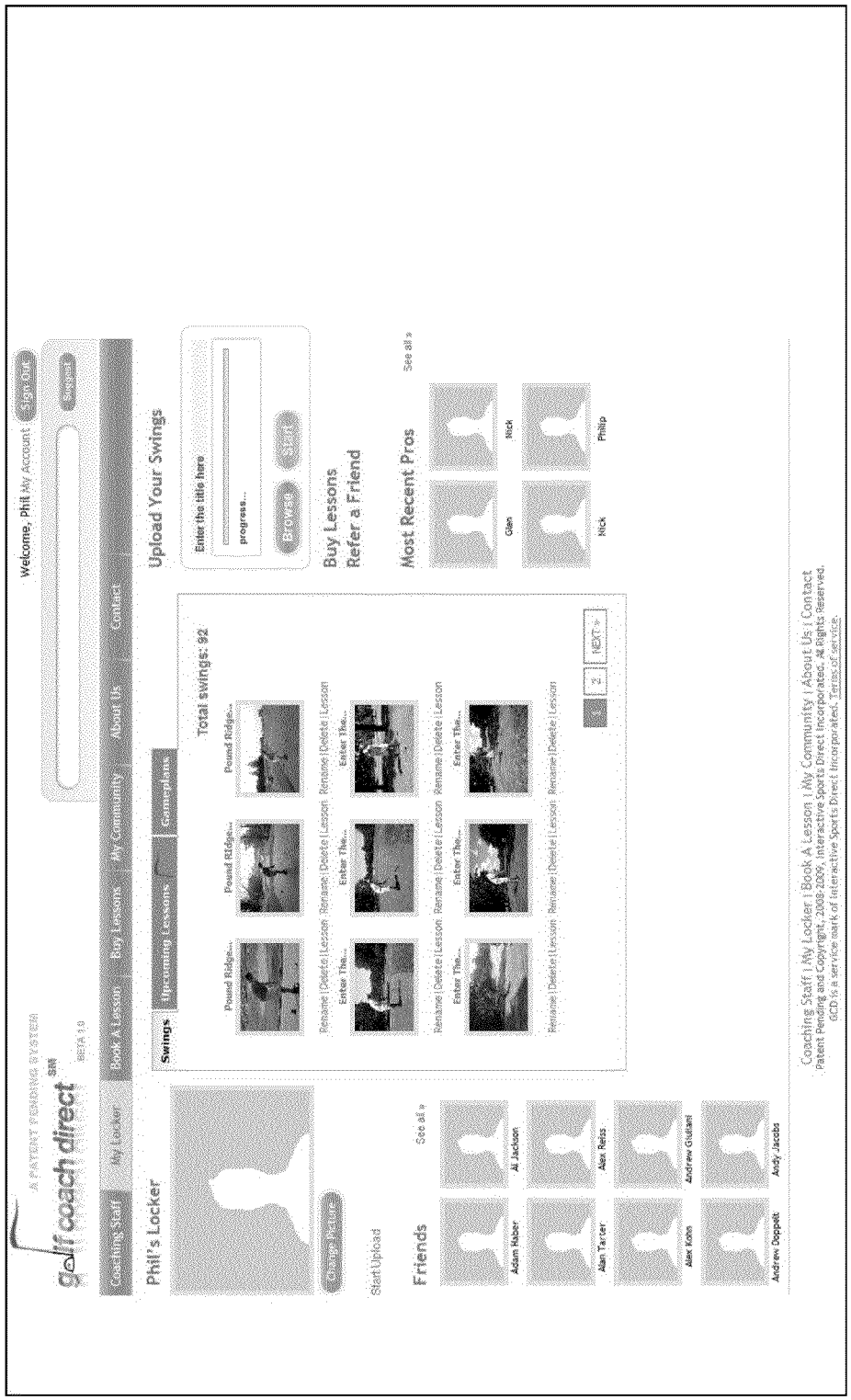
Figure 36:
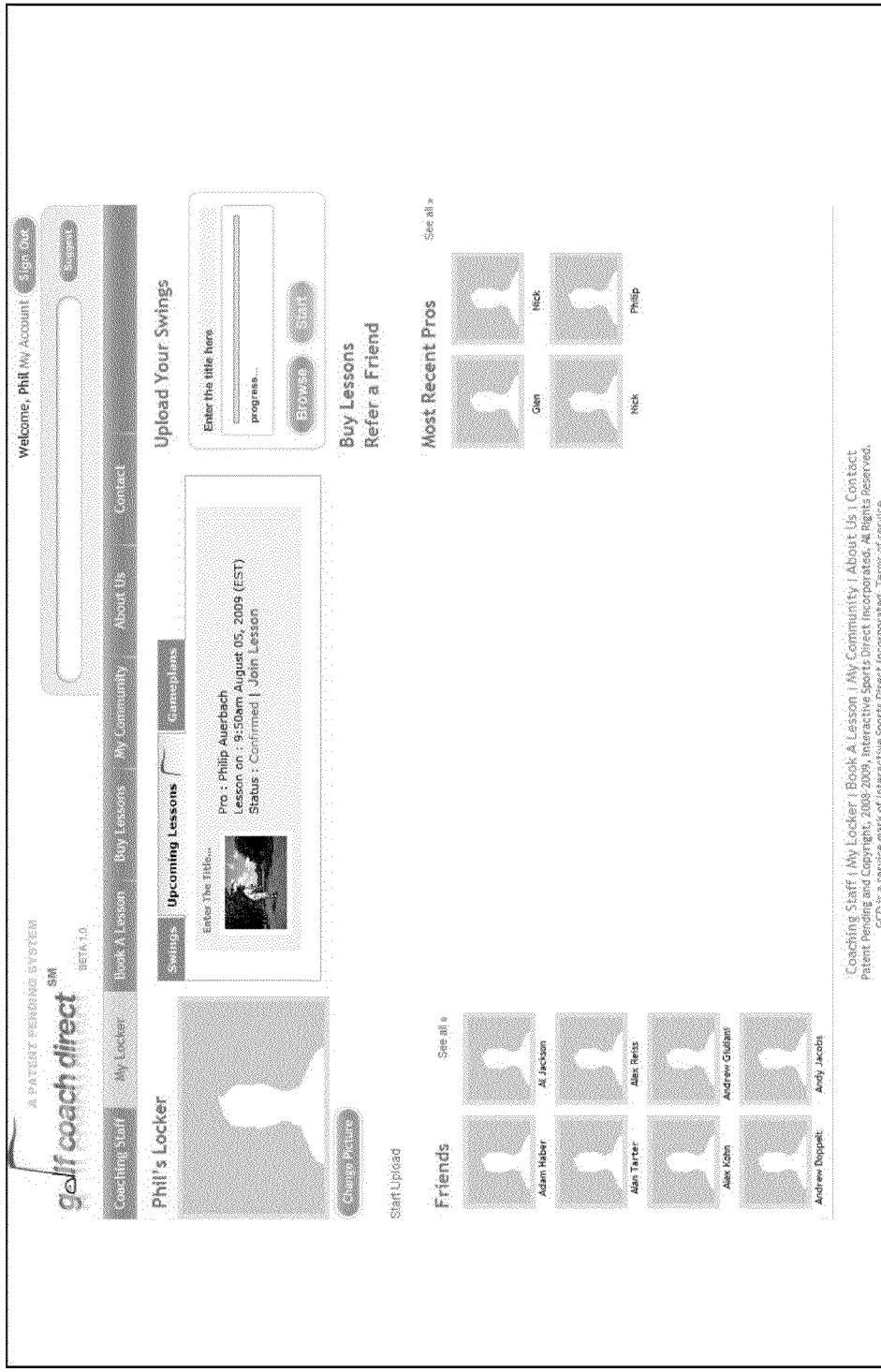

FIG. 25 shows a flowchart of the operation of the Resynch Controller in one preferred embodiment of the invention. The Resynch Controller queries the Command Manager for the Elapsed Command Time 730. The Elapsed Command Time is the number of time quanta (nominally, 40 millisecond intervals) that the Command Manager has counted since playback was initialized. The Resynch Controller then queries the VOIP Player for the VOIP File Time Position 740. Because the VOIP File being played includes information stating the current time position of the file, the VOIP Player can always return the accurate current position of the VOIP File relative to its start.

The Resynch Controller then computes the Pause Time 745 as the absolute value of the difference between the Elapsed Command Time and the Audio File Time Position. The Resynch Controller next compares the Elapsed Command Time with the VOIP File Time Position 750, in order to determine whether either process must be paused to resynchronize the media as playback progresses. In order to compare the two values, the Elapsed Command Time is converted to milliseconds.

The more advanced process will be paused for the Pause Time, while the tardy process continues playing to catch up. Synchronizing in this fashion guarantees that no data is lost or skipped as a result of the resynching process, while the playing files are returned to relative synchronization. If the Command Manager is more advanced, the Command Manager will be paused while the VOIP File continues playing 754. If the VOIP Player is more advanced, the VOIP Player will be paused while the Command Manager continues executing 756. The Synch Interval Timer will then be reinitialized to the Synch Interval Time 760 to determine the next synch interval. If the Command Manager has been paused, when it is restarted, its check of the local time on the master clock will enable it to determine the accurate Elapsed Command Time in order to determine when the next commands are ready to be executed.

Resynchronizing in the course of a media request need not occur for any pre-existing media file requested during the course of the session, because play of other media is controlled by the Command Manager. Instead, as discussed earlier, the Max Download Time for the media download during the session is available can be calculated from information in the Session Data File as a limit for the media download during playback, and other processes are synched to that value.

All media files downloaded during playback of a session are cached until the user leaves the application, and, if the session playback is repeated before exiting the application, cached media will be used rather than reloading the media from the remote database. However, the media is not permanently stored to the user's local system. In an alternate embodiment, all media files that comprise a session can be optionally permanently saved to the user's local system on first playback request, and playback can thereafter be done from the local files.

In another embodiment, a processor performing playback of a session can concurrently instantiate another process to record and encode the session as it is played back, using functionality such as that provided by the open source software RecordMyDesktop, thereby producing a standard playable merged audio and video file. The file produced can be any format of playable integrated audio and video, such as the mp4 format from MPEG, or the QuickTime® or mov file format available from Apple®, or an open source format such as the ogg file format maintained by the Xiph.org Foundation. Thereafter, the standard playable A/V file produced can be used for playback on any device capable of playing video files. The file created can also be saved to the database for future download and playback.

The present invention is disclosed for use in providing individualized or group personal golf lessons and instructions. However, this system may be used for providing individualized or group personal lessons and instruction for any number of different activities including but not limited to tennis, baseball, cooking, knitting, arts and crafts, medical rehabilitation exercises, home improvement, and automobile repair.

In this disclosure herein, the invention is described with reference to acts and symbolic representations of operations that are performed by one or more computers, unless indicated otherwise. As such, it will be understood that such acts and operations, which were at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention was described in the foregoing context, it is not meant to be limiting as those of skill in the art will appreciate that various of the acts and operations described hereinafter may also be implemented in hardware. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize again that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof. While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Database Schema Tables

Tables 1 through 39 show database table schema for a database in accordance with a preferred embodiment of the invention directed to a coach and his/her student. The database tables contain information regarding user information for both coaches and students, such as, lesson types available, lessons scheduled, lesson packages purchased, pro schedules, game plans, friendships, and videos uploaded, and are used throughout the system.

©2009 Interactive Sports Direct Incorporated.

TABLE 1

```
-- Table structure for table `account`
--
CREATE TABLE IF NOT EXISTS `account` (
    `accountID` bigint(20) unsigned NOT NULL auto_increment,
    `accountTypeID` tinyint(5) unsigned NOT NULL COMMENT
'student,coach,admin...',
    `email` varchar(128) NOT NULL COMMENT 'username',
    `password` varchar(32) NOT NULL,
    `creationDate` datetime NOT NULL,
    `active` int(1) NOT NULL default '0' COMMENT 'email
confirmation',
    `firstName` varchar(32) NOT NULL,
    `lastName` varchar(32) NOT NULL,
    `photo` varchar(36) default 'headshot.jpg' COMMENT 'for all sizes',
    PRIMARY KEY (`accountID`),
    UNIQUE KEY `email` (`email`),
    KEY `accountType` (`accountTypeID`,`password`),
    KEY `password` (`password`),
    KEY `active` (`active`)
) ENGINE=MyISAM DEFAULT CHARSET=latin1
AUTO_INCREMENT=177 ;
```

TABLE 2

```
-- Table structure for table `account_type`
--
CREATE TABLE IF NOT EXISTS `account_type` (
    `accountTypeID` tinyint(3) unsigned NOT NULL,
    `title` varchar(32) NOT NULL,
    `permissions` varchar(8) default NULL,
    PRIMARY KEY (`accountTypeID`),
    UNIQUE KEY `title` (`title`)
) ENGINE=MyISAM DEFAULT CHARSET=latin1;
```

TABLE 3

```
-- Table structure for table `availability`
--
CREATE TABLE IF NOT EXISTS `availability` (
    `availabilityID` bigint(20) unsigned NOT NULL auto_increment,
    `coachID` bigint(20) unsigned NOT NULL,
    `startDate` datetime NOT NULL,
    `endDate` datetime NOT NULL,
    `startTimeSlotID` smallint(5) unsigned NOT NULL,
    `endTimeSlotID` smallint(5) unsigned NOT NULL,
    PRIMARY KEY (`availabilityID`),
    KEY `coachID` (`coachID`,`startDate`,`endDate`)
) ENGINE=MyISAM DEFAULT CHARSET=latin1
AUTO_INCREMENT=1 ;
```

TABLE 4

```
-- Table structure for table `ci_sessions`
--
CREATE TABLE IF NOT EXISTS `ci_sessions` (
    `session_id` varchar(40) collate latin1_general_ci NOT NULL
default '0',
    `accountID` bigint(20) unsigned NOT NULL,
    `ip_address` varchar(16) collate latin1_general_ci NOT NULL
default '0',
    `user_agent` varchar(50) collate latin1_general_ci NOT NULL,
    `last_activity` int(10) unsigned NOT NULL default '0',
    `user_data` text collate latin1_general_ci NOT NULL,
    PRIMARY KEY (`session_id`),
    KEY `accountID` (`accountID`)
) ENGINE=MyISAM DEFAULT CHARSET=latin1
COLLATE=latin1_general_ci;
```

TABLE 5

```
-- Table structure for table `coach`
--
CREATE TABLE IF NOT EXISTS `coach` (
    `coachID` bigint(20) unsigned NOT NULL auto_increment,
    `accountID` bigint(20) unsigned NOT NULL,
    `zipCode` varchar(10) NOT NULL,
    `homeTown` varchar(50) NOT NULL,
    `state` varchar(50) NOT NULL,
    `yearsTeaching` smallint(4) NOT NULL,
    `gender` varchar(1) default NULL COMMENT 'F or M',
    `homeCourse` varchar(256) default NULL,
    `favoriteCourse` varchar(256) default NULL,
    `biography` text,
    `accomplishments` varchar(2048) default NULL,
    `specialties` varchar(1024) default NULL,
    `philosophy` text,
    PRIMARY KEY (`coachID`),
    UNIQUE KEY `accountID` (`accountID`),
    KEY `zipCode` (`zipCode`)
) ENGINE=MyISAM DEFAULT CHARSET=utf8
AUTO_INCREMENT=32 ;
```

TABLE 6

```
--
-- Table structure for table 'coachschedule_date'
--
CREATE TABLE IF NOT EXISTS 'coachschedule_date' (
    'schedulDateID' bigint(20) NOT NULL auto_increment
    COMMENT 'primary key ',
    'dateID' bigint(20) NOT NULL COMMENT 'from date_sloat table',
    'coachID' bigint(20) NOT NULL,
    PRIMARY KEY ('schedulDateID'),
    KEY 'dateID' ('dateID'),
    KEY 'coachID' ('coachID')
) ENGINE=MyISAM DEFAULT CHARSET=latin1
COLLATE=latin1_general_ci AUTO_INCREMENT=248 ;
```

TABLE 7

```
--
-- Table structure for table 'coachschedule_time'
--
CREATE TABLE IF NOT EXISTS 'coachschedule_time' (
    'schedulTimeID' bigint(20) unsigned NOT NULL auto_increment,
    'schedulDateID' bigint(20) NOT NULL COMMENT 'from schedul
table',
    'dateID' bigint(20) NOT NULL COMMENT 'from date_sloat table',
    'timeSlotID' int(11) NOT NULL COMMENT 'from time_sloat
table',
    'scheduleTime' datetime NOT NULL,
    'status' enum('Available','Booked') collate latin1_general_ci NOT
NULL,
    PRIMARY KEY ('schedulTimeID'),
    KEY 'dateID' ('dateID'),
    KEY 'timeId' ('timeSlotID'),
    KEY 'schedulDateID' ('schedulDateID')
) ENGINE=MyISAM DEFAULT CHARSET=latin1
COLLATE=latin1_general_ci AUTO_INCREMENT=4160 ;
```

TABLE 8

```
--
-- Table structure for table 'coach_blog'
--
CREATE TABLE IF NOT EXISTS 'coach_blog' (
    'blogID' int(11) NOT NULL auto_increment,
    'coachID' int(11) NOT NULL,
    'title' varchar(128) NOT NULL,
    'body' text NOT NULL,
    'time' datetime NOT NULL,
    KEY 'blogID' ('blogID')
) ENGINE=MyISAM DEFAULT CHARSET=latin1
AUTO_INCREMENT=9 ;
```

TABLE 9

```
--
-- Table structure for table 'coach_blog_comments'
--
CREATE TABLE IF NOT EXISTS 'coach_blog_comments' (
    'commentID' int(11) NOT NULL auto_increment,
    'blogID' int(11) NOT NULL,
    'accountID' int(11) NOT NULL,
    'comment' text NOT NULL,
    'time' date NOT NULL,
    KEY 'commentID' ('commentID')
) ENGINE=MyISAM DEFAULT CHARSET=latin1
AUTO_INCREMENT=8 ;
```

TABLE 10

```
--
-- Table structure for table 'coach featured'
--
CREATE TABLE IF NOT EXISTS 'coach_featured' (
    'coachID' bigint(20) NOT NULL,
    'isFeatured' tinyint(1) NOT NULL default '0' COMMENT
'1=Featured 0=not Featured',
    'order' int(11) NOT NULL,
    PRIMARY KEY ('coachID'),
    KEY 'isFeatured' ('isFeatured')
) ENGINE=MyISAM DEFAULT CHARSET=latin1
COLLATE=latin1_general_ci;
```

TABLE 11

```
--
-- Table structure for table 'coach_lessoncredit'
--
CREATE TABLE IF NOT EXISTS 'coach_lessoncredit' (
    'coachlessoncreditID' bigint(20) NOT NULL auto_increment
    COMMENT 'primary key',
    'lessonID' bigint(20) NOT NULL,
    'coachID' bigint(20) NOT NULL,
    'studentID' bigint(20) NOT NULL,
    'amount' double NOT NULL default '0' COMMENT 'amount per
lesson',
    'completDate' datetime NOT NULL,
    PRIMARY KEY ('coachlessoncreditID'),
    KEY 'lessonID' ('lessonID'),
    KEY 'coachID' ('coachID'),
    KEY 'studentID' ('studentID'),
    KEY 'completDate' ('completDate')
) ENGINE=MyISAM DEFAULT CHARSET=latin1
COLLATE=latin1_general_ci AUTO_INCREMENT=178 ;
```

TABLE 12

```
--
-- Table structure for table 'coach_rating'
--
CREATE TABLE IF NOT EXISTS 'coach_rating' (
    'coachRatingID' bigint(20) unsigned NOT NULL,
    'coachID' bigint(20) unsigned NOT NULL,
    'studentID' bigint(20) unsigned NOT NULL,
    'score' smallint(6) unsigned NOT NULL,
    'dateStamp' date NOT NULL,
    PRIMARY KEY ('coachRatingID'),
    KEY 'accountID' ('score'),
    KEY 'coachID' ('coachID'),
    KEY 'studentID' ('studentID')
) ENGINE=MyISAM DEFAULT CHARSET=latin1;
```

TABLE 13

```
--
-- Table structure for table 'coach_revenue_withdraw'
--
CREATE TABLE IF NOT EXISTS 'coach_revenue_withdraw' (
    'withdrawID' int(11) NOT NULL,
    'coachID' bigint(20) NOT NULL,
    'amount' double default NULL,
    'withdrawDate' datetime default NULL,
    PRIMARY KEY ('withdrawID'),
    KEY 'coachID' ('coachID'),
    KEY 'amount' ('amount'),
    KEY 'amount_2' ('amount')
) ENGINE=MyISAM DEFAULT CHARSET=latin1
COLLATE=latin1_general_ci;
```

TABLE 14

```
-- Table structure for table 'coach_schedule'
--
CREATE TABLE IF NOT EXISTS 'coach_schedule' (
    'coach_scheduleID' bigint(20) unsigned NOT NULL
auto_increment,
    'coachID' bigint(20) unsigned NOT NULL,
    'startDateTime' datetime NOT NULL,
    'endDateTime' datetime NOT NULL,
    PRIMARY KEY ('coach_scheduleID'),
    KEY 'coachID' ('coachID')
) ENGINE=InnoDB DEFAULT CHARSET=latin1
AUTO_INCREMENT=40 ;
```

TABLE 15

```
--
-- Table structure for table 'date_slot'
--
CREATE TABLE IF NOT EXISTS 'date_slot' (
    'dateID' bigint(20) NOT NULL auto_increment COMMENT
'primary key',
    'sDate' date NOT NULL,
    PRIMARY KEY ('dateID')
) ENGINE=MyISAM DEFAULT CHARSET=latin1
COLLATE=latin1_general_ci
AUTO_INCREMENT=1462 ;
```

TABLE 16

```
--
-- Table structure for table 'friendships'
--
CREATE TABLE IF NOT EXISTS 'friendships' (
    'friendshipID' bigint(20) NOT NULL auto_increment,
    'friendOfID' varchar(255) character set latin1 NOT NULL,
    'friendID' varchar(255) character set latin1 NOT NULL,
    'invitedByID' varchar(255) character set latin1 NOT NULL,
    'inviteDate' datetime NOT NULL,
    'inviteKey' varchar(255) character set latin1 default NULL,
    'acceptStatus' enum('Pending','Approved','Rejected') character set
latin1 NOT NULL default
'Pending',
    'inviteMessage' text character set latin1 NOT NULL,
    PRIMARY KEY ('friendshipID'),
    UNIQUE KEY 'friendOfID' ('friendOfID','friendID'),
    KEY 'inviteDate' ('inviteDate'),
    KEY 'friendOfID_2' ('friendOfID'),
    KEY 'friendID' ('friendID')
) ENGINE=MyISAM DEFAULT CHARSET=latin1
COLLATE=latin1_general_ci AUTO_INCREMENT=274 ;
```

TABLE 17

```
--
-- Table structure for table 'gameplan'
--
CREATE TABLE IF NOT EXISTS 'gameplan' (
    'gameplanID' bigint(20) unsigned NOT NULL auto_increment,
    'lessonKey' varchar(32) NOT NULL,
    'dateStamp' datetime NOT NULL,
    PRIMARY KEY ('gameplanID'),
    UNIQUE KEY 'lessonKey' ('lessonKey')
) ENGINE=MyISAM DEFAULT CHARSET=latin1
AUTO_INCREMENT=78 ;
```

TABLE 18

```
--
-- Table structure for table 'gameplan_tip'
--
CREATE TABLE IF NOT EXISTS 'gameplan_tip' (
    'gameplanTipID' bigint(20) unsigned NOT NULL auto_increment,
    'gameplanID' bigint(20) unsigned NOT NULL,
    'image' varchar(40) NOT NULL,
    'copy' varchar(2048) NOT NULL,
    PRIMARY KEY ('gameplanTipID'),
    KEY 'gameplanID' ('gameplanID')
) ENGINE=MyISAM DEFAULT CHARSET=latin1
AUTO_INCREMENT=92 ;
```

TABLE 19

```
--
-- Table structure for table 'golf_tips'
--
CREATE TABLE IF NOT EXISTS 'golf_tips' (
    'tips_id' int(11) NOT NULL auto_increment,
    'title' varchar(255) collate latin1_general_ci default NULL,
    'description' text collate latin1_general_ci,
    'pic' varchar(255) collate latin1_general_ci default NULL,
    'add_date' datetime default NULL,
    PRIMARY KEY ('tips_id')
) ENGINE=MyISAM DEFAULT CHARSET=latin1
COLLATE=latin1_general_ci
AUTO_INCREMENT=1 ;
```

TABLE 20

```
--
-- Table structure for table 'instant_lesson'
--
CREATE TABLE IF NOT EXISTS 'instant_lesson' (
    'instant_lessonID' bigint(20) NOT NULL auto_increment,
    'confirmed' int(3) NOT NULL default '0' COMMENT
'0=unconfirmed,1=confirmed,2=Cancel',
    'coachID' bigint(20) NOT NULL,
    'studentID' bigint(20) default NULL,
    'videoID' int(11) default NULL,
    'topic' varchar(255) collate latin1_general_ci default NULL,
    'timeSlotID' int(11) default NULL,
    'lessonDate' datetime default NULL,
    'requestedDate' datetime default NULL,
    PRIMARY KEY ('instant_lessonID'),
    KEY 'confirmed' ('confirmed'),
    KEY 'coachID' ('coachID'),
    KEY 'studentID' ('studentID'),
    KEY 'requestedDate' ('requestedDate')
) ENGINE=MyISAM DEFAULT CHARSET=latin1
COLLATE=latin1_general_ci
AUTO_INCREMENT=168 ;
```

TABLE 21

```
--
-- Table structure for table 'lesson'
--
CREATE TABLE IF NOT EXISTS 'lesson' (
    'lessonID' bigint(20) NOT NULL auto_increment COMMENT
'primary key',
    'lessonStatusID' smallint(5) unsigned NOT NULL COMMENT
'unconfirmed,confirmed,live,complete',
    'dateTime' date NOT NULL,
    'coachID' bigint(20) unsigned NOT NULL,
    'studentID' bigint(20) unsigned NOT NULL,
    'videoID' bigint(20) unsigned NOT NULL,
    'privacyID' smallint(1) unsigned NOT NULL default '0' COMMENT
'reference privacy table',
    'lessonKey' varchar(32) NOT NULL,
    'topic' varchar(256) default NULL,
    PRIMARY KEY ('lessonID'),
```

TABLE 21-continued

```
    UNIQUE KEY 'lessonKey' ('lessonKey'),
    KEY 'coachID' ('coachID','studentID','videoID'),
    KEY 'lessonStatusID' ('lessonStatusID'),
    KEY 'privacyID' ('privacyID'),
    KEY 'dateTime' ('dateTime')
) ENGINE=MyISAM DEFAULT CHARSET=utf8
AUTO_INCREMENT=284 ;
```

TABLE 22

```
--
-- Table structure for table 'lesson_status'
--
CREATE TABLE IF NOT EXISTS 'lesson_status' (
    'lessonStatusID' smallint(5) unsigned NOT NULL auto_increment,
    'status' varchar(16) NOT NULL,
    'description' varchar(64) NOT NULL,
    PRIMARY KEY ('lessonStatusID')
) ENGINE=MyISAM DEFAULT CHARSET=latin1
AUTO_INCREMENT=7 ;
```

TABLE 23

```
--
-- Table structure for table 'lesson_type'
--
CREATE TABLE IF NOT EXISTS 'lesson_type' (
    'lessontypeID' int(20) NOT NULL auto_increment COMMENT
    'primary key',
    'title' varchar(255) collate latin1_general_ci default NULL,
    'description' text collate latin1_general_ci,
    'price_charge' float default NULL,
    'date' datetime default NULL,
    PRIMARY KEY ('lessontypeID')
) ENGINE=MyISAM DEFAULT CHARSET=latin1
COLLATE=latin1_general_ci
AUTO_INCREMENT=5 ;
```

TABLE 24

```
--
-- Table structure for table 'login_info'
--
CREATE TABLE IF NOT EXISTS 'login_info' (
    'loginID' bigint(20) NOT NULL auto_increment COMMENT 'use
    as user session id',
    'password' varchar(255) collate latin1_general_ci NOT NULL,
    'email' varchar(255) collate latin1_general_ci default NULL
    COMMENT 'use as user name ',
    'userRole' varchar(255) collate latin1_general_ci NOT NULL,
    'active' smallint(6) NOT NULL default '0',
    'active_code' varchar(255) collate latin1_general_ci default
    NULL, PRIMARY KEY ('loginID')
) ENGINE=MyISAM DEFAULT CHARSET=latin1
COLLATE=latin1_general_ci
AUTO_INCREMENT=81 ;
```

TABLE 25

```
--
-- Table structure for table 'messages'
--
CREATE TABLE IF NOT EXISTS 'messages' (
    'messageID' bigint(20) NOT NULL auto_increment,
    'fromID' varchar(255) character set latin1 NOT NULL,
    'toID' varchar(255) character set latin1 NOT NULL,
    'subject' varchar(255) character set latin1 NOT NULL,
    'message' text character set latin1 NOT NULL,
    'status' enum('read','unread') character set latin1 NOT NULL
    default 'unread',
    'sentDate' datetime NOT NULL,
```

TABLE 25-continued

```
    'replyMessageID' bigint(20) NOT NULL,
    PRIMARY KEY ('messageID'),
    KEY 'fromID' ('fromID'),
    KEY 'toID' ('toID'),
    KEY 'subject' ('subject'),
    KEY 'replyMessageID' ('replyMessageID'),
    KEY 'sentDate' ('sentDate')
) ENGINE=MyISAM DEFAULT CHARSET=latin1
COLLATE=latin1_general_ci
AUTO_INCREMENT=79 ;
```

TABLE 26

```
--
-- Table structure for table 'playback'
--
CREATE TABLE IF NOT EXISTS 'playback' (
    'playbackID' bigint(20) unsigned NOT NULL
    auto_increment,
    'lessonKey' varchar(32) NOT NULL,
    'transmitData' longtext NOT NULL,
    PRIMARY KEY ('playbackID'),
    UNIQUE KEY 'lessonKey' ('lessonKey')
) ENGINE=MyISAM DEFAULT CHARSET=utf8
AUTO_INCREMENT=99 ;
```

TABLE 27

```
--
-- Table structure for table 'privacy'
--
CREATE TABLE IF NOT EXISTS 'privacy' (
    'privacyID' smallint(6) NOT NULL,
    'level' varchar(32) NOT NULL,
    'description' varchar(512) default NULL,
    PRIMARY KEY ('privacyID')
) ENGINE=MyISAM DEFAULT CHARSET=latin1;
```

TABLE 28

```
--
-- Table structure for table 'schedule'
--
CREATE TABLE IF NOT EXISTS 'schedule' (
    'scheduleID' bigint(20) unsigned NOT NULL auto_increment,
    'lessonID' bigint(20) unsigned NOT NULL COMMENT 'use to
    obtain studentID, coachID',
    'timeSlotID' smallint(5) unsigned NOT NULL,
    'lessonDate' datetime NOT NULL,
    'requestedDate' datetime NOT NULL,
    'confirmed' int(1) NOT NULL default '0',
    'studentAttended' datetime default NULL COMMENT 'when
    student entered lesson',
    'coachAttended' datetime default NULL COMMENT 'when
    coach entered lesson',
    PRIMARY KEY ('scheduleID'),
    UNIQUE KEY 'lessonID' ('lessonID')
) ENGINE=MyISAM DEFAULT CHARSET=latin1
AUTO_INCREMENT=280 ;
```

TABLE 29

```
--
-- Table structure for table 'shares'
--
CREATE TABLE IF NOT EXISTS 'shares' (
    'shareID' bigint(20) NOT NULL auto_increment,
    'sharedByID' bigint(20) NOT NULL,
    'sharedTo' enum('private','general','open') collate
    latin1_general_ci NOT NULL,
    'sharedLink' varchar(255) collate latin1_general_ci NOT NULL,
```

TABLE 29-continued

```
    'sharedResouceType' enum('video','lesson') collate latin1_general_ci
NOT NULL,
    'viewedTimes' int(10) NOT NULL,
    PRIMARY KEY ('shareID')
) ENGINE=MyISAM DEFAULT CHARSET=latin1
COLLATE=latin1_general_ci
AUTO_INCREMENT=1 ;
```

TABLE 30

```
--
-- Table structure for table 'shareviews'
--
CREATE TABLE IF NOT EXISTS 'shareviews' (
    'shareviewID' bigint(20) NOT NULL auto_increment,
    'shareID' bigint(20) NOT NULL,
    'viewedByID' int(10) NOT NULL,
    'viewedDateTime' timestamp NOT NULL default
CURRENT_TIMESTAMP,
    PRIMARY KEY ('shareviewID')
) ENGINE=MyISAM DEFAULT CHARSET=latin1
COLLATE=latin1_general_ci
AUTO_INCREMENT=1 ;
```

TABLE 31

```
--
-- Table structure for table 'siteconfig'
--
CREATE TABLE IF NOT EXISTS 'siteconfig' (
    'id' tinyint(4) NOT NULL auto_increment,
    'options' varchar(255) collate latin1_general_ci NOT NULL,
    'values' varchar(255) collate latin1_general_ci NOT NULL,
    PRIMARY KEY ('id')
) ENGINE=MyISAM DEFAULT CHARSET=latin1
COLLATE=latin1_general_ci
AUTO_INCREMENT=23 ;
```

TABLE 32

```
--
-- Table structure for table 'specialist'
--
CREATE TABLE IF NOT EXISTS 'specialist' (
    'specialistID' tinyint(4) NOT NULL auto_increment,
    'title' varchar(255) collate latin1_general_ci default NULL,
    'description' varchar(255) collate latin1_general_ci
default NULL,
    PRIMARY KEY ('specialistID')
) ENGINE=MyISAM DEFAULT CHARSET=latin1
COLLATE=latin1_general_ci
AUTO_INCREMENT=20 ;
```

TABLE 33

```
--
-- Table structure for table 'student'
--
CREATE TABLE IF NOT EXISTS 'student' (
    'studentID' bigint(20) unsigned NOT NULL auto_increment,
    'accountID' bigint(20) unsigned NOT NULL,
    'gender' varchar(1) default NULL COMMENT 'F or M',
    'homeCourse' varchar(50) default NULL,
    'homeTown' varchar(50) default NULL,
    'publicProfile' text,
    PRIMARY KEY ('studentID'),
    UNIQUE KEY 'accountID' ('accountID')
) ENGINE=MyISAM DEFAULT CHARSET=utf8
AUTO_INCREMENT=145 ;
```

TABLE 34

```
--
-- Table structure for table 'student_invoice'
--
CREATE TABLE IF NOT EXISTS 'student_invoice' (
    'orderID' int(11) NOT NULL,
    'studentID' bigint(20) NOT NULL,
    'invoiceID' bigint(20) NOT NULL,
    KEY 'orderID' ('orderID'),
    KEY 'invoiceID' ('invoiceID')
) ENGINE=MyISAM DEFAULT CHARSET=latin1
COLLATE=latin1_general_ci;
```

TABLE 35

```
--
-- Table structure for table 'student_lessoncredit'
--
CREATE TABLE IF NOT EXISTS 'student_lessoncredit' (
    'lessonCreditID' bigint(20) unsigned NOT NULL
        auto_increment,
    'studentID' bigint(20) NOT NULL,
    'lessonPackageID' int(11) NOT NULL,
    'quantity' tinyint(4) NOT NULL default '0' COMMENT 'lesson
number',
    'packquantity' tinyint(4) NOT NULL,
    'totalprice' varchar(100) collate latin1_general_ci NOT NULL,
    'orderID' bigint(20) NOT NULL,
    'orderDate' datetime NOT NULL,
    PRIMARY KEY ('lessonCreditID'),
    KEY 'studentID' ('studentID'),
    KEY 'lessonPackageID' ('lessonPackageID'),
    KEY 'orderID' ('orderID'),
    KEY 'orderDate' ('orderDate')
) ENGINE=MyISAM DEFAULT CHARSET=latin1
COLLATE=latin1_general_ci
AUTO_INCREMENT=179 ;
```

TABLE 36

```
--
-- Table structure for table 'time_slot'
--
CREATE TABLE IF NOT EXISTS 'time_slot' (
    'timeSlotID' int(11) NOT NULL default '0',
    'time' varchar(10) default NULL,
    PRIMARY KEY ('timeSlotID')
) ENGINE=MyISAM DEFAULT CHARSET=utf8;
```

TABLE 37

```
--
-- Table structure for table 'totallessoncredit'
--
CREATE TABLE IF NOT EXISTS 'totallessoncredit' (
    'totalCreditID' bigint(20) NOT NULL auto_increment COMMENT
'primaryke',
    'studentID' bigint(20) NOT NULL,
    'totalLessonNo' int(11) NOT NULL default '0' COMMENT 'this
        field update when insert into
studentlessoncredit /when lesson completed.',
    PRIMARY KEY ('totalCreditID'),
    KEY 'studentID' ('studentID'),
    KEY 'totalLessonNo' ('totalLessonNo')
) ENGINE=MyISAM DEFAULT CHARSET=latin1
COLLATE=latin1_general_ci
AUTO_INCREMENT=1000 ;
```

TABLE 38

```
-- Table structure for table 'video'
--
CREATE TABLE IF NOT EXISTS 'video' (
    'videoID' bigint(20) unsigned NOT NULL auto_increment,
    'accountID' bigint(20) unsigned NOT NULL,
    'privacyID' smallint(1) unsigned NOT NULL default '0' COMMENT 'reference privacy table',
    'dateStamp' datetime NOT NULL,
    'filename' varchar(40) collate latin1_general_ci NOT NULL,
    'image' varchar(40) collate latin1_general_ci NOT NULL,
    'transferred' int(1) NOT NULL default '0',
    'views' bigint(20) unsigned NOT NULL default '0',
    'title' varchar(64) collate latin1_general_ci default NULL,
    'description' varchar(4096) collate latin1_general_ci default NULL,
    PRIMARY KEY ('videoID'),
    KEY 'accountID' ('accountID','dateStamp'),
    KEY 'dateStamp' ('dateStamp'),
    KEY 'transferred' ('transferred'),
    KEY 'privacyID' ('privacyID')
) ENGINE=MyISAM DEFAULT CHARSET=latin1 COLLATE=latin1_general_ci AUTO_INCREMENT=1081 ;
```

TABLE 39

```
-- Table structure for table 'video_beckup'
--
CREATE TABLE IF NOT EXISTS 'video_beckup' (
```

TABLE 39-continued

```
    'videoID' bigint(20) NOT NULL auto_increment,
    'description' text,
    'videoUploadDate' datetime default NULL,
    'title' varchar(50) default NULL,
    'filename' varchar(100) NOT NULL COMMENT ' unique video filename (md5)',
    'transferred' int(11) default NULL COMMENT '0 to reference this content on the conversion server',
    'videoImageName' varchar(255) default NULL,
    'videoStatus' varchar(10) default NULL,
    'views' int(11) default NULL,
    'ratings' int(11) default NULL,
    'studentID' varchar(50) NOT NULL,
    'addby' varchar(25) default NULL,
    PRIMARY KEY ('videoID')
) ENGINE=MyISAM DEFAULT CHARSET=utf8 AUTO_INCREMENT=117 ;
```

Source Code

Action script files related to the method and system of synchronization in accordance with a preferred embodiment of the present invention. ©2009 Interactive Sports Direct Incorporated.

The Recorder.as source code file, constructs and saves the events to the Lesson Data File during the course of a lesson. Events are saved as XML text strings that include a time of occurrence, measured from the start of the lesson, to the nearest whole Quantum of Time (40 milliseconds), along with any arguments necessary to characterize the event.

Recorder.as

```
package com.haurus.golfcoachdirect.lesson.utils {
    import com.haurus.golfcoachdirect.events.LessonEvent;
    import com.haurus.golfcoachdirect.events.VideoEvent;
    import com.haurus.golfcoachdirect.events.WebCamEvent;
    import com.haurus.utils.Dispatcher;
    import flash.utils.Timer;
    /**
     * @@author Nicholas John Haurus
     */
    public class Recorder {
        public static const QUANTUM_OF_TIME:Number = 40;
        private static var _timer:Timer;
        private static var _transmitData:String="<quantumoftime>"+QUANTUM_OF_TIME+"</quantumoftime>\n";
        private static var _lessonStarted:Boolean=false;
        private static var _currentTime:uint;
        private static var _lastTime:uint;
        private static var _startTime:uint;
        public static function init( ):void {
            Dispatcher.addEventListener(LessonEvent.LESSON_START, _start);
        }
        public static function save($event:String,$args:Array=null):void {
            // is Live & No Progress & No Cam
            if( _lessonStarted && _saveable($args[0]) ) {
                var date:Date = new Date( );
                _currentTime = Math.round(date.time/QUANTUM_OF_TIME)-_startTime;
                // No Sub Time Thread Drawing or Seek To's
                if( $args[0] != VideoEvent.DRAG_VIDEO && $args[0] != VideoEvent.VIDEO_SEEK_TO && String($args[0]).substr(-7) != "_follow" || _lastTime != _currentTime ) {
                    var args:String="";
                    for( var i:uint=0; i < $args.length; i++ ) {
                        args += "<arg>"+$args[i]+"</arg>";
                    }
                    _transmitData += "<transmit><event>"+$event+"</event><time>"+_currentTime+"</time><args>"+args+"</args></transmit>\n";
                }
            }
            if( _lessonStarted ) _lastTime=_currentTime;
        }
```

| Recorder.as |
|---|

```
        private static function _saveable($event:String):Boolean {
            var saveable:Boolean=true;
            switch($event){
                case VideoEvent.VIDEO_PROGRESS: saveable=false; break;
                case WebCamEvent.STREAM_IN: saveable=false; break;
            }
            return saveable;
        }
        private static function _start($e:LessonEvent):void {
            var date:Date = new Date( );
    _startTime = Math.round(date.time/QUANTUM_OF_TIME);
            _timer = new Timer(QUANTUM_OF_TIME);
        _timer.start( );
        _lessonStarted = true;
        }
        public static function get transmitData( ):String {
            return _transmitData;
        }
        public static function get lessonStarted( ):Boolean {
            return _lessonStarted;
        }
    }
}
```

The SaveLesson.as source code file contains the code that saves the completed lesson data file for later playback.

| SaveLesson.as |
|---|

```
package com.haurus.golfcoachdirect.lesson.utils {
    import caurina.transitions.Equations;
    import caurina.transitions.Tweener;
    import com.haurus.golfcoachdirect.events.GatewayEvent;
    import com.haurus.golfcoachdirect.events.LessonEvent;
    import com.haurus.golfcoachdirect.lesson.Lesson;
    import com.haurus.golfcoachdirect.lesson.coach.uis.SaveTip;
    import com.haurus.golfcoachdirect.lesson.uis.GolfBall;
    import com.haurus.golfcoachdirect.lesson.uis.viewscreen.ViewScreen;
    import com.haurus.golfcoachdirect.lesson.utils.Recorder;
    import com.haurus.golfcoachdirect.utils.ServerPaths;
    import com.haurus.utils.Dispatcher;
    import com.haurus.utils.FlashVars;
    import flash.display.DisplayObject;
    import flash.display.Sprite;
    import flash.events.Event;
    import flash.events.TimerEvent;
    import flash.filters.DropShadowFilter;
    import flash.net.URLLoader;
    import flash.net.URLLoaderDataFormat;
    import flash.net.URLRequest;
    import flash.net.URLRequestMethod;
    import flash.net.URLVariables;
    import flash.net.navigateToURL;
    import flash.text.TextField;
    import flash.text.TextFormat;
    import flash.utils.Timer;
    /**
     * @author Master
     */
    public class SaveLesson {
        public static var saving:Boolean=false;
        private static var _angle:Number=0;
        private static var _created:uint=0;
        private static var _deleted:uint=0;
        public static function init( ):void {
            Dispatcher.addEventListener(LessonEvent.LESSON_SAVING, _saving);
            Dispatcher.addEventListener(LessonEvent.LESSON_END, _end);
        }
        private static function _saving($e:LessonEvent):void {
            saving=true;
            _createLightBox( );
            _createCircles( );
            _createText( );
```

| SaveLesson.as |
|---|

```
            _createTimer( );
            if( Lesson.coachUser ) {
        var url:String = ServerPaths.WEB+FlashVars.phpPath+"insert/gameplan.php";
        var request:URLRequest = new URLRequest(url);
        request.method = URLRequestMethod.POST;
        var variables:URLVariables = new URLVariables( );
        variables["lessonKey"] = FlashVars.lessonKey;
        variables["transmitData"] = Recorder.transmitData;
        variables["tips"] = SaveTip.getInstance( ).tips;
        //ViewScreen.getInstance( ).tf_test.appendText("SPLIT_REQUESTED <- (" +
variables["tips"]+")\n");
        request.data = variables;
            var loader:URLLoader = new URLLoader( );
            loader.dataFormat = URLLoaderDataFormat.VARIABLES;
            loader.addEventListener( Event.COMPLETE, _dataSaved );
            loader.load( request );
        }
    }
    private static function _dataSaved($e:Event):void {
            var url:String = ServerPaths.PBX+FlashVars.gatewayPath +
"convert.php";
        var request:URLRequest = new URLRequest(url);
        request.method = URLRequestMethod.POST;
        var variables:URLVariables = new URLVariables( );
        variables["pin"] = Lesson.pin;
        variables["id"] = FlashVars.lessonKey;
        request.data = variables;
            var loader:URLLoader = new URLLoader( );
            loader.dataFormat = URLLoaderDataFormat.VARIABLES;
            loader.addEventListener( Event.COMPLETE, _lessonSaved );
            loader.load( request );
        }
        private static function _lessonSaved($e:Event):void {
            var args:Array = new Array( );
            args[0] = LessonEvent.LESSON_END;
            Lesson.transmit(GatewayEvent.LESSON_EVENT, args);
            Dispatcher.dispatchEvent(new
LessonEvent(LessonEvent.LESSON_END));
        }
        private static function _end($e:Event):void {
            if( FlashVars.returnURL.length > 1 ) {
                navigateToURL(new URLRequest(FlashVars.returnURL),
"_self");
            }
            else navigateToURL(new
URLRequest("gameplan.php?id="+FlashVars.lessonKey), "_self");
        }
        // Animation //////////////////////////////
        private static function _createLightBox( ):void {
            var lightBox:Sprite =new Sprite( );
            lightBox.x=-1000;
            lightBox.y=-1000;
            lightBox.graphics.beginFill(0x000000,.5);
            lightBox.graphics.moveTo(0,0);
            lightBox.graphics.lineTo(3000,0);
            lightBox.graphics.lineTo(3000,3000);
            lightBox.graphics.lineTo(0,3000);
            lightBox.graphics.lineTo(0,0);
            lightBox.graphics.endFill( );
            Lesson.getInstance( ).addChild(lightBox);
        }
        private static function _createCircles( ):void {
            for( var i:uint=0; i < 4; i++) {
                var circle:Sprite =new Sprite( );
                circle.x=-1000;
                circle.y=-1000;
                circle.graphics.beginFill(0xFFFFFF,.5);
                circle.graphics.drawCircle(200+i*50, 300, 40);
                circle.graphics.endFill( );
                Lesson.getInstance( ).addChild(circle);
            }
        }
        private static function _createTimer( ):void {
            var tf_timer:Timer = new Timer(100);
            tf_timer.addEventListener(TimerEvent.TIMER,_createCircle);
            tf_timer.start( );
        }
        private static function _createText( ):void {
```

-continued

SaveLesson.as

```
        var tf_saving:TextField=new TextField( );
        tf_saving.text="SAVING";
        //tf_saving.embedFonts=true;
        var tf_format:TextFormat=new TextFormat( );
        tf_format.font="Arial";
        tf_format.color="0xFFFFFF";
        tf_format.size=36;
        tf_format.bold=true;
        tf_saving.setTextFormat(tf_format);
        tf_saving.width=tf_saving.textWidth+5;
        tf_saving.mouseEnabled=false;
        tf_saving.x = 640*.5-tf_saving.width*.5;
        tf_saving.y = 480*.5-tf_saving.height*.5;
        ViewScreen.getInstance( ).addChild(tf_saving);
        _createDropShadow(tf_saving);
    }
    private static function _createDropShadow($do:DisplayObject):void {
        var ds:DropShadowFilter=new DropShadowFilter(5,45,0x000000,.5);
        $do.filters = new Array(ds);
    }
    private static function _createCircle($e:TimerEvent):void {
        _angle%=360;
        _angle+=30;
        var sp_circle:Sprite = new GolfBall( );
        sp_circle.name="circle"+_created++;
        sp_circle.x=640*.5+Math.cos(_angle*Math.PI/180)*180;
        sp_circle.y=480*.5+Math.sin(_angle*Math.PI/180)*180;
        Tweener.addTween(sp_circle, {alpha:0,time:1,transition:Equations.easeIn
Cubic,onComplete:_removeCircle});
        _createDropShadow(sp_circle);
        ViewScreen.getInstance( ).addChild(sp_circle);
    }
    private static function _removeCircle( ):void {
ViewScreen.getInstance( ).removeChild(ViewScreen.getInstance( ).getChildByName("circle"+_deleted++));
        }
    }
}
```

In one embodiment of the present invention, the Resynch Controller is implemented as SyncController.as. It controls the synchronization of the VOIP Player and the Command Manager. It initializes a timer to the RESINK_INTERVAL (30 seconds). It also defines functions to compare the values of the Command Manager and VOIP Player elapsed time of playback, and to pause execution of either the VOIP Player (PAUSE_PHONECALL) or the Command Manager (PAUSE_COMMANDS) for the length of time in milliseconds equal to the difference between the values. The functions are executed when the timer reaches the RESINK_INTERVAL value. Whichever process was paused is resumed at the end of the pause time. This module also contains code to check whether a split screen has been requested, and if so, to pause playback for the additional video file to be downloaded. Playback is paused for the time that the video downloaded in the live lesson.

SynchController.as

```
package com.haurus.golfcoachdirect.playback.utils {
    import com.haurus.golfcoachdirect.events.PlaybackEvent;
    import com.haurus.golfcoachdirect.events.VideoEvent;
    import com.haurus.golfcoachdirect.playback.Playback;
    import com.haurus.utils.Dispatcher;
    import flash.events.TimerEvent;
    import flash.utils.Timer;
    /**
     * @@author Nicholas John Haurus
     */
    public class SyncController {
        public static const RESINK_INTERVAL:uint=30*1000;
        private static var _resink:Timer;
        private static var _wait:Timer;
        private static var _phoneReady:Boolean=false;
        private static var _videoReady:Boolean=false;
        private static var _playbackStarted:Boolean=false;
        private static var _completeCount:uint;
        private static var _paused:Boolean=false;
        private static var _maxPauseTimer:Timer;
        public static function init( ):void {
            _resink = new Timer(RESINK_INTERVAL);
```

| SynchController.as |
| --- |

```
            _resink.addEventListener(TimerEvent.TIMER, _compare);
            // Split
            Dispatcher.addEventListener(VideoEvent.SPLIT_REQUESTED,
_splitRequested);
            // Start
            Dispatcher.addEventListener(VideoEvent.VIDEO_LOADED,
_videoLoaded);
            Dispatcher.addEventListener(PlaybackEvent.PHONECALL_LOADED,
_phonecallLoaded);
            // End
Dispatcher.addEventListener(PlaybackEvent.COMMANDS_COMPLETE, _complete);
Dispatcher.addEventListener(PlaybackEvent.PHONECALL_COMPLETE, _complete);
            // UI
            Dispatcher.addEventListener(PlaybackEvent.PAUSE_PLAYBACK,
_pause);
            Dispatcher.addEventListener(PlaybackEvent.RESUME_PLAYBACK,
_resume);
            Dispatcher.addEventListener(PlaybackEvent.RESTART_PLAYBACK,
_restart);
        }
        private static function_splitLoaded( ):void {
            // Loaded Slower "Pause and Wait"
            if( _paused ) {
                _paused=false;
                Dispatcher.dispatchEvent(new
PlaybackEvent(PlaybackEvent.RESUME_PLAYBACK));
            }
            // Loaded Faster "Do Nothing"
            else if( _maxPauseTimer ){
_maxPauseTimer.removeEventListener(TimerEvent.TIMER_COMPLETE, _pausePlayback);
                _maxPauseTimer.stop( );
            }
        }
        // Note how long the split video took to load durring the live lesson
        private static function _splitRequested($e:VideoEvent):void {
            // Find original milisecond difference
            var loadedThread:uint;
            var nextThread:uint = Commands.command;
            while( Playback.data..args[nextThread++]..arg[0] !=
VideoEvent.VIDEO_LOADED ) loadedThread = nextThread;
            var originalLoadTime:uint =
(Playback.data..time[loadedThread]-Playback.data..time[Commands.command])*Playback.data..quantumoftime[0];
            // Set the max pause timer
            _maxPauseTimer=new Timer(originalLoadTime,1);
_maxPauseTimer.addEventListener(TimerEvent.TIMER_COMPLETE,_pausePlayback);
            _maxPauseTimer.start( );
        }
        private static function _pausePlayback( ):void {
            _paused=true;
            Dispatcher.dispatchEvent(new
PlaybackEvent(PlaybackEvent.PAUSE_PLAYBACK));
        }
        private static function _videoLoaded($e:VideoEvent):void {
            if( _videoReady )_splitLoaded( );
            _videoReady=true;
            if( !_playbackStarted && _phoneReady ) {
                Dispatcher.dispatchEvent(new
PlaybackEvent(PlaybackEvent.MEDIA_LOADED));
            }
        }
        private static function _compare($e:TimerEvent=null):void {
            var length:uint;
            if( PhoneCall.miliseconds >
Commands.miliseconds+Playback.data..quantumoftime[0] ) {
                Dispatcher.dispatchEvent(new
PlaybackEvent(PlaybackEvent.PAUSE_PHONECALL));
                length = PhoneCall.miliseconds-Commands.miliseconds;
                _wait = new Timer(length,1);
                _wait.addEventListener(TimerEvent.TIMER_COMPLETE,
_resumePhoneCall);
                _wait.start( );
                trace("PAUSE CALL FOR "+length);
            }
            else if( PhoneCall.miliseconds <
Commands.miliseconds-Playback.data..quantumoftime[0] ) {
                Dispatcher.dispatchEvent(new
PlaybackEvent(PlaybackEvent.PAUSE_COMMANDS));
```

SynchController.as

```
                length = Commands.miliseconds−PhoneCall.miliseconds;
                _wait = new Timer(length,1);
                _wait.addEventListener(TimerEvent.TIMER_COMPLETE,
_resumeCommands);
                _wait.start( );
                trace("PAUSE COMMANDS FOR "+length);
            }
        }
        // Sync
        private static function _resumePhoneCall($e:TimerEvent):void {
            //_wait.removeEventListener(TimerEvent.TIMER_COMPLETE,
_resumePhoneCall);
            //Dispatcher.dispatchEvent(new
PlaybackEvent(PlaybackEvent.RESUME_PHONECALL));
        }
        private static function _resumeCommands($e:TimerEvent):void {
            //_wait.removeEventListener(TimerEvent.TIMER_COMPLETE,
_resumeCommands);
            //Dispatcher.dispatchEvent(new
PlaybackEvent(PlaybackEvent.RESUME_COMMANDS));
        }
        private static function _phonecallLoaded($e:PlaybackEvent):void {
            _phoneReady=true;
            if( _videoReady ) {
                Dispatcher.dispatchEvent(new
PlaybackEvent(PlaybackEvent.MEDIA_LOADED));
            }
        }
        // End
        private static function _complete($e:PlaybackEvent):void {
            if( ++_completeCount == 2 ) {
                Dispatcher.dispatchEvent(new
PlaybackEvent(PlaybackEvent.RESTART_PLAYBACK));
            }
        }
        ///////////////////// UI Controls /////////////////////////////////////
        private static function _pause($e:PlaybackEvent):void {
            //_resink.stop( );
            //_wait.stop( );
        }
        private static function _resume($e:PlaybackEvent):void {
            _playbackStarted=true;
            //_resink.start( );
        }
        private static function _restart($e:PlaybackEvent):void {
            //_completeCount=0;
            //_resink.stop( );
        }
    }
}
```

In one embodiment of the present invention, the Command Manager is implemented as Commands.as. It manages the commands from the session file. At initialization of playback, it saves the current date and time. On each execution, it then computes the elapsed time, converts the value to time quantum units, and executes any commands in the session data file with time values equal to the elapsed time quantum. Commands are executed in order according to the event type, by instantiating the appropriate command player (CamController, DrawScreen, etc.). It also contains functions to pause, resume, and restart the execution of commands.

Commands.as

```
package com.haurus.golfcoachdirect.playback.utils {
    import com.haurus.golfcoachdirect.events.GatewayEvent;
    import com.haurus.golfcoachdirect.events.LessonEvent;
    import com.haurus.golfcoachdirect.events.PlaybackEvent;
    import com.haurus.golfcoachdirect.events.VideoEvent;
    import com.haurus.golfcoachdirect.lesson.uis.viewscreen.DrawScreen;
    import com.haurus.golfcoachdirect.lesson.uis.viewscreen.GameTip;
    import com.haurus.golfcoachdirect.lesson.uis.viewscreen.ViewScreen;
    import com.haurus.golfcoachdirect.lesson.uis.webcam.CamController;
    import com.haurus.golfcoachdirect.playback.Playback;
    import com.haurus.utils.Dispatcher;
    import flash.events.TimerEvent;
```

-continued

| Commands.as |
|---|

```
    import flash.utils.Timer;
    /**
     * @@author Nicholas John Haurus
     */
    public class Commands {
        private static var _timer:Timer;
        private static var _currentThread:uint=0;
        private static var _timeAtStart:Number=0;
        private static var _timeAtPause:Number=0;
        private static var _elapsedTime:Number=0;
        private static var _command:uint=0;
        private static var _started:Boolean=false;
        public static function init( ):void {
            // Listeners
            Dispatcher.addEventListener(LessonEvent.DATA_LOADED, _playbackLoaded);
            Dispatcher.addEventListener(PlaybackEvent.RESTART_PLAYBACK, _restart);
            Dispatcher.addEventListener(PlaybackEvent.PAUSE_PLAYBACK, _pause);
            Dispatcher.addEventListener(PlaybackEvent.RESUME_PLAYBACK, _resume);
        }
        private static function _playbackLoaded($e:LessonEvent):void {
            _timer = new Timer(Playback.data..quantumoftime[0]);
            _timer.addEventListener(TimerEvent.TIMER, _updateTime);
        }
        private static function _updateTime(e:TimerEvent):void {
            var date:Date = new Date( );
            _currentThread = Math.floor((date.time-_timeAtStart-_elapsedTime)/Playback.data..quantumoftime[0]);
            //trace(_currentThread+" >= "+Playback.data..time[ _command])
            while(_currentThread >= Playback.data..time[ _command])     {
                _timer.stop( );
                _execute( );
            }
            _timer.start( );
        }
        // Dispatches Commands
        private static function _execute( ):void {
            trace("Commands -> " +Playback.data..event[_command]+ ":" + Playback.data..args[_command]..arg[0]+ ":" + Playback.data..args[_command]..arg[1]+ " " + Playback.data..args[_command]..arg[2]);
            switch( String(Playback.data..event[_command]) ) {
                case GatewayEvent.TEXT_EVENT:
                    GameTip.getInstance( ).makeTip( Playback.data..args[_command]..arg[0]);
                    break;
                case GatewayEvent.DRAW_EVENT:
                    DrawScreen.getInstance( ).updateBoard(Playback.data..args[_command]..arg[0],Playback.data..args[_command]..arg[1],Playback.data..args[_command]..arg[2]);
                    break;
                case GatewayEvent.WEBCAM_EVENT:
                    CamController.update(Playback.data..args[_command]..arg[0],Playback.data..args[_command]..arg[1]);
                    break;
                case GatewayEvent.VIDEO_EVENT:
                    // Do not broadcast SPLIT_LOADED VideoScreen.as will
                    if( Playback.data..args[_command]..arg[0] != VideoEvent.VIDEO_LOADED ) {
                        ViewScreen.getInstance( ).update(Playback.data..args[_command]..arg[0],Playback.data..args[_command]..arg[1],Playback.data..args[_command]..arg[2]);
                    }
                    break;
            }
            //trace("Playback.data..event.length( ) "+Playback.data..event.length( ))
            if( ++_command >= Playback.data..event.length( ) ) {
                _stop( );
            }
        }
        private static function _stop( ):void {
            _timer.removeEventListener(TimerEvent.TIMER, _updateTime);
            _timer.stop( );
        }
        private static function _pause($e:PlaybackEvent):void {
```

Commands.as (continued)

```
            var date:Date = new Date( );
            _timeAtPause = date.time;
            _timer.stop( );
        }
        private static function _resume($e:PlaybackEvent):void {
            var date:Date = new Date( );
if( _started) _elapsedTime += date.time-_timeAtPause;
else _timeAtStart = date.time;
_timer.start( );
_started=true;
        }
        private static function _restart($e:PlaybackEvent):void {
            _started=false;
            _elapsedTime = 0;
            _currentThread=0;
            _command=0;
            _timer.addEventListener(TimerEvent.TIMER, _updateTime);
            _timer.stop( );
        }
        public static function get miliseconds( ):uint {
            return _currentThread * Playback.data..quatum[0];
        }
        public static function get command( ):uint {
            return _command;
        }
        public static function get currentThread( ):uint {
            return _currentThread;
        }
    }
}
```

In one embodiment of the present invention the VOIP Player is implemented as PhoneCall.as. It manages the audio phone conference file (VOIP File). It contains functions to request download of the VOIP File (_playbackLoaded), check progress of the VOIP File during playback (_progressHandler), play the VOIP File, and pause and resume the VOIP File.

PhoneCall.as

```
package com.haurus.golfcoachdirect.playback.utils {
    import com.haurus.golfcoachdirect.events.LessonEvent;
    import com.haurus.golfcoachdirect.events.PlaybackEvent;
    import com.haurus.golfcoachdirect.utils.ServerPaths;
    import com.haurus.utils.Dispatcher;
    import com.haurus.utils.FlashVars;
    import flash.events.Event;
    import flash.events.ProgressEvent;
    import flash.media.Sound;
    import flash.media.SoundChannel;
    import flash.net.URLRequest;
    /**
     * @@author Nicholas John Haurus
     */
    public class PhoneCall {
        // Vars
        private static var _sound:Sound;
        private static var _channel:SoundChannel;
        private static var _miliseconds:uint=0;
        private static var _duration:Number;
        public static function init( ):void {
            Dispatcher.addEventListener(LessonEvent.DATA_LOADED,
_playbackLoaded);
            Dispatcher.addEventListener(PlaybackEvent.PAUSE_PHONECALL,
_pause);
            Dispatcher.addEventListener(PlaybackEvent.PAUSE_PLAYBACK,
_pause);
            Dispatcher.addEventListener(PlaybackEvent.RESUME_PLAYBACK,
_resume);
            Dispatcher.addEventListener(PlaybackEvent.RESUME_PHONECALL,
_resume);
```

-continued

PhoneCall.as

```
            Dispatcher.addEventListener(PlaybackEvent.RESTART_PLAYBACK,
_restart);
        }
        private static function _playbackLoaded($e:LessonEvent):void {
            // TELEPHONE STREAM
    var url:String = ServerPaths.PBX + FlashVars.recordingPath +
FlashVars.lessonKey+".mp3";
            var request:URLRequest = new URLRequest(url);
            _sound = new Sound( );
    _sound.addEventListener(Event.COMPLETE, _completeHandler);
    _sound.addEventListener(ProgressEvent.PROGRESS, _progressHandler);
            _sound.load(request);
        }
        private static function _pause($e:Event):void {
            _miliseconds = _channel.position;
            _channel.stop( );
        }
        private static function _resume($e:PlaybackEvent):void {
            _channel = _sound.play(_miliseconds);
        }
        private static function _restart($e:PlaybackEvent):void {
            _miliseconds=0;
            _channel.stop( );
        }
        private static function _completeHandler(event:Event):void {
    _duration = _sound.length;
    Dispatcher.dispatchEvent(new
PlaybackEvent(PlaybackEvent.PHONECALL_LOADED));
        }
    private static function _progressHandler($e:ProgressEvent):void {
    var percent:Number = $e.bytesLoaded/$e.bytesTotal;
    Dispatcher.dispatchEvent(new
PlaybackEvent(PlaybackEvent.PHONECALL_PROGRESS,percent));
        }
        // Gets current miliseconds in the phone conference
        public static function get miliseconds( ):uint {
            if( _channel ) return Math.round(_channel.position);
            return 0;
        }
        // Gets the total miliseconds of the phone conference
        public static function get duration( ):Number {
            return _sound.length;
        }
    }
}
```

In one preferred embodiment of the present the uploaded golfer video clip is converted into two versions. The first version is keyframe heavy and is used to analyze the clip frame by frame with the scrubber or "slider". The second version is compressed with a normal optimized keyframe count that matches the web compression standard. This smaller version is loaded first and allows the user to view the swing right away because the bytes per second is significantly lower. The critical keyframe version is loaded behind the scenes immediately afterwards so the user can analyze the sports clip at any point.

Relevant source code for this embodiment can be found below and relevant action script files are named: SwingPlayer.as; FullscreenButton.as; MuteButton.as; ProgressBar.as; BigPlayButton.as; LoadingScreen.as; PlayPauseButton.as; KeyframeScreen.as; StandardScreen.as; and VirtualScreen.as.

SwingPlayer.as

```
package com.haurus.golfcoachdirect.lockerroom.swingplayer {
    import com.haurus.golfcoachdirect.lockerroom.swingplayer.uis.
    screen.StandardScreen;
```

SwingPlayer.as

```
    import com.haurus.utils.FlashVars;
    import flash.display.MovieClip;
    import flash.display.Sprite;
    import flash.external.ExternalInterface;
    /**
    * @author nicholas.haurus
    */
    public class SwingPlayer extends MovieClip {
        // Vars
        public var sp_screen:Sprite;
        private static var _instance:SwingPlayer;
        public function SwingPlayer( ):void {
            _instance=this;
            FlashVars.init(this);
            sp_screen.addChild(new StandardScreen( ));
            _addJavscriptListener( );
        }
        private function _receivedFromJavaScript($filename:String):void {
            trace($filename);
        }
        private function _addJavscriptListener( ):void {
            if (ExternalInterface.available) {
                try {
                    ExternalInterface.addCallback("sendToFlash",
_receivedFromJavaScript);
```

SwingPlayer.as

```
            }
            catch ($e:SecurityError) {
                ExternalInterface.call("javascript:alert('"+$e.message+"')");
                trace("A SecurityError occurred: " +$e.message +"\n");
            }
        }
    }
    public static function get instance( ):SwingPlayer {
        return_instance;
    }
  }
}
```

FullscreenButton.as

```
package com.haurus.golfcoachdirect.lockerroom.swingplayer.uis {
    import com.haurus.utils.AbstractButton;
    import flash.display.MovieClip;
    import flash.display.StageDisplayState;
    import flash.events.MouseEvent;
    /**
    * @author nicholas.haurus
    */
    public class FullscreenButton extends AbstractButton {
        public var mc_arrows:MovieClip;
        public function FullscreenButton( ) {
            enable( );
        }
        override protected function_down($e:MouseEvent):void {
            if( stage.displayState!=StageDisplayState.FULL_SCREEN)
            stage.displayState=StageDisplayState.FULL_SCREEN;
            else stage.displayState=StageDisplayState.NORMAL;
        }
    }
}
```

MuteButton.as

```
package com.haurus.golfcoachdirect.lockerroom.swingplayer.uis {
    import com.haurus.utils.AbstractButton;
    import flash.display.MovieClip;
    import flash.events.MouseEvent;
    import flash.media.SoundMixer;
    import flash.media.SoundTransform;
    import flash.net.SharedObject;
    /**
    * @author Master
    */
    public class MuteButton extends AbstractButton {
        public var mc_on:MovieClip;
        private var _st:SoundTransform;
        private var _so:SharedObject;
        public function MuteButton( ) {
            _st=new SoundTransform( );
            _so=SharedObject.getLocal("golfcoachdirect","/");
            if( _so.data['mute'] == "true" ) {
                mc_on.gotoAndStop(2);
                _st.volume=0;
                SoundMixer.soundTransform=_st;
            }
            enable( );
        }
        override protected function _down($e:MouseEvent):void {
            if( mc_on.currentFrame == 1 ) {
                mc_on.gotoAndStop(2);
                _st.volume=0;
                _so.data['mute']="true";
            }
            else {
                mc_on.gotoAndStop(1);
                _st.volume=1;
                _so.data['mute']="false";
            }
            _so.flush( );
            SoundMixer.soundTransform=_st;
        }
    }
}
```

ProgressBar.as

```
package com.haurus.golfcoachdirect.lockerroom.swingplayer.uis {
    import com.haurus.core.CustomEvent;
    import com.haurus.golfcoachdirect.lockerroom.swingplayer.uis.screen.VirtualScreen;
    import com.haurus.golfcoachdirect.lockerroom.swingplayer.uis.screen.KeyframeScreen;
    import com.haurus.utils.Dispatcher;
    import flash.display.Sprite;
    import flash.events.Event;
    import flash.events.MouseEvent;
    import flash.geom.Rectangle;
    /**
    * @author nicholas.haurus
    */
    public class ProgressBar extends Sprite {
        public var sp_knob:Sprite;
        public var sp_bar:Sprite;
        public var sp_loaded:Sprite;
        private var _holding:Boolean = false;
        public function ProgressBar( ) {
            sp_bar.x = sp_bar.width*-l+sp_bar.width*0;
            sp_knob.x = sp_knob.width*.5;
            Dispatcher.addEventListener(VirtualScreen.LOAD_PROGRESS, _loadProgress);
            Dispatcher.addEventListener(VirtualScreen.LOAD_COMPLETE, _enable);
            Dispatcher.addEventListener(VirtualScreen.RESUME_VIDEO, _resume);
            Dispatcher.addEventListener(VirtualScreen.PAUSE_VIDEO, _pause);
            Dispatcher.addEventListener(VirtualScreen.RESTART_VIDEO, _restart);
        }
        private function_enable($e;CustomEvent):void {
```

ProgressBar.as

```
        try {
            if( KeyframeScreen.instance ) {
                sp_knob.buttonMode=true;
                sp_knob.addEventListener(MouseEvent.MOUSE_DOWN,
_down);
                sp_loaded.x = 0;
            }
        }
        catch($er:Error) { }
    }
    private function _resume($e:CustomEvent):void {
        addEventListener(Event.ENTER_FRAME, _update);
    }
    private function _pause($e:CustomEvent):void {
        removeEventListener(Event.ENTER_FRAME, _update);
    }
    private function _restart($e:CustomEvent):void {
        sp_bar.x = sp_bar.width*-1;
        sp_knob.x = sp_knob.width*.5;
        removeEventListener(Event.ENTER_FRAME, _update);
    }
    private function _update($e:Event):void {
        if( !_holding ) {
            var
percent:Number=VirtualScreen.seloected.time/VirtualScreen.selected.duration;
            sp_bar.x = sp_bar.width*-1+sp_bar.width*percent;
            sp_knob.x = sp_bar.width*percent+sp_knob.width*.5;
        }
    }
    private function _loadProgress($e:CustomEvent):void {
        sp_loaded.x = sp_loaded.width*-1+sp_loaded.width*Number($e.params);
    }
    private function _down($e:Event):void {
        _holding=true;
        sp_knob.startDrag(true,new
Rectangle(sp_knob.width/2,0,sp_bar.width-sp_knob.width/2,0));
        stage.addEventListener(MouseEvent.MOUSE_MOVE,_mouseMove);
        stage.addEventListener(MouseEvent.MOUSE_UP, _up);
        Dispatcher.dispatchEvent(new CustomEvent(VirtualScreen.SEEK_TO));
    }
    private function _mouseMove($e:Event):void {
        var
max:Number=sp_knob.width/2+(sp_bar.width-sp_knob.width/2)*KeyframeScreen.
instance.percentLoaded;
        if( sp_knob.x > max ) sp_knob.x =max;
        var percent:Number=(sp_knob.width/2)/sp_bar.width;
        if( percent > .98) percent=.98;
        else if( percent < 0) percent=0;
        sp_bar.x = sp_bar.width*-1+sp_bar.width*percent;
        VirtualScreen.selected.seek(percent);
    }
    private function _up($e:MouseEvent):void {
        _holding=false;
        sp_knob.stopDrag( );
        stage.removeEventListener(MouseEvent.MOUSE_UP, _up);
        stage.removeEventListener(MouseEvent.MOUSE_MOVE,_mouseMove);
        VirtualScreen.selected.pause( );
    }
   }
}
```

BigPlayButton.as

```
package com.haurus.golfcoachdirect.lockerroom.swingplayer.uis {
    import caurina.transitions.Equations;
    import caurina.transitions.Tweener;
    import com.haurus.golfcoachdirect.lockerroom.swingplayer.
uis.screen.VirtualScreen;
    import com.haurus.utils.AbstractButton;
    import com.haurus.utils.Dispatcher;
    import flash.events.Event;
    import flash.events.MouseEvent;
    /**
     * @@author Nicholas John Haurus
     */
    public class BigPlayButton extends AbstractButton {
        public function BigPlayButton( ) {
            Dispatcher.addEventListener(VirtualScreen.LOAD_COMPLETE,
_loadComplete);
            Dispatcher.addEventListener(VirtualScreen.
RESTART_VIDEO, _enable);
            Dispatcher.addEventListener(VirtualScreen.
PAUSE_VIDEO, _enable);
```

BigPlayButton.as

```
        Dispatcher.addEventListener(VirtualScreen.
RESUME_VIDEO,_disable);
        Dispatcher.addEventListener(VirtualScreen.
SEEK_TO,_disable);
        visible=false;
    }
    private function_loadComplete($e:Event):void {
        Dispatcher.removeEventListener(VirtualScreen.
LOAD_COMPLETE,_loadComplete);
        enable( );
        visible=true;
    }
    private function_enable($e:Event):void {
        visible=true;
    }
    private function _disable($e:Event):void {
        visible=false;
    }
    override protected function_down($e:MouseEvent):void {
        VirtualScreen.selected.resume( );
    }
    override protected function_over($e:MouseEvent):void{
Tweener.addTween(this,{alpha:.8,time:.1,transition:Equations.
easeInOutCubic});
    }
    override protected function _out($e:MouseEvent):void{
Tweener.addTween(this,{alpha:1,time:.3,transition:Equations.
easeInOutCubic});
    }
  }
}
```

LoadingScreen.as

```
package com.haurus.golfcoachdirect.lockerroom.swingplayer.uis {
  import caurina.transitions.Tweener;
  import com.haurus.core.CustomEvent;
  import com.haurus.golfcoachdirect.lesson.uis.GolfBall;
  import com.haurus.golfcoachdirect.lockerroom.
swingplayer.uis.screen.VirtualScreen;
  import com.haurus.utils.Dispatcher;
  import flash.display.Sprite;
  import flash.events.TimerEvent;
  import flash.text.TextField;
  import flash.utils.Timer;
  /**
   * @author Master
   */
  public class LoadingScreen extends Sprite {
    public var tf_label:TextField;
    private var_timer:Timer;
    public function LoadingScreen( ) {
      _timer=new Timer(80);
      _timer.addEventListener(TimerEvent.TIMER,_addBall);
      Dispatcher.addEventListener(VirtualScreen.
LOAD_PROGRESS,_loadProgress);
      Dispatcher.addEventListener(VirtualScreen.
REQUEST_VIDEO,_requestVideo);
      Dispatcher.addEventListener(VirtualScreen.
LOAD_COMPLETE,_loadComplete);
      Dispatcher.addEventListener(VirtualScreen.
NET_STATUS_MESSAGE,_netStatusMessage);
      tf_label.text ="";
    }
    private function_netStatusMessage($e:CustomEvent):void {
      if( String($e.params) == "NetStream.Play.StreamNotFound") {
        tf_label.text ="Video Not Found";
        _timer.stop( );
      }
      visible=true;
    }
    private function_requestVideo($e:CustomEvent):void {
      //tf label.text ="requestVideo( ) " + $e.params;
```

LoadingScreen.as

```
      visible=true;
    }
    private function_ loadComplete($e:CustomEvent):void {
      tf_label.text ="";
      _timer.stop( );
      visible=false;
      while( numChildren > 15 )removeChildAt(2);
    }
    private function_loadProgress($e:CustomEvent):void {
      //tf label.text =Math.round(Number(($e.params))*100)+"%";
      tf_ label.text="";
    }
    private function_ addBall($e:TimerEvent):void {
      var golfBall:Sprite = new GolfBall( );
      var degree:Number=(_timer.currentCount%12)*30;
      golfBall.x=width*.5+Math.cos(degree * Math.PI/180)*85;
      golfBall.y=height*.5+Math.sin(degree * Math.PI/180)*85;
      addChild(golfBall);
      Tweener.addTween(golfBall,{alpha:0,time:1.5});
      while( numChildren > 15 )removeChildAt(2);
    }
  }
}
```

PlayPauseButton.as

```
package com.haurus.golfcoachdirect.lockerroom.swingplayer.uis {
  import caurina.transitions.Equations;
  import caurina.transitions.Tweener;
  import com.haurus.core.CustomEvent;
  import com.haurus.golfcoachdirect.lockerroom.
swingplayer.uis.screen.VirtualScreen;
  import com.haurus.utils.AbstractButton;
  import com.haurus.utils.Dispatcher;
  import com.haurus.utils.FlashVars;
  import flash.display.MovieClip;
  import flash.events.MouseEvent;
  /**
   * @author nicholas.haurus
   */
  public class PlayPauseButton extends AbstractButton {
    public var sp_toggle:MovieClip;
    public function PlayPauseButton( ) {
      if( FlashVars.autoPlay == "true") sp_toggle.gotoAndStop("pause");
      Dispatcher.addEventListener(VirtualScreen.REQUEST_VIDEO,
_disable);
      Dispatcher.addEventListener(VirtualScreen.LOAD_COMPLETE,
_enable);
      Dispatcher.addEventListener(VirtualScreen.
RESTART_VIDEO,_pause);
      Dispatcher.addEventListener(VirtualScreen.
PAUSE_VIDEO,_pause);
      Dispatcher.addEventListener(VirtualScreen.
RESUME_VIDEO,_resume);
      Dispatcher.addEventListener(VirtualScreen. SEEK_TO,_pause);
    }
    // Enable / Disable
    private function_enable($e:CustomEvent):void {
      enable( );
    }
    private function_disable($e:CustomEvent):void {
      disable( );
    }
    // Play / Pause
    private function_resume($e:CustomEvent):void {
      sp_toggle.gotoAndStop("pause");
    }
    private function _pause(Se:CustomEvent):void {
      sp_toggle.gotoAndStop("play");
    }
    //Mouse Overs
    override protected function_over($e:MouseEvent):void {
Tweener.addTween(this,{alpha:.6,time:.1,transition:Equations.
```

PlayPauseButton.as

```
easeInOutCubic});
    }
    override protected function _out($e:MouseEvent):void {
Tweener.addTween(this,{alpha:1,time:.3,transition:Equations.easeInOutCubic});
    }
    override protected function _down($e:MouseEvent):void {
        if( sp_toggle.currentFrame ==1) {
            sp_toggle.gotoAndStop("pause");
            VirtualScreen.selected.resume( );
        }
        else {
            sp_toggle.gotoAndStop("play");
            VirtualScreen.selected.pause( );
        }
    }
}
```

KeyframeScreen.as

```
package com.haurus.golfcoachdirect.lockerroom.swingplayer.uis.screen {
    import caurina.transitions.Tweener;
    import com.haurus.golfcoachdirect.lockerroom.swingplayer.SwingPlayer;
    import com.haurus.utils.Dispatcher;
    import com.haurus.utils.FlashVars;
    import flash.events.Event;
    /**
     * @author Master
     */
    public class KeyframeScreen extends VirtualScreen {
        private static var _instance:KeyframeScreen;
        function KeyframeScreen( ) {
            super( );
            _instance=this;
            play(FlashVars.swings +"processed/"+FlashVars.filename);
            Dispatcher.addEventListener(VirtualScreen.SEEK_TO, _seekTo);
            if( _streamNotFound ) {
                visible=true;
                _selected=this;
            }
        }
        private function _seekTo($e:Event):void {
            seek(_selected.time/_selected.duration);
            _selected=this;
            visible=true;
            alpha=0;
            Tweener.addTween(this,{alpha:1,time:.5,onComplete: _fadedIn});
            Dispatcher.removeEventListener(VirtualScreen.SEEK_TO, _seekTo);
        }
        private function _fadedIn( ):void {
            StandardScreen.instance.close( );
        }
        public static function init( ):void {
            try {
                if( !KeyframeScreen.instance ) {
                    SwingPlayer.instance.sp_screen.addChild(new KeyframeScreen( ));
                }
            }
            catch($er:Error) { }
        }
        public static function get instance( ):KeyframeScreen {
            return _instance;
        }
    }
}
```

StandardScreen.as

```
package com.haurus.golfcoachdirect.lockerroom.swingplayer.uis.screen {
    import com.haurus.utils.FlashVars;
    import flash.events.NetStatusEvent;
    /**
     * @author Master
     */
    public class StandardScreen extends VirtualScreen {
        private static var _instance: StandardScreen;
        function StandardScreen( ) {
            super( );
            _instance=this;
            try {
                _selected = this;
                play(FlashVars.swings + "compressed/"+FlashVars.filename);
            }
            catch($er:Error) { }
            _ns.addEventListener(NetStatusEvent.NET_STATUS, _netStatusHandlerExtended);
        }
        private function _netStatusHandlerExtended($o:NetStatusEvent):void {
            switch($o["info"]["code"]) {
                case "NetStream.Play.Start": {
                    visible=true;
                    break;
                }
            }
            _ns.removeEventListener(NetStatusEvent.NET_STATUS, _netStatusHandlerExtended);
        }
        public function close( ):void {
            try {
                _nc.close( );
                _ns.close( );
                parent.removeChild(this);
            }
            catch($er:Error) { }
        }
        public static function get instance( ):StandardScreen {
            return _instance;
        }
    }
}
```

VirtualScreen.as

```
package com.haurus.golfcoachdirect.lockerroom.swingplayer.uis.screen {
    import com.haurus.core.CustomEvent;
    import com.haurus.utils.Dispatcher;
    import flash.events.NetStatusEvent;
    import flash.events.TimerEvent;
    import flash.media.Video;
    import flash.net.NetConnection;
    import flash.net.NetStream;
    import flash.utils.Timer;
    /**
     * @author Master
     */
    public class VirtualScreen extends Video {
        protected static var _selected:VirtualScreen;
        //Events
        public static const UPDATE_PROGRESS:String = "update_progress";
        public static const SWING_LOADED:String = "swing_loaded";
        public static const LOAD_PROGRESS:String = "load_progress";
        public static const LOAD_COMPLETE:String = "load_complete";
        public static const SEEK_TO:String = "seek_to";
        public static const RESTART_VIDEO:String = "restart_video";
        public static const PAUSE_VIDEO:String = "pause_video";
        public static const RESUME_VIDEO:String = "resume_video";
        public static const REQUEST_VIDEO:String = "request_video";
        public static const NET_STATUS_MESSAGE:String = "net_status_message";
        protected var _percentLoaded:Number=0;
        protected var _duration:Number;
```

-continued

VirtualScreen.as

```
    protected var _nc:NetConnection;
    protected var _ns:NetStream;
    protected var_bytesTotal:Number;
    protected var_tm_progress:Timer;
    protected var_customClient:Object=new Object( );
    protected static var_streamNotFound:Boolean=false;
    protected static var_counter:uint=0;
    public function VirtualScreen(width : int = 320, height : int = 240) {
        super(width, height);
        _nc = new NetConnection();
_nc.addEventListener(NetStatusEvent.NET_STATUS, _netStatusHandler);
_nc. connect(null);
_tm_progress = new Timer(200);
        _tm_progress.addEventListener(TimerEvent.TIMER, _checkProgress);
        _counter++;
        _connectStream( );
        visible=false;
    }
    public function play($path:String):void {
        trace("play("+$path+")");
        try {
            _ns.close( );
        }
        catch($er:Error) { }
        try {
            _ns.play($path);
        _tm_progress.start( );
        }
        catch($err:Error) {
            trace("ER: "+$err);
        }
    }
    public function seek($percent:Number):void {
        _ns.pause( );
        _ns.seek(_duration*$percent);
        //Dispatcher.dispatchEvent(new CustomEvent(VirtualScreen.
        SEEK_TO));
    }
    public function resume( ):void {
        _ns.resume( );
        Dispatcher.dispatchEvent(new?
CustomEvent(VirtualScreen.RESUME_VIDEO));
    }
    public function pause( ):void {
        _ns.pause( );
        Dispatcher.dispatchEvent(new
CustomEvent( VirtualScreen.PAUSE_VIDEO));
    }
    private function_onMetaData($obj:Object):void {
        trace(parent.name +"XXXXXXXXXXXXX metadata: duration=" +
$obj["duration"] + " width=" + " framerate=" + $obj[" framerate"]);
        _duration = $obj["duration"];
        _bytesTotal =_ns.bytesTotal;
        //_customClient["onMetaData"]=null;
    }
    private function_connectStream( ):void
        trace("_connectStream( )");
        _ns = new NetStream(_nc);
        _customClient["onMetaData"] =_onMetaData;
        _ns.client =_customClient;
        _ns.bufferTime = 3;
    _ns.addEventListener(NetStatusEvent.NET_STATUS, _netStatusHan-
dler);
        attachNetStream(_ns);
}
    protected function_netStatusHandler($o:Object):void {
        trace("_netStatusHandler( ) " + $o["info"]["code"]);
        switch($o["info"]["code"]) {
            case "NetStream.Play.Start": {
                _ns.seek(0);
                _ns.pause( );
                break;
            }
            case "NetStream.Buffer.Full": {
                break;
            }
            case "NetStream.Play.StreamNotFound": {
                _streamNotFound=true;
```

-continued

VirtualScreen.as

```
                KeyframeScreen.init( );
                break;
            }
            case "NetStream.Play.Stop": {
                //trace(_ns.time + " >= "+_duration);
                if(_ns.time >= _duration -.2) {
                    _ns.seek(0); _ns.pause( );
                    Dispatcher.dispatchEvent(new
CustomEvent(RESTART_VIDEO));
                }
                break;
            }
        }
    }
    private function_checkProgress($e:TimerEvent):void {
        _percentLoaded =_ns.bytesLoaded/_bytesTotal;
        //trace("_percentLoaded "+_percentLoaded)
            if(_percentLoaded <=.99 ) Dispatcher.dispatchEvent(new
CustomEvent(LOAD_PROGRESS,_percentLoaded));
            else if(_percentLoaded >.99) {
                Dispatcher.dispatchEvent(new
CustomEvent(LOAD_COMPLETE));
                _tm_progress.stop( );
                _tm_progress.removeEventListener(TimerEvent.TIMER,
_checkProgress);
                KeyframeScreen.init( );
            }
    }
    public function get percentLoaded( ):Number {
        return _percentLoaded;
    }
    public function get duration( ):Number {
        return_duration;
    }
    public function get time( ):Number {
        return_ns.time;
    }
    public static function get selected( ):VirtualScreen {
        return_selected;
    }
    }
}
```

We claim:

1. A method for a web-based, live, interactive, lesson session between a golfer and a golf professional located at a distance from the golfer, comprising:
    receiving and retrievably storing, in an online locker, a golfer video uploaded by the golfer, the video containing a golf swing of the golfer;
    establishing and maintaining audio/visual communication during the lesson session between the golf professional and the golfer;
    recording at least a portion of the audio/visual communication during the lesson session between the golf professional and the golfer;
    granting the golfer and the golf professional access to the golfer video during the lesson session;
    providing the golfer video for display to the golfer and the golf professional during the lesson session;
    granting the golf professional access to a library of selectable videos;
    providing the golfer video and a selected library video selected by the golf professional from the library simultaneously to the golfer and the golf professional for display during the lesson session;
    allowing annotation during the lesson session, by the golf professional, of at least one of the golfer video and the selected library video;
    allowing a text comment provided by the golf professional during the lesson session;

retrievably storing the recorded audio/visual communication recording, comprising a plurality of media files and a voice over Internet protocol file, the records of the annotated golfer video, the annotated selected library video, and the text comment, in the locker; and providing the stored audio/visual communication recording for play back to the golfer, wherein providing the stored audio/visual communication recording for play back to the golfer comprises:

a web browser requesting and receiving a session key, and an interface page that includes playback executable code;

a web server verifying that a user is permitted access to a requested session and returning a session data file;

a data analysis module analyzing the session data file to identify media files for the session;

a media request/receive module sending requests to appropriate servers for download to a user computer of the identified media files, including a voice over Internet protocol file;

a playback control graphics module being activated and the user beginning the session playback by clicking on a master play icon on a user's computer screen;

a synch interval timer module being activated and initialized with a time for resynchronization of session playback;

a resynch controller module being activated and initialized;

the synch interval timer module retrieving a current date and time from a local master clock and saving it as an initial playback time;

the resynch controller module directing the resynchronization of the session playback;

a command manager module executing commands from the session data file;

the voice over Internet protocol player module playing the voice over Internet protocol file; and the resynch controller module performing periodic resynchronizations, at the direction of the synch interval timer module, of the media files played by the command manager module and the voice over Internet protocol file played by the voice over Internet protocol player module.

2. The method in accordance with claim 1, further comprising allowing the golfer to request a particular golf professional.

3. The method in accordance with claim 1, further comprising the golfer records the golf swing using a hand held device and uses the hand held device to directly upload the golfer video to the web.

4. The method in accordance with claim 3, further comprising the handheld device is a cell phone.

5. The method in accordance with claim 3, further comprising the handheld device is a personal digital assistant.

6. The method in accordance with claim 1, further comprising the golfer shares information and the stored audio/visual communication recording with others.

7. The method in accordance with claim 6, further comprising the shared information and the stored audio/visual communication recording are provided to the golfer and the others by handheld devices.

8. The method in accordance with claim 1, wherein annotating the at least one of the golfer video and selected library videos includes using drawing controls which allow the golf professional to use the mouse or input device to draw vector graphics that appear over the golfer video and the selected library video and same are displayed in split screen fashion, the drawing controls comprise a freehand draw control, a straight line draw control, a rectangle draw control, a circle draw control, an eraser draw control, and a split screen control.

9. The method in accordance with claim 8, further including recording wherein, the drawn vector graphics are recorded and saved to the communication server as a position of the mouse or input device only at regular intervals and discarding interim values of the position of the mouse.

10. The method in accordance with claim 1, wherein the method of recording at least a portion of the audio/visual communication during the lesson session comprises:

creating a lesson file that identifies each media file used in or created during the lesson session, and the time in the lesson at which each media item was played, paused, rewound, or skipped to a particular position, and retrievably storing in said lesson file:

commands that manage each event that occurred during the lesson session;

movements of the mouse or other input device;

pre-existing video files;

a reference to a record of an audio conversation;

a reference to a record of webcam digital streams from the golfer and the golf professional;

text data displayed during the session; and still images displayed during the session;

retrievably storing the record of the audio conversation conducted via voice over Internet protocol telephony; and retrievably storing the webcam digital streams from the golfer and the golf professional.

* * * * *